(12) United States Patent
Park et al.

(10) Patent No.: US 11,170,473 B2
(45) Date of Patent: *Nov. 9, 2021

(54) METHOD AND APPARATUS FOR STREAMING DATA

(71) Applicant: SAMSUNG ELECTRONICS CO., LTD., Suwon-si (KR)

(72) Inventors: Youngo Park, Suwon-si (KR); Yumi Sohn, Suwon-si (KR); Myungjin Eom, Suwon-si (KR); Kwangpyo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/080,543

(22) Filed: Oct. 26, 2020

(65) Prior Publication Data

US 2021/0056666 A1 Feb. 25, 2021

Related U.S. Application Data

(63) Continuation of application No. 16/659,061, filed on Oct. 21, 2019, now Pat. No. 10,817,986.

(30) Foreign Application Priority Data

Oct. 19, 2018 (KR) .................. 10-2018-0125406
Apr. 8, 2019 (KR) .................. 10-2019-0041110
Jun. 27, 2019 (KR) .................. 10-2019-0077250

(51) Int. Cl.
*G06T 3/40* (2006.01)
*H04L 29/06* (2006.01)
*H04N 19/85* (2014.01)

(52) U.S. Cl.
CPC .......... *G06T 3/4046* (2013.01); *H04L 65/602* (2013.01); *H04L 65/607* (2013.01); *H04L 65/80* (2013.01); *H04N 19/85* (2014.11)

(58) Field of Classification Search
CPC ..... H04L 65/602; H04L 65/607; H04L 65/80; H04L 65/4069; G06T 3/4046; G06T 9/002; H04N 19/85
(Continued)

(56) References Cited

U.S. PATENT DOCUMENTS 7,295,608 B2   11/2007   Reynolds et al.
7,308,031 B2   12/2007   Yamaguchi et al.
(Continued)

FOREIGN PATENT DOCUMENTS

JP   2008-527810 A   7/2008
JP   2009-540625 A   11/2009
(Continued)

OTHER PUBLICATIONS

Li, Yue, et al. "Learning a convolutional neural network for image compact-resolution." IEEE Transactions on Image Processing 28.3 (2018): 1092-1107. (Year: 2018).*

(Continued)

*Primary Examiner* — Shefali D Goradia
(74) *Attorney, Agent, or Firm* — Sughrue Mion, PLLC

(57) ABSTRACT

A terminal for receiving streaming data may receive information of a plurality of different quality versions of an image content; request, based on the information, a server for a version of the image content from among the plurality of different quality versions of the image content; when the requested version of the image content and artificial intelligence (AI) data corresponding to the requested version of the image content are received, determines whether to perform AI upscaling on the received version of the image (Continued)

content, based on the AI data; and based on a result of the determining whether to perform AI upscaling, performs AI upscaling on the received version of the image content through a upscaling deep neural network (DNN) that is trained jointly with a downscaling DNN of the server.

20 Claims, 31 Drawing Sheets

(58) Field of Classification Search
USPC ............... 382/156–158, 232–233, 298–300; 348/14.13
See application file for complete search history.

(56) References Cited

U.S. PATENT DOCUMENTS

| | | |
|---|---|---|
| 7,400,588 B2 | 7/2008 | Izzat et al. |
| 8,184,164 B2 | 5/2012 | Yang et al. |
| 8,385,406 B2 | 2/2013 | Cho et al. |
| 9,251,572 B2 | 2/2016 | Shu et al. |
| 9,613,042 B1 | 4/2017 | Joseph |
| 9,679,213 B2 | 6/2017 | Yang et al. |
| 10,148,723 B2 | 12/2018 | Falvo |
| 10,218,971 B2 | 2/2019 | Dong et al. |
| 2007/0189392 A1 | 8/2007 | Tourapis et al. |
| 2011/0026819 A1 | 2/2011 | Lee |
| 2011/0032986 A1 | 2/2011 | Banger et al. |
| 2012/0230604 A1 | 9/2012 | Yamajo et al. |
| 2013/0282917 A1 | 10/2013 | Reznik |
| 2014/0086319 A1 | 3/2014 | Xu et al. |
| 2014/0177706 A1 | 6/2014 | Fernandes et al. |
| 2015/0256828 A1 | 9/2015 | Dong et al. |
| 2016/0163023 A1 | 6/2016 | Wey et al. |
| 2016/0360155 A1 | 12/2016 | Civanlar et al. |
| 2017/0208345 A1 | 7/2017 | Jeong et al. |
| 2017/0287109 A1 | 10/2017 | Tasfi |
| 2017/0347061 A1 | 11/2017 | Wang et al. |
| 2018/0107925 A1 | 4/2018 | Choi et al. |
| 2018/0139458 A1 | 5/2018 | Wang et al. |
| 2018/0174275 A1 | 6/2018 | Bourdev et al. |
| 2018/0176570 A1 | 6/2018 | Rippel et al. |
| 2018/0249158 A1 | 8/2018 | Huang et al. |
| 2018/0288440 A1 | 10/2018 | Chao |
| 2018/0293706 A1 | 10/2018 | Viswanathan et al. |
| 2018/0302456 A1 | 10/2018 | Katsavounidis et al. |
| 2019/0013822 A1 | 1/2019 | Marpe et al. |
| 2019/0045248 A1 | 2/2019 | Shen |
| 2019/0045251 A1 | 2/2019 | Shen |
| 2019/0230354 A1 | 7/2019 | Kim |
| 2019/0311259 A1 | 10/2019 | Cricri et al. |

FOREIGN PATENT DOCUMENTS

| | | |
|---|---|---|
| JP | 2012-191250 A | 10/2012 |
| KR | 10-0224801 B1 | 10/1999 |
| KR | 10-0286443 B1 | 4/2001 |
| KR | 10-1425602 B1 | 7/2014 |
| KR | 10-2014-0145560 A | 12/2014 |
| KR | 1020150135637 A | 12/2015 |
| KR | 10-2016-0036662 A | 4/2016 |
| KR | 10-2016-0080929 A | 7/2016 |
| KR | 10-2017-0059040 A | 5/2017 |
| KR | 10-2017-0100045 A | 9/2017 |
| KR | 10-2018-0001428 A | 1/2018 |
| KR | 10-2018-0043154 A | 4/2018 |
| KR | 10-2018-0052651 A | 5/2018 |
| KR | 10-1885855 B1 | 8/2018 |
| KR | 10-2018-0100976 A | 9/2018 |
| KR | 10-2018-0108288 A | 10/2018 |
| WO | 2016205733 A1 | 12/2016 |
| WO | 2017-036370 A1 | 3/2017 |
| WO | 2018/140294 A1 | 8/2018 |
| WO | 2018/143992 A1 | 8/2018 |
| WO | 2019/220095 A1 | 11/2019 |

OTHER PUBLICATIONS

Sani, Yusuf, Andreas Mauthe, and Christopher Edwards. "Adaptive bitrate selection: A survey." IEEE Communications Surveys & Tutorials 19.4 (2017): 2985-3014. (Year: 2017).*

Aklson, Alex. "Shallow Versus Deep Neural Networks." Introduction to Deep Learning & Neural Networks with Keras, Coursera. https://www.coursera.org/lecture/introduction-to-deep-learning-with-keras/shallow-versus-deep-neural-networks-3pKHn. Accessed Nov. 26, 2019. (Year: 2019).

Communication (PCT/ISA/220, PCT/ISA/210 & PCT/ISA/237) dated Dec. 4, 2019 by the International Searching Authority in counterpart International Patent Application No. PCT/KR2019/010645.

Communication (PCT/ISA/220, PCT/ISA/210 & PCT/ISA/237) dated Feb. 21, 2020 by the International Searching Authority in counterpart International Patent Application No. PCT/KR2019/013733.

Communication (PCT/ISA/220, PCT/ISA/210 & PCT/ISA/237) dated Feb. 5, 2020 by the International Searching Authority in counterpart International Patent Application No. PCT/KR2019/013483.

Communication (PCT/ISA/220, PCT/ISA/210 & PCT/ISA/237) dated Jan. 23, 2020 by the International Searching Authority in counterpart International Patent Application No. PCT/KR2019/012836.

Communication (PCT/ISA/220, PCT/ISA/210 & PCT/ISA/237) dated Jan. 29, 2020 by the International Searching Authority in counterpart International Patent Application No. PCT/KR2019/013595.

Communication (PCT/ISA/220, PCT/ISA/210 & PCT/ISA/237) dated Jan. 30, 2020 by the International Searching Authority in counterpart International Patent Application No. PCT/KR2019/013421.

Giannaopoulos, Michalis et al., "Convolutional Neural Networks for Video Quality Assessment", arXiv:1809.10117v1, [eess.IV], Sep. 26, 2018, pp. 1-12. (14 pages total).

Gorodilov, Artem, Dmitriy Gavrilov, and Dmitriy Schelkunov. "Neural Networks for Image and Video Compression." 2018 International Conference on Artificial Intelligence Applications and Innovations (IC-AIAI). IEEE. (Year: 2018).

Jeong, Woojin et al., "Efficient Super-Resolution Method for Single Image based on Deep Neural Networks", Journal of The Institute of Electronics and Information Engineers, vol. 55, No. 6, pp. 779-786, Jun. 2018. (10 pages total).

Jiang, Feng, et al. "An end-to-end compression framework based on convolutional neural networks." IEEE Transactions on Circuits and Systems for Video Technology 28.10 (2017): 3007-3018. (Year: 2017).

Ki, Sehwan et al., "A Study on the Convolution Neural Network based on Blind High Dynamic Range Image Quality Assessment", Proceedings of Symposium of the Korean Institute of Communications and Information Sciences, 2018, pp. 1529-1530. (4 pages total).

Le Callet, Patrick et al., "A Convolutional Neural Network Approach for Objective Video Quality Assessment", IEEE Transactions on Neural Networks, vol. 17, No. 5, Sep. 2006, pp. 1316-1327. (14 pages total).

Matthieu Courbariaux et al., "BinaryConnect: Training Deep Neural Networks with binary weights during propagations", Apr. 18, 2016, pp. 1-9 (9 pages total).

Mohammad Rastegari et al., "XNOR-Net: ImageNet Classification Using Binary Convolutional Neural Networks", Sep. 17, 2016, Computer Vision—ECCV 2016. ECCV 2016. Lecture Notes in Computer Science, vol. 9908, (17 pages total).

PCT/ISA/210 & PCT/ISA/237 dated Aug. 6, 2019 by the International Searching Authority in counterpart International Patent Application No. PCT/KR2019/004171.

PCT/ISA/210 & PCT/ISA/237 dated Jan. 22, 2020 by the International Searching Authority in counterpart International Patent Application No. PCT/KR2019/013344.

(56) References Cited

OTHER PUBLICATIONS

PCT/ISA/210 & PCT/ISA/237 dated Jan. 7, 2020 by the International Searching Authority in counterpart International Patent Application No. PCT/KR2019/012510.
Sergey Ioffe et al., "Batch Normalization: Accelerating Deep Network Training by Reducing Internal Covariate Shift", Proceedings of the 32nd International Conference on Machine Learning 2015, vol. 37, pp. 448-456, 2015. (11 pages total).
Seungbin Lee et al., "Performance Analysis of Convolution Neural Network and Generative Adversarial Network for Super Resolution", Journal of the Korean Institute of Information Scientists and Engineers, Jun. 2017, pp. 931-933. (6 pages total).
Shuai, Hong-Han, et al. "Mobiup: An upsampling-based system architecture for high-quality video streaming on mobile devices." IEEE Transactions on Multimedia 13.5 (2011): 1077-1091. (Year: 2011).
Yeo, Hyunho, et al. "Neural adaptive content-aware internet video delivery." 13th [USENIX} Symposium on Operating Systems Design and Implementation {{OSDI} 18).2018. (Year: 2018).
Yeo, Hyunho, sunghyun Do, and Dongsu Han. "How will Deep Learning Change Internet Video Delivery?." Proceedings of the 16th ACM Workshop on Hot Topics in Networks. ACM, 2017. (Year: 2017).
Stockhammer, Thomas. "Dynamic adaptive streaming over HTTP—standards and design principles." Proceedings of the second annual ACM conference on Multimedia systems. 2011. (Year: 2011).
Afonso, Mariana, Fan Zhang, and David R. Bull. "Spatial resolution adaptation framework for video compression." Applications of Digital Image Processing XLI. vol. 10752. International Society for Optics and Photonics, 2018 (Year: 2018).
Kim, Jaehwan, et al., "Dynamic frame resizing with convolutional neural network for efficient video compression." Applications of Digital Image Processing XL. vol. 10396. International Society for Optics and Photonics, 2017. (Year: 2017).
Adhikari, Vijay Kumar, et al. "Unreeling netflix: Understanding and improving multi-cdn movie delivery." 2012 Proceedings IEEE INFOCOM. IEEE, 2012. (Year: 2012).
Bing, Benny. Next-Generation Video Coding and Streaming, John Wiley & Sons, Incorporated, 2015, pp. 245-310. ProQuest Ebook Central, http://ebookcentral.proquest.com/lib/uspto-ebooks/detail.action?docID=4406551. (Year: 2015).
Cho, et al., "A Technical Analysis of Deep Learning based Image and Video Compression", 2018, Journal of Broadcast Engineering Society, et al., vol. 23, Issue 3, 12 pages total.
Johnston, et al., "Improved Lossy Image Compression with Priming and Spatially Adaptive Bit Rates for Recurrent Networks", 2017, 9 pages total.
Louizos et al., "Relaxed Quantization for Discretized Neural Networks", 2018, 14 pages total.
Kim, et al., "Deeply-Recursive Convolutional Network for Image Super-Resolution", 2016, 9 pages total.
Qiu, et al., "FReLU: Flexible Rectified Linear Units for Improving Convolutional Neural Networks", 2018 6 pages total.
Mao, et al., "Image Restoration Using Convolutional Auto-encoders with Symmetric Skip Connections" 2016, version 3, Computer Science, 22 pages total.
Yahia, et al., "Frame Interpolation using Convolutional Neural Networks on 2D animation", 2016, Universiteit van Amsterdam, 20 pages total.
Skoneczny, et al., "Classical and neural methods of image sequence interpolation". SPIE, 2000, 15 pages total.
Communication dated Dec. 22, 2020, issued by the Korean Intellectual Property Office in Korean Application No. 10-2019-0066057.
Communication dated Jan. 12, 2021, issued by the Korean Intellectual Property Office in Korean Application No. 10-2019-0078343.
Communication dated Jan. 13, 2021, issued by the Korean Intellectual Property Office in Korean Application No. 10-2019-0078344.
Communication dated Jan. 14, 2021, issued by the Korean Intellectual Property Office in Korean Application No. 10-2020-7000378.
Communication dated Dec. 10, 2020, issued by the Korean Intellectual Property Office in Korean Application No. 10-2019-0041102.
Communication dated Dec. 11, 2020, from the European Patent Office in European Application No. 19 183 429.0.
Communication dated Dec. 11, 2020, issued by the Korean Intellectual Property Office in Korean Application No. 10-2019-0041109.
Communication dated Dec. 16, 2020, issued by the Korean Intellectual Property Office in Korean Application No. 10-2019-0062583.
Communication dated Jan. 5, 2021, issued by the Korean Intellectual Property Office in Korean Application No. 10-2019-0076569.
Communication dated Jan. 6, 2021, issued by the Korean Intellectual Property Office in Korean Application No. 10-2019-0077250.
Communication dated Jun. 3, 2021, issued by the Korean Intellectual Property Office in Korean Application No. 10-2019-0041102.
Communication dated Jun. 7, 2021, from the Intellectual Property Office of India in Application No. 201924041670.
Li, Y., et al., "Convolutional Neural Network-Based Block Up-Sampling for Intra Frame Coding", IEEE Transactions on Circuits and Systems for Video Technology, vol. 28, No. 9, Sep. 2018, pp. 2316-2330.
Communication dated Jun. 29, 2021 issued by the European Patent Office in application No. 19872393.4.
Communication dated Jun. 29, 2021 issued by the European Patent Office in application No. 19873762.9.
Communication dated Jul. 5, 2021 issued by the European Patent Office in application No. 19873269.5.
Communication dated Jun. 21, 2021 issued by the Korean Intellectual Property Office in application No. 10-2019-0041109.
Communication dated Jun. 21, 2021 issued by the Korean Intellectual Property Office in application No. 10-2019-0062583.
Communication dated Jun. 21, 2021 issued by the Korean Intellectual Property Office in application No. 10-2019-0066057.
Lucas Theis, et al., "Lossy Image Compression with Compressive Autoencoders", ARXIV.org., Cornell University Library, XP080753545, Mar. 1, 2017.
Anonymous et al., "Machine Learning: Why Do We Need Floats For Using Neural Networks?—Artificial Intelligence Stack Exchange", XP055822829, Aug. 16, 2018, pp. 1-8.
Suyog Gupta, et al., Deep Learning With Limited Numerical Precision, ARXIV.org, Cornell University, XP080677454, Feb. 9, 2015; Abstract, sections 3-3.2, 4.1.2 and 4.2.
Supplementary European Search Report dated Jul. 20, 2021 issued in application No. 19874036.7-1230.
Office Action issued in Korean Patent Application No. 10-2019-0077250, dated Jul. 21, 2021.
Office Action issued in Korean Patent Application No. 10-2019-0076569, dated Jul. 21, 2021.
Foreign Action issued in Korean Patent Application No. 2019-0062583 dated Aug. 9, 2021.
Foreign Action issued in Korean Patent Application No. 2019-0066057 dated Aug. 9, 2021.
Office Action issued in Korean Patent Application No. 10-2019-0076569, dated Sep. 16, 2021.
Office Action issued in Korean Patent Application No. 10-2019-0077250, dated Sep. 16, 2021.
Extended European Search Report issued in European Patent Application No. 19873223.2 dated Oct. 4, 2021.
Sajjadi, Medhi, S., "Enhance Net: Single Image Super-Resolution Through Automated Texture Synthesis", 2017 IEEE International Conference on Computer Vision, 2017, pp. 4501-4510.
Guo, Tiantong, et al., 37 Deep Learning Based Image Super-Resolution with Coupled Backpropagation, Department of Electrical Engineering, The Pennsylvania State University, 2016, 237-241.

* cited by examiner

FIG. 5

| IMAGE-RELATED INFORMATION | DNN SETTING INFORMATION |
|---|---|
| SD, 10Mbps, AV1 | A DNN SETTING INFORMATION |
| HD, 15Mbps, H.264 | B DNN SETTING INFORMATION |
| Full HD, 20Mbps, HEVC | C DNN SETTING INFORMATION |
| Full HD, 15Mbps, HEVC | D DNN SETTING INFORMATION |

FIG. 22

```
<mediadataset>
<id = 1,   type = video,  ….              >
    <mediadata>
        <id = 1,   resolution = 8K, bitrate = 30Mbps, AIupscale = on>
        <id = 2,   resolution = 4K, bitrate = 10Mbps, AIupscale = on>

…
        <id = n,   resolution = 8K, bitrate = 40Mbps, AIupscale = off>
        <id = n+1, resolution = 8K, bitrate = 30Mbps, AIupscale = off>
        <id = n+2, resolution = 4K, bitrate = 20Mbps, AIupscale = off>
        <id = n+3, resolution = 4K, bitrate = 10Mbps, AIupscale = off>

<id = 2,   type = audio,  ….              > …
…
```

FIG. 23

```
<mediadataset>
<id = 1,   type = video, .....         >
    <mediadata>
    <id = 1,    resolution = 8K, bitrate = 30Mbps, Alupscale = on , Alupscalelevel = 1 >
    <id = 2,    resolution = 4K, bitrate = 20Mbps, Alupscale = on,  Alupscalelevel = 2 >
    <id = 3,    resolution = 4K, bitrate = 10Mbps, Alupscale = on,  Alupscalelevel = 3>

....
    <id = n,    resolution = 8K, bitrate = 40Mbps, Alupscale = off, Alupscalelevel = null>
    <id = n+1, resolution = 8K, bitrate = 30Mbps, Alupscale = off, Alupscalelevel = null >
    <id = n+2, resolution = 4K, bitrate = 20Mbps, Alupscale = off, Alupscalelevel = null >

<id = 2,   type = audio, .....         >
 ...
```

FIG. 24

```
<mediadataset>
<id = 1,  type = video, .....           >
    <mediadata>
        <id = 1,    resolution = 8K, bitrate = 30Mbps, Alupscale = on , Alupscaleparameterset = A >
        <id = 2,    resolution = 4K, bitrate = 20Mbps, Alupscale = on,  Alupscaleparameterset = A >
        <id = 3,    resolution = 4K, bitrate = 20Mbps, Alupscale = on,  Alupscaleparameterset = B>

....
        <id = n,    resolution = 8K, bitrate = 40Mbps, Alupscale = off, Alupscaleparameterset = null>
        <id = n+1, resolution = 8K, bitrate = 30Mbps, Alupscale = off, Alupscaleparameterset = null >
        <id = n+2, resolution = 4K, bitrate = 20Mbps, Alupscale = off, Alupscaleparameterset = null >

<id = 2,  type = audio, .....           >
  ...
```

METHOD AND APPARATUS FOR STREAMING DATA

CROSS-REFERENCE TO RELATED APPLICATIONS

This application is a continuation of U.S. patent application Ser. No. 16/659,061, filed on Oct. 21, 2019, and is based on and claims priority under 35 U.S.C. § 119 to Korean Patent Application Nos. 10-2018-0125406, filed on Oct. 19, 2018, and 10-2019-0041110, filed on Apr. 8, 2019 and 10-2019-0077250, filed on Jun. 27, 2019, in the Korean Intellectual Property Office, the disclosures of which are incorporated herein by reference in their entireties.

BACKGROUND

1. Field

The disclosure relates to data streaming technology. More particularly, the disclosure relates to a method and apparatus for adaptively streaming image data artificial intelligence (AI)-encoded by using a deep neural network (DNN).

2. Description of Related Art

A scheme for transmitting image data through a network includes a download scheme and a streaming scheme. The streaming scheme refers to a scheme for transmitting, by a server, image data in real time, and reproducing, by a terminal, received image data in real time.

Unlike the download scheme in which reproduction of image data is started after the image data is completely transceived, i.e., completely transmitted and received, according to the streaming scheme, image data is transceived and reproduced in real time via a logic channel established between a server and a terminal, and thus a Quality of Service (QoS) of image data reproduction may be maintained while reflecting a change in a streaming environment.

Artificial intelligence (AI) systems are computer systems for implementing human-level intelligence. Unlike general rule-based smart systems, the AI systems autonomously learn and make decisions, and thus improve their capabilities. The more the AI systems are used, the more recognition rates of the AI systems increase and the more accurately the AI systems understand user preferences. As such, the general rule-based smart systems may be replaced by deep-learning-based AI systems.

As interest in the AI systems increases, many attempts are actively being made to apply the AI systems to various technology fields. For example, research is being conducted to converge the AI systems with technology fields including image processing, data processing, and the like.

SUMMARY

Provided are a method and apparatus for streaming data that is artificial intelligence (AI)-encoded by using a deep neural network (DNN).

Additional aspects will be set forth in part in the description which follows and, in part, will be apparent from the description, or may be learned by practice of the presented embodiments of the disclosure.

According to embodiment of the disclosure, there is provided a method of streaming data, including: receiving information of a plurality of different quality versions of an image content; requesting, based on the information, a server to transmit a first version of the image content to a terminal, from among the plurality of different quality versions of the image content; receiving the first version of the image content and artificial intelligence (AI) data corresponding to the first version of the image content; determining whether to perform AI upscaling on the first version of the image content, based on the AI data; based on a result of the determining whether to perform the AI upscaling, performing AI upscaling on the first version of the image content through an upscaling deep neural network (DNN) that is trained jointly with a downscaling DNN of the server; confirming a state of a network between the terminal and the server; and requesting the server to transmit a second version of the image content to the terminal, from among the plurality of different versions of the image content, according to the information of the plurality of different quality versions of the image content and the state of the network.

The method may further include determining, based on the AI data, whether AI downscaling has been performed on the first version of the image content through the downscaling DNN of the server, and wherein, when it is confirmed that the AI downscaling has been performed on the first version of the image content, the determining of whether the AI downscaling has been performed may include determining to perform the AI upscaling on the first version of the image content.

The information of the plurality of different quality versions of the image content may include quality information and AI scale conversion information of the plurality of different quality versions of the image content, and the requesting the server to transmit the second version of the image content may include requesting the second version of the image content corresponding to the state of the network, based on either one or both of the quality information, and the AI scale conversion information.

The method may further include determining the second version of the image content corresponding to the state of the network, based on capability information including information indicating whether the AI upscaling is supported by the terminal and information about an AI upscale level supported by the terminal.

The server may be a content provider server, wherein the method may further include requesting a service server for the information of the plurality of different quality versions of the image content, and wherein the receiving the information of the plurality of different quality versions of the image content may include receiving, from the service server, the information of the plurality of different quality versions of the image content and an identifier of the content provider server.

According to embodiment of the disclosure, there is provided a method of streaming data, including: receiving, from a terminal, a request for a first version of an image content from among a plurality of different quality versions of the image content of a server; in response to the request, transmitting, to the terminal, artificial intelligence (AI) data and the first version of the image content that has been AI encoded through a downscaling DNN of the server that is trained jointly with a upscaling DNN of the terminal; and receiving, from the terminal, a request for a second version of the image content from among the plurality of different versions of the image content, according to a state of a network between the terminal and the server.

The AI data may include information about the downscaling DNN that has been applied to the AI-encoded image data.

The receiving the request for the second version of the image content may include receiving the request for the second version of the image content that may correspond to the state of the network and may be determined based on either one or both of AI scale conversion information and quality information of each of the plurality of different versions of the image content.

The second version of the image content corresponds to the state of the network and is determined from among the plurality of different versions of the image content, based on capability information comprising information indicating whether AI upscaling is supported by the terminal and information about an AI upscale level supported by the terminal.

The method may further include providing the terminal with an identifier of the server.

According to embodiment of the disclosure, a terminal for receiving streaming data, including: a memory storing one or more instructions; and at least one processor configured to execute the one or more instructions to: receive information of a plurality of different quality versions of an image content; request, based on the information, a server to transmit a first version of the image content, from among the plurality of different versions of the image content; receive the first version of the image content and artificial intelligence (AI) data corresponding to the first version of the image content; determine whether to perform AI upscaling on the first version of the image content, based on the AI data; based on a result of the determining whether to perform the AI upscaling, perform the AI upscaling on the first version of the image content through an upscaling deep neural network (DNN) of the terminal that is trained jointly with a downscaling DNN of the server; confirm a state of a network between the terminal and the server; and request, based on the information, the server to transmit a second version of the image content to the terminal, from among the plurality of different versions of the image content, according to the information of the plurality of different quality versions of the image content and the state of the network.

The at least one processor may be further configured to: determine, based on the AI data, whether AI downscaling has been performed on the first version of the image content through the downscaling DNN of the server; and when it is confirmed that the AI downscaling has been performed on the first version of the image content, determine to perform the AI upscaling on the first version of the image content.

The information of the plurality of different quality versions of the image content may include quality information and AI scale conversion information of the plurality of different quality versions of the image content, and wherein the at least one processor may be further configured to execute the one or more instructions to request the second version of the image content corresponding to the state of the network, based on either one or both of the quality information and the AI scale conversion information.

The at least one processor may be further configured to: determine the second version of the image content corresponding to the state of the network, based on capability information comprising information indicating whether AI upscaling is supported by the terminal and information about an AI upscale level supported by the terminal.

The server may be a content provider server, and the at least one processor may be further configured to execute the one or more instructions to request a service server to provide the terminal with the information of the plurality of different quality versions of the image content, and to receive, from the service server an identifier of the content provider server and the information of the plurality of different quality versions of the image content.

According to embodiment of the disclosure, there is provided server for streaming data, including: a memory storing one or more instructions; and at least one processor configured to execute the one or more instructions to: receive, from a terminal, a request for a first version of an image content, from among a plurality of different quality versions of the image content of a server; in response to the request, transmit, to the terminal, artificial intelligence (AI) data and the first version of the image content that has been AI encoded through a downscaling deep neural network (DNN) that is trained jointly with an upscaling DNN of the terminal; and receive, from the terminal, a request for a second version of the image content from the plurality of different versions of the image content, according to a state of a network between the terminal and the server.

The AI data may include information about the downscaling DNN that has been applied to the AI-encoded image data.

The at least one processor may be further configured to execute the one or more instructions to receive the request for the second version of the image content that corresponds to the state of the network and is determined based on either one or both of AI scale conversion information and quality information of each of the plurality of different versions of the image content.

The second version of the image content may correspond to the state of the network and may be determined based on capability information comprising information indicating whether AI upscaling is supported by the terminal and information about an AI upscale level supported by the terminal.

The at least one processor may be further configured to execute the one or more instructions to provide the terminal with an identifier of the server.

According to embodiment of the disclosure, there is provided a non-transitory computer-readable recording medium having recorded thereon a program for executing the method of steaming data.

According to embodiment of the disclosure, there is provided a terminal for streaming data, including: a memory storing one or more instructions; and at least one processor configured to execute the one or more instructions to: receive, from a server, information of a plurality of different quality versions of an image content; determine a state of a network between the terminal and the server; determine a version of the image content, from among the plurality of different quality versions of the image content, based on the information of the plurality of different quality versions of the image content and the state of the network, and request the server to transmit the version of the image content to the terminal; receive, from the server, the version of the image content and artificial intelligence (AI) data indicating whether the version of the image content is downscaled through a downscaling deep neural network (DNN) of the server; and process the version of the image content based on the AI data.

According to embodiment of the disclosure, there is provided a server for streaming data, including: a memory storing one or more instructions; and at least one processor configured to execute the one or more instructions to: provide a terminal with information of a plurality of different quality versions of a image content; receive, from the terminal, a request for a version of the image content, from among the plurality of different quality versions of the image content, according to a state of a network between the terminal and the server; and provide the terminal with the requested version of the image content and artificial intelligence (AI) data indicating whether the requested version of the image content is downscaled through a downscaling deep neural network (DNN) of the server.

BRIEF DESCRIPTION OF THE DRAWINGS

The above and other aspects, features, and advantages of certain embodiments of the disclosure will be more apparent from the following description taken in conjunction with the accompanying drawings, in which:

A brief description of each drawing is provided to more fully understand the drawing recited in the present specification.

FIG. 5 is a table showing a mapping relationship between several pieces of image-related information and several pieces of DNN setting information;

FIG. 22 is a diagram for describing detail configuration of additional information, according to embodiments of the disclosure;

FIG. 23 is a diagram for describing detail configuration of additional information, according to embodiments of the disclosure;

FIG. 24 is a diagram for describing detail configuration of additional information, according to embodiments of the disclosure;

DETAILED DESCRIPTION

Figure 1:
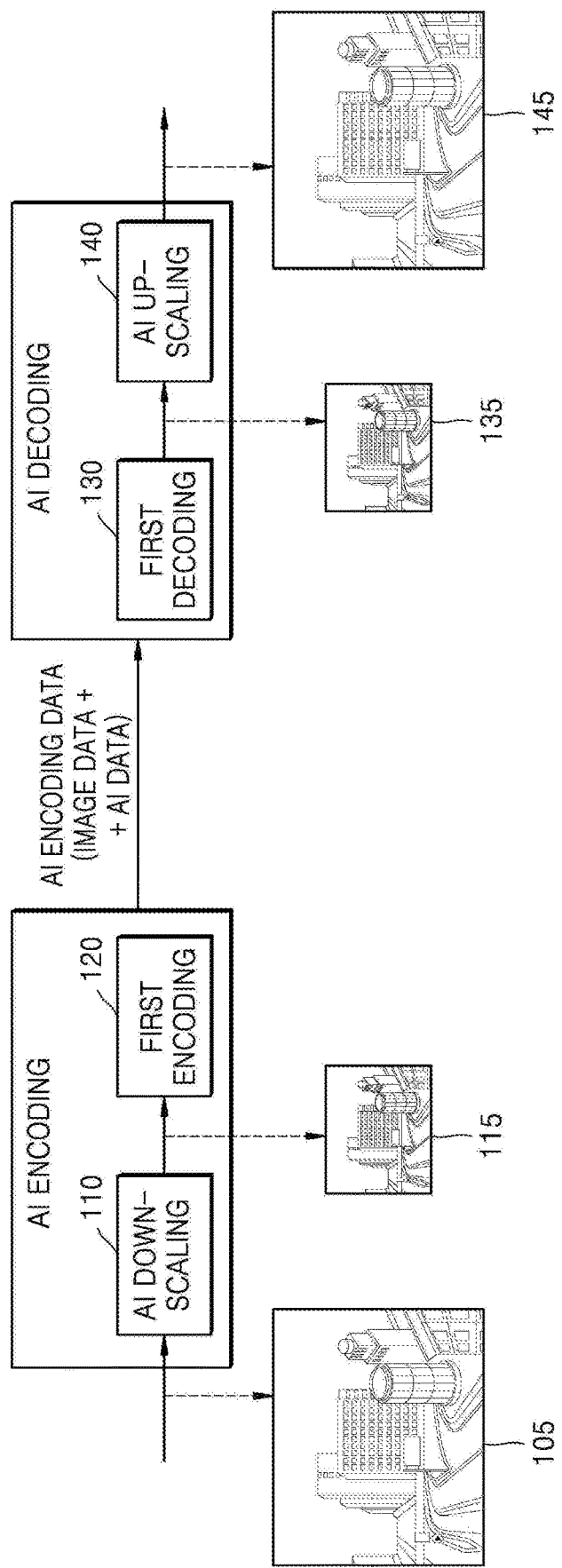
FIG. 1 is a diagram for describing an artificial intelligence (AI) encoding process and an AI decoding process, according to embodiments.

As the disclosure allows for various changes and numerous examples, particular embodiments will be illustrated in the drawings and described in detail in the written description. However, this is not intended to limit the disclosure to particular modes of practice, and it will be understood that all changes, equivalents, and substitutes that do not depart from the spirit and technical scope of the disclosure are encompassed in the disclosure.

In the description of embodiments, detailed explanations of related art are omitted when it is deemed that they may unnecessarily obscure the essence of the disclosure. Also, numbers (for example, a first, a second, and the like) used in the description of the specification are identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module", two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Also, in the present specification, an 'image' or a 'picture' may denote a still image, a moving image including a plurality of consecutive still images (or frames), or a video.

Also, in the present specification, a deep neural network (DNN) is a representative example of an artificial neural network model simulating brain nerves, and is not limited to an artificial neural network model using an algorithm.

Also, in the present specification, a 'parameter' is a value used in an operation process of each layer forming a neural network, and for example, may include a weight used when an input value is applied to a certain operation expression. Here, the parameter may be expressed in a matrix form. The parameter is a value set as a result of training, and may be updated through separate training data.

Also, in the present specification, a 'first DNN' indicates a DNN used for artificial intelligence (AI) down-scaling an image, and a 'second DNN' indicates a DNN used for AI up-scaling an image.

Also, in the present specification, 'DNN setting information' includes information related to an element constituting a DNN. 'DNN setting information' includes the parameter described above as information related to the element constituting the DNN. The first DNN or the second DNN may be set by using the DNN setting information.

Also, in the present specification, an 'original image' denotes an image to be an object of AI encoding, and a 'first image' denotes an image obtained as a result of performing AI down-scaling on the original image during an AI encoding process. Also, a 'second image' denotes an image obtained via first decoding during an AI decoding process, and a 'third image' denotes an image obtained by AI up-scaling the second image during the AI decoding process.

Also, in the present specification, 'AI down-scale' denotes a process of decreasing resolution of an image based on AI, and 'first encoding' denotes an encoding process according to an image compression method based on frequency transformation. Also, 'first decoding' denotes a decoding process according to an image reconstruction method based on frequency transformation, and 'AI up-scale' denotes a process of increasing resolution of an image based on AI.

Expressions such as "at least one of," when preceding a list of elements, modify the entire list of elements and do not modify the individual elements of the list. For example, the expression "at least one of a, b or c" indicates only a, only b, only c, both a and b, both a and c, both b and c, all of a, b, and c, or variations thereof.

FIG. 1 is a diagram for describing an AI encoding process and an AI decoding process, according to embodiments.

As described above, when resolution of an image remarkably increases, the throughput of information for encoding and decoding the image is increased, and accordingly, a method for improving efficiency of encoding and decoding of an image is required.

As shown in FIG. 1, according to embodiments of the disclosure, a first image 115 is obtained by performing AI down-scaling 110 on an original image 105 having high resolution. Then, first encoding 120 and first decoding 130 are performed on the first image 115 having relatively low resolution, and thus a bitrate may be largely reduced compared to when the first encoding 120 and the first decoding 130 are performed on the original image 105.

In FIG. 1, the first image 115 is obtained by performing the AI down-scaling 110 on the original image 105 and the first encoding 120 is performed on the first image 115 during the AI encoding process, according to embodiments. During the AI decoding process, AI encoding data including AI data and image data, which are obtained as a result of AI encoding is received, a second image 135 is obtained via the first decoding 130, and a third image 145 is obtained by performing AI up-scaling 140 on the second image 135.

Referring to the AI encoding process in detail, when the original image 105 is received, the AI down-scaling 110 is performed on the original image 105 to obtain the first image 115 of certain resolution or certain quality. Here, the AI down-scaling 110 is performed based on AI, and AI for the AI down-scaling 110 is trained jointly with AI for the AI up-scaling 140 of the second image 135. This is because the AI down-scaling 110 and the AI up-scaling 120 have two competing objectives of scaling-down and scaling-up an image, and therefore, when the AI for the AI down-scaling 110 and the AI for the AI up-scaling 140 are separately trained, a difference between the original image 105 which is an object of AI encoding and the third image 145 reconstructed through AI decoding is increased.

In embodiments of the disclosure, the AI data may be used to maintain such a joint relationship during the AI encoding process and the AI decoding process. Accordingly, the AI data obtained through the AI encoding process may include information indicating an up-scaling target, and during the AI decoding process, the AI up-scaling 140 is performed on the second image 135 according to the up-scaling target verified based on the AI data.

The AI for the AI down-scaling 110 and the AI for the AI up-scaling 140 may be embodied as a DNN. As will be described later with reference to FIG. 9, because a first DNN and a second DNN are jointly trained by sharing loss information under a target, an AI encoding apparatus may provide target information used during joint training of the first DNN and the second DNN to an AI decoding apparatus, and the AI decoding apparatus may perform the AI up-scaling 140 on the second image 135 to target resolution based on the provided target information.

Regarding the first encoding 120 and the first decoding 130 of FIG. 1, information amount of the first image 115 obtained by performing AI down-scaling 110 on the original image 105 may be reduced through the first encoding 120. The first encoding 120 may include a process of generating prediction data by predicting the first image 115, a process of generating residual data corresponding to a difference between the first image 115 and the prediction data, a process of transforming the residual data of a spatial domain component to a frequency domain component, a process of quantizing the residual data transformed to the frequency domain component, and a process of entropy-encoding the quantized residual data. Such first encoding 120 may be performed via one of image compression methods using frequency transformation, such as MPEG-2, H.264 Advanced Video Coding (AVC), MPEG-4, High Efficiency Video Coding (HEVC), VC-1, VP8, VP9, and AOMedia Video 1 (AV1).

The second image 135 corresponding to the first image 115 may be reconstructed by performing the first decoding 130 on the image data. The first decoding 130 may include a process of generating the quantized residual data by entropy-decoding the image data, a process of inverse-quantizing the quantized residual data, a process of transforming the residual data of the frequency domain component to the spatial domain component, a process of generating the prediction data, and a process of reconstructing the second image 135 by using the prediction data and the residual data. Such first decoding 130 may be performed via an image reconstruction method corresponding to one of image compression methods using frequency transformation, such as MPEG-2, H.264 AVC, MPEG-4, HEVC, VC-1, VP8, VP9, and AV1, which is used in the first encoding 120.

The AI encoding data obtained through the AI encoding process may include the image data obtained as a result of performing the first encoding 120 on the first image 115, and the AI data related to the AI down-scaling 110 of the original image 105. The image data may be used during the first decoding 130 and the AI data may be used during the AI up-scaling 140.

The image data may be transmitted in a form of a bitstream. The image data may include data obtained based on pixel values in the first image 115, for example, residual data that is a difference between the first image 115 and prediction data of the first image 115. Also, the image data includes information used during the first encoding 120 performed on the first image 115. For example, the image data may include prediction mode information, motion information, and information related to quantization parameter used during the first encoding 120. The image data may be generated according to a rule, for example, according to a syntax, of an image compression method used during the first encoding 120, among MPEG-2, H.264 AVC, MPEG-4, HEVC, VC-1, VP8, VP9, and AV1.

The AI data is used in the AI up-scaling 140 based on the second DNN. As described above, because the first DNN and the second DNN are jointly trained, the AI data includes information enabling the AI up-scaling 140 to be performed accurately on the second image 135 through the second DNN. During the AI decoding process, the AI up-scaling 140 may be performed on the second image 135 to have targeted resolution and/or quality, based on the AI data.

The AI data may be transmitted together with the image data in a form of a bitstream. Alternatively, according to embodiments, the AI data may be transmitted separately from the image data, in a form of a frame or a packet. The AI data and the image data obtained as a result of the AI encoding may be transmitted through the same network or through different networks.

Figure 2:
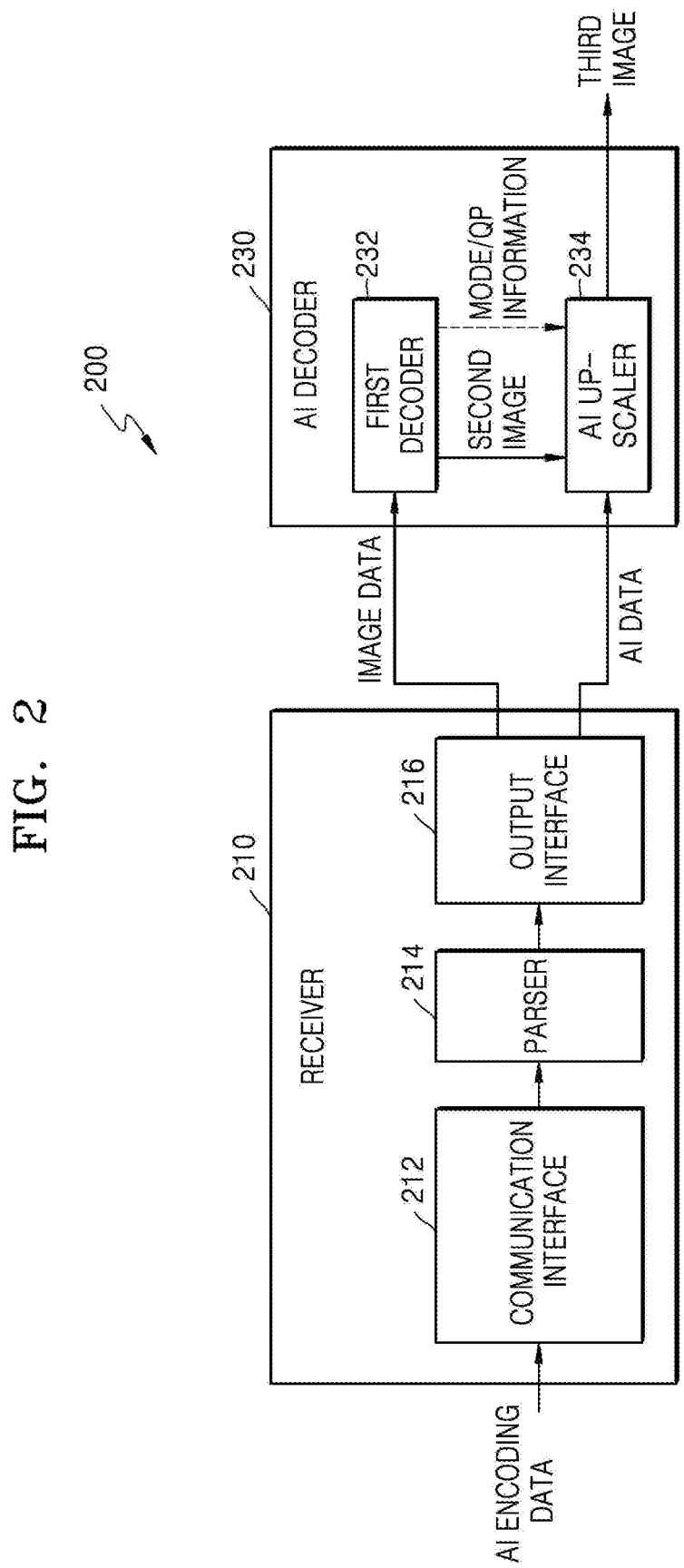
FIG. 2 is a block diagram of a configuration of an AI decoding apparatus according to embodiments.

FIG. 2 is a block diagram of a configuration of an AI decoding apparatus 100 according to embodiments.

Referring to FIG. 2, the AI decoding apparatus 200 according to embodiments may include a receiver 210 and an AI decoder 230. The receiver 210 may include a communication interface 212, a parser 214, and an output interface 216. The AI decoder 230 may include a first decoder 232 and an AI up-scaler 234.

The receiver 210 receives and parses AI encoding data obtained as a result of AI encoding, and distinguishably outputs image data and AI data to the AI decoder 230.

The communication interface 212 receives the AI encoding data obtained as the result of AI encoding through a network. The AI encoding data obtained as the result of performing AI encoding includes the image data and the AI data. The image data and the AI data may be received through a same type of network or different types of networks.

The parser 214 receives the AI encoding data received through the communication interface 212 and parses the AI encoding data to distinguish the image data and the AI data. For example, the parser 214 may distinguish the image data and the AI data by reading a header of data obtained from the communication interface 212. According to embodiments, the parser 214 distinguishably transmits the image data and the AI data to the output interface 216 via the header of the data received through the communication interface 212, and the output interface 216 transmits the distinguished image data and AI data respectively to the first decoder 232 and the AI up-scaler 234. At this time, it may be verified that the image data included in the AI encoding data is image data generated via a codec (for example, MPEG-2, H.264 AVC, MPEG-4, HEVC, VC-1, VP8, VP9, or AV1). In this case, corresponding information may be transmitted to the first decoder 232 through the output interface 216 such that the image data is processed via the verified codec.

According to embodiments, the AI encoding data parsed by the parser 214 may be obtained from a data storage medium including a magnetic medium such as a hard disk, a floppy disk, or a magnetic tape, an optical recording medium such as CD-ROM or DVD, or a magneto-optical medium such as a floptical disk.

The first decoder 232 reconstructs the second image 135 corresponding to the first image 115, based on the image data. The second image 135 obtained by the first decoder 232 is provided to the AI up-scaler 234. According to embodiments, first decoding related information, such as prediction mode information, motion information, quantization parameter information, or the like included in the image data may be further provided to the AI up-scaler 234.

Upon receiving the AI data, the AI up-scaler 234 performs AI up-scaling on the second image 135, based on the AI data. According to embodiments, the AI up-scaling may be performed by further using the first decoding related information, such as the prediction mode information, the quantization parameter information, or the like included in the image data.

The receiver 210 and the AI decoder 230 according to embodiments are described as individual devices, but may be implemented through one processor. In this case, the receiver 210 and the AI decoder 230 may be implemented through an dedicated processor or through a combination of software and general-purpose processor such as application processor (AP), central processing unit (CPU) or graphic processing unit (GPU). The dedicated processor may be implemented by including a memory for implementing embodiments of the disclosure or by including a memory processor for using an external memory.

Also, the receiver 210 and the AI decoder 230 may be configured by a plurality of processors. In this case, the receiver 210 and the AI decoder 230 may be implemented through a combination of dedicated processors or through a combination of software and general-purpose processors such as AP, CPU or GPU. Similarly, the AI up-scaler 234 and the first decoder 232 may be implemented by different processors.

The AI data provided to the AI up-scaler 234 includes information enabling the second image 135 to be processed via AI up-scaling. Here, an up-scaling target should correspond to down-scaling of a first DNN. Accordingly, the AI data includes information for verifying a down-scaling target of the first DNN.

Examples of the information included in the AI data include difference information between resolution of the original image 105 and resolution of the first image 115, and information related to the first image 115.

The difference information may be expressed as information about a resolution conversion degree of the first image 115 compared to the original image 105 (for example, resolution conversion rate information). Also, because the resolution of the first image 115 is verified through the resolution of the reconstructed second image 135 and the resolution conversion degree is verified accordingly, the difference information may be expressed only as resolution information of the original image 105. Here, the resolution information may be expressed as vertical/horizontal sizes or as a ratio (16:9, 4:3, or the like) and a size of one axis. Also, when there is pre-set resolution information, the resolution information may be expressed in a form of an index or flag.

The information related to the first image 115 may include information about either one or both of a bitrate of the image data obtained as the result of performing first encoding on the first image 115, and a codec type used during the first encoding of the first image 115.

The AI up-scaler 234 may determine the up-scaling target of the second image 135, based on either one or both of the difference information, and the information related to the first image 115, which are included in the AI data. The up-scaling target may indicate, for example, to what degree resolution is to be up-scaled for the second image 135. When the up-scaling target is determined, the AI up-scaler 234 performs AI up-scaling on the second image 135 through a second DNN to obtain the third image 145 corresponding to the up-scaling target.

Before describing a method, performed by the AI up-scaler 234, of performing AI up-scaling on the second image 135 according to the up-scaling target, an AI up-scaling process through the second DNN will be described with reference to FIGS. 3 and 4.

Figure 3:
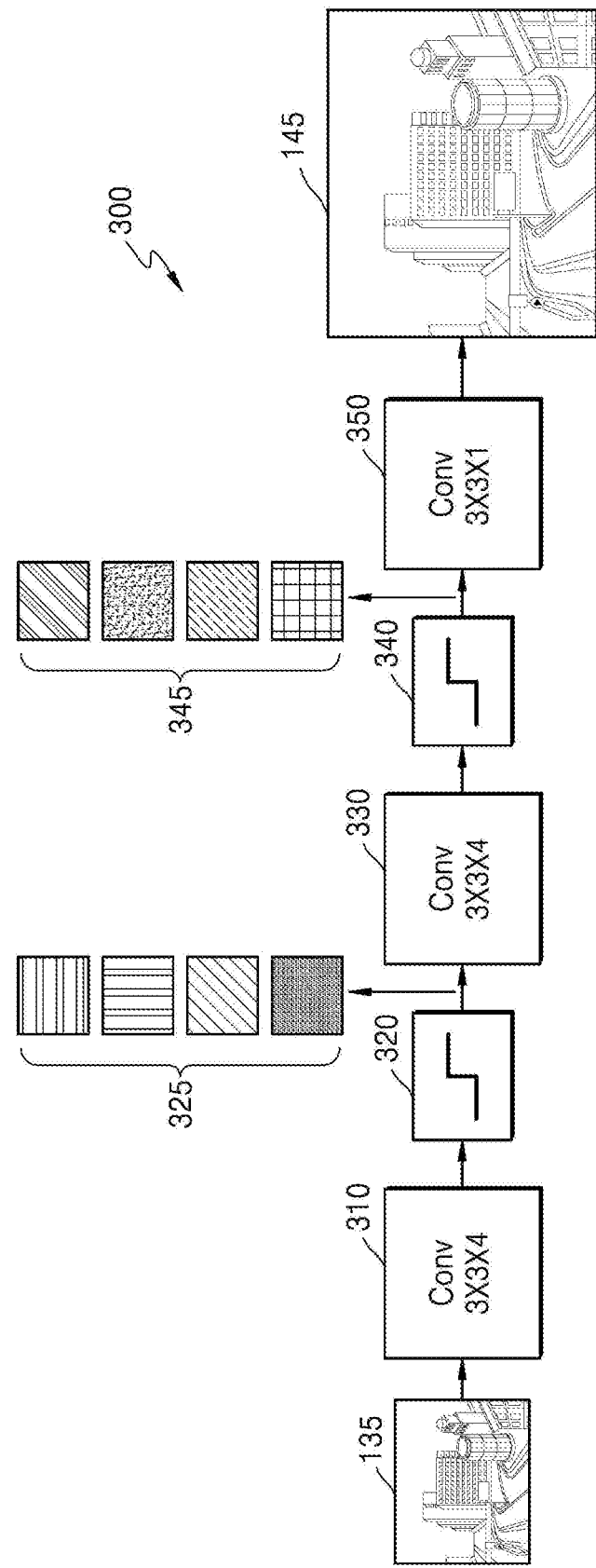
FIG. 3 is a diagram showing a second deep neural network (DNN) for performing AI up-scaling on a second image.
Figure 4:
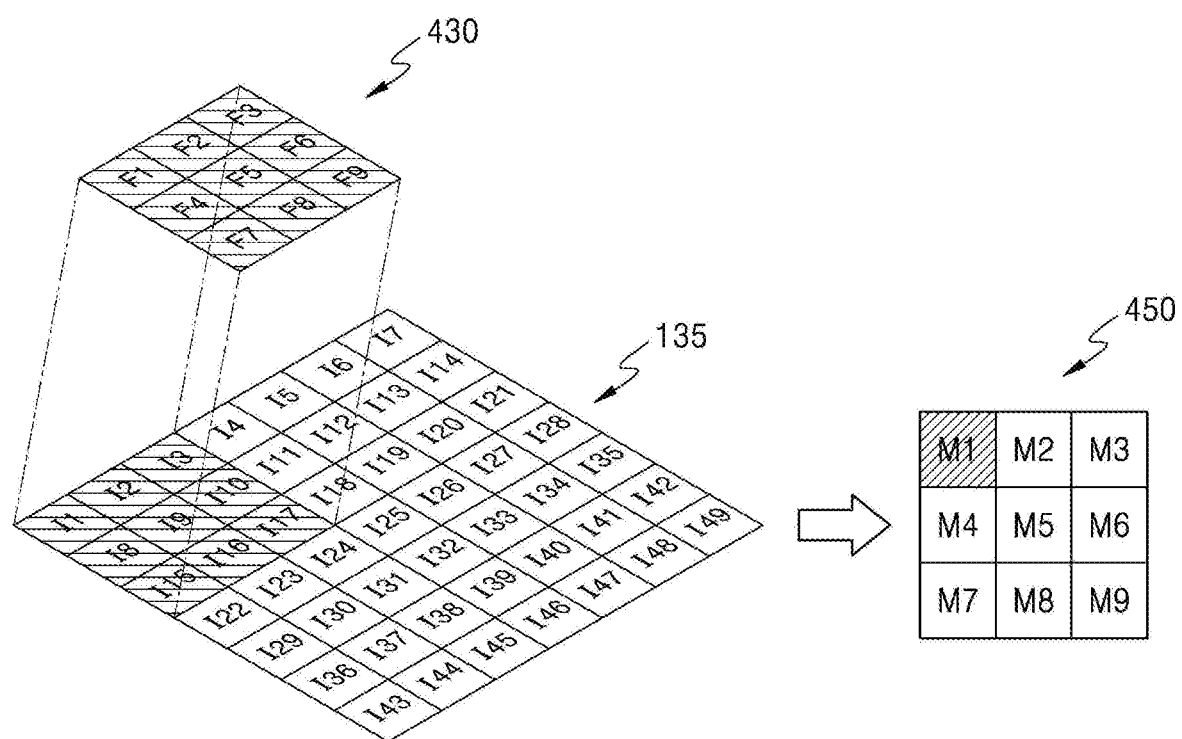
FIG. 4 is a diagram for describing a convolution operation by a convolution layer.

FIG. 3 is a diagram showing a second DNN 300 for performing AI up-scaling on the second image 135, and FIG. 4 is a diagram for describing a convolution operation in a first convolution layer 310 of FIG. 3.

As shown in FIG. 3, the second image 135 is input to the first convolution layer 310. 3×3×4 indicated in the first convolution layer 310 shown in FIG. 3 indicates that a convolution process is performed on one input image by using four filter kernels having a size of 3×3. Four feature maps are generated by the four filter kernels as a result of the convolution process. Each feature map indicates inherent characteristics of the second image 135. For example, each feature map may represent a vertical direction characteristic, a horizontal direction characteristic, or an edge characteristic, etc. of the second image 135.

A convolution operation in the first convolution layer 310 will be described in detail with reference to FIG. 4.

One feature map 450 may be generated through multiplication and addition between parameters of a filter kernel 430 having a size of 3×3 used in the first convolution layer 310 and corresponding pixel values in the second image 135. Four filter kernels are used in the first convolution layer 310, and four feature maps may be generated through the convolution operation using the four filter kernels.

I1 through I49 indicated in the second image 135 in FIG. 4 indicate pixels in the second image 135, and F1 through F9 indicated in the filter kernel 430 indicate parameters of the filter kernel 430. Also, M1 through M9 indicated in the feature map 450 indicate samples of the feature map 450.

In FIG. 4, the second image 135 includes 49 pixels, but the number of pixels is only an example and when the second image 135 has a resolution of 4 K, the second image 135 may include, for example, 3840×2160 pixels.

During a convolution operation process, pixel values of I1, I2, I3, I8, I9, I10, I15, I16, and I17 of the second image 135 and F1 through F9 of the filter kernels 430 are respectively multiplied, and a value of combination (for example, addition) of result values of the multiplication may be assigned as a value of M1 of the feature map 450. When a stride of the convolution operation is 2, pixel values of I3, I4, I5, I10, I11, I12, I17, I18, and I19 of the second image 135 and F1 through F9 of the filter kernels 430 are respectively multiplied, and the value of the combination of the result values of the multiplication may be assigned as a value of M2 of the feature map 450.

While the filter kernel 430 moves along the stride to the last pixel of the second image 135, the convolution operation is performed between the pixel values in the second image 135 and the parameters of the filter kernel 430, and thus the feature map 450 having a certain size may be generated.

According to the present disclosure, values of parameters of a second DNN, for example, values of parameters of a filter kernel used in convolution layers of the second DNN (for example, F1 through F9 of the filter kernel 430), may be optimized through joint training of a first DNN and the second DNN. As described above, the AI up-scaler 234 may determine an up-scaling target corresponding to a down-scaling target of the first DNN based on AI data, and determine parameters corresponding to the determined up-scaling target as the parameters of the filter kernel used in the convolution layers of the second DNN.

Convolution layers included in the first DNN and the second DNN may perform processes according to the convolution operation process described with reference to FIG. 4, but the convolution operation process described with reference to FIG. 4 is only an example and is not limited thereto.

Referring back to FIG. 3, the feature maps output from the first convolution layer 310 may be input to a first activation layer 320.

The first activation layer 320 may assign a non-linear feature to each feature map. The first activation layer 320 may include a sigmoid function, a Tan h function, a rectified linear unit (ReLU) function, or the like, but is not limited thereto.

The first activation layer 320 assigning the non-linear feature indicates that at least one sample value of the feature map, which is an output of the first convolution layer 310, is changed. Here, the change is performed by applying the non-linear feature.

The first activation layer 320 determines whether to transmit sample values of the feature maps output from the first convolution layer 310 to a second convolution layer 330. For example, some of the sample values of the feature maps are activated by the first activation layer 320 and transmitted to the second convolution layer 330, and some of the sample values are deactivated by the first activation layer 320 and not transmitted to the second convolution layer 330. The intrinsic characteristics of the second image 135 represented by the feature maps are emphasized by the first activation layer 320.

Feature maps 325 output from the first activation layer 320 are input to the second convolution layer 330. One of the feature maps 325 shown in FIG. 3 is a result of processing the feature map 450 described with reference to FIG. 4 in the first activation layer 320.

3×3×4 indicated in the second convolution layer 330 indicates that a convolution process is performed on the feature maps 325 by using four filter kernels having a size of 3×3. An output of the second convolution layer 330 is input to a second activation layer 340. The second activation layer 340 may assign a non-linear feature to input data.

Feature maps 345 output from the second activation layer 340 are input to a third convolution layer 350. 3×3×1 indicated in the third convolution layer 350 shown in FIG. 3 indicates that a convolution process is performed to generate one output image by using one filter kernel having a size of 3×3. The third convolution layer 350 is a layer for outputting a final image and generates one output by using one filter kernel. According to embodiments of the disclosure, the third convolution layer 350 may output the third image 145 as a result of a convolution operation.

There may be a plurality of pieces of DNN setting information indicating the numbers of filter kernels of the first, second, and third convolution layers 310, 330, and 350 of the second DNN 300, a parameter of filter kernels of the first, second, and third convolution layers 310, 330, and 350 of the second DNN 300, and the like, as will be described later, and the plurality of pieces of DNN setting information may be connected to a plurality of pieces of DNN setting information of a first DNN. The connection between the plurality of pieces of DNN setting information of the second DNN and the plurality of pieces of DNN setting information of the first DNN may be realized via joint training of the first DNN and the second DNN.

In FIG. 3, the second DNN 300 includes three convolution layers (the first, second, and third convolution layers 310, 330, and 350) and two activation layers (the first and second activation layers 320 and 340), but this is only an example, and the numbers of convolution layers and activation layers may vary according to embodiments. Also, according to embodiments, the second DNN 300 may be implemented as a recurrent neural network (RNN). In this case, a convolutional neural network (CNN) structure of the second DNN 300 according to embodiments of the disclosure is changed to an RNN structure.

According to embodiments, the AI up-scaler 234 may include at least one arithmetic logic unit (ALU) for the convolution operation and the operation of the activation layer described above. The ALU may be implemented as a processor. For the convolution operation, the ALU may include a multiplier that performs multiplication between sample values of the second image 135 or the feature map output from previous layer and sample values of the filter kernel, and an adder that adds result values of the multiplication. Also, for the operation of the activation layer, the ALU may include a multiplier that multiplies an input sample value by a weight used in a pre-determined sigmoid function, a Tan h function, or an ReLU function, and a comparator that compares a multiplication result and a certain value to determine whether to transmit the input sample value to a next layer.

Hereinafter, a method, performed by the AI up-scaler 234, of performing the AI up-scaling on the second image 135 according to the up-scaling target will be described.

According to embodiments, the AI up-scaler 234 may store a plurality of pieces of DNN setting information settable in a second DNN.

Here, the DNN setting information may include information about any one or any combination of the number of convolution layers included in the second DNN, the number of filter kernels for each convolution layer, and a parameter of each filter kernel. The plurality of pieces of DNN setting information may respectively correspond to various up-scaling targets, and the second DNN may operate based on DNN setting information corresponding to an up-scaling target. The second DNN may have different structures based on the DNN setting information. For example, the second DNN may include three convolution layers based on any piece of DNN setting information, and may include four convolution layers based on another piece of DNN setting information.

According to embodiments, the DNN setting information may only include a parameter of a filter kernel used in the second DNN. In this case, the structure of the second DNN does not change, but only the parameter of the internal filter kernel may change based on the DNN setting information.

The AI up-scaler 234 may obtain the DNN setting information for performing AI up-scaling on the second image 135, among the plurality of pieces of DNN setting information. Each of the plurality of pieces of DNN setting information used at this time is information for obtaining the third image 145 of pre-determined resolution and/or pre-determined quality, and is trained jointly with a first DNN.

For example, one piece of DNN setting information among the plurality of pieces of DNN setting information may include information for obtaining the third image 145 of resolution twice higher than resolution of the second image 135, for example, the third image 145 of 4 K (4096×2160) twice higher than 2 K (2048×1080) of the second image 135, and another piece of DNN setting information may include information for obtaining the third image 145 of resolution four times higher than the resolution of the second image 135, for example, the third image 145 of 8 K (8192×4320) four times higher than 2 K (2048×1080) of the second image 135.

Figure 6:
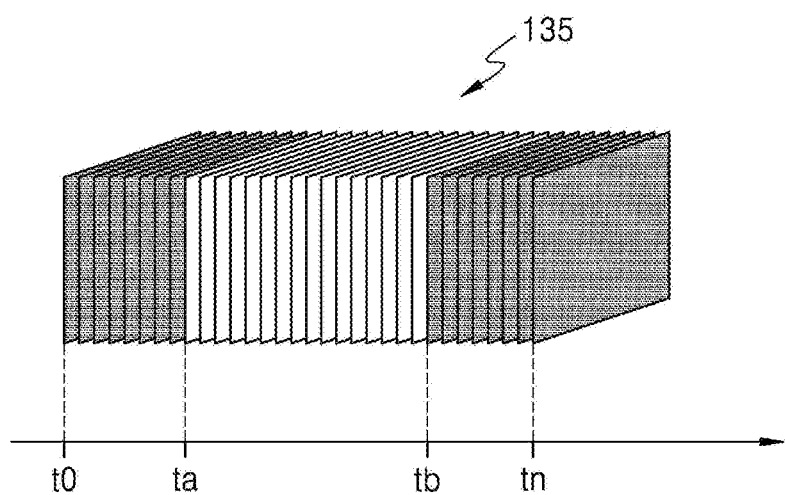
FIG. 6 is a diagram showing a second image including a plurality of frames.

Each of the plurality of pieces of DNN setting information is obtained jointly with DNN setting information of the first DNN of an AI encoding apparatus 600 of FIG. 6, and the AI up-scaler 234 obtains one piece of DNN setting information among the plurality of pieces of DNN setting information according to an enlargement ratio corresponding to a reduction ratio of the DNN setting information of the first DNN. In this regard, the AI up-scaler 234 may verify information of the first DNN. In order for the AI up-scaler 234 to verify the information of the first DNN, the AI decoding apparatus 200 according to embodiments receives AI data including the information of the first DNN from the AI encoding apparatus 600.

In other words, the AI up-scaler 234 may verify information targeted by DNN setting information of the first DNN used to obtain the first image 115 and obtain the DNN setting information of the second DNN trained jointly with the DNN setting information of the first DNN, by using information received from the AI encoding apparatus 600.

When DNN setting information for performing the AI up-scaling on the second image 135 is obtained from among the plurality of pieces of DNN setting information, input data may be processed based on the second DNN operating according to the obtained DNN setting information.

For example, when any one piece of DNN setting information is obtained, the number of filter kernels included in each of the first, second, and third convolution layers 310, 330, and 350 of the second DNN 300 of FIG. 3, and the parameters of the filter kernels are set to values included in the obtained DNN setting information.

Parameters of a filter kernel of 3×3 used in any one convolution layer of the second DNN of FIG. 4 are set to {1, 1, 1, 1, 1, 1, 1, 1, 1}, and when DNN setting information is changed afterwards, the parameters are replaced by {2, 2, 2, 2, 2, 2, 2, 2, 2} that are parameters included in the changed DNN setting information.

The AI up-scaler 234 may obtain the DNN setting information for AI up-scaling from among the plurality of pieces of DNN setting information, based on information included in the AI data, and the AI data used to obtain the DNN setting information will now be described.

According to embodiments, the AI up-scaler 234 may obtain the DNN setting information for AI up-scaling from among the plurality of pieces of DNN setting information, based on difference information included in the AI data. For example, when it is verified that the resolution (for example, 4 K (4096×2160)) of the original image 105 is twice higher than the resolution (for example, 2 K (2048×1080)) of the first image 115, based on the difference information, the AI up-scaler 234 may obtain the DNN setting information for increasing the resolution of the second image 135 two times.

According to embodiments, the AI up-scaler 234 may obtain the DNN setting information for AI up-scaling the second image 135 from among the plurality of pieces of DNN setting information, based on information related to the first image 115 included in the AI data. The AI up-scaler 234 may pre-determine a mapping relationship between image-related information and DNN setting information, and obtain the DNN setting information mapped to the information related to the first image 115.

FIG. 5 is a table showing a mapping relationship between several pieces of image-related information and several pieces of DNN setting information.

Through embodiments according to FIG. 5, it will be determined that AI encoding and AI decoding processes according to embodiments of the disclosure do not only consider a change of resolution. As shown in FIG. 5, DNN setting information may be selected considering resolution, such as standard definition (SD), high definition (HD), or full HD, a bitrate, such as 10 Mbps, 15 Mbps, or 20 Mbps, and codec information, such as AV1, H.264, or HEVC, individually or collectively. For such consideration of the resolution, the bitrate and the codec information, training in consideration of each element may be jointly performed with encoding and decoding processes during an AI training process (see FIG. 9).

Accordingly, when a plurality of pieces of DNN setting information are provided based on image-related information including a codec type, resolution of an image, and the like, as shown in FIG. 5 according to training, the DNN setting information for AI up-scaling the second image 135 may be obtained based on the information related to the first image 115 received during the AI decoding process.

In other words, the AI up-scaler 234 is capable of using DNN setting information according to image-related information by matching the image-related information at the left of a table of FIG. 5 and the DNN setting information at the right of the table.

As shown in FIG. 5, when it is verified, from the information related to the first image 115, that the resolution of the first image 115 is SD, a bitrate of image data obtained as a result of performing first encoding on the first image 115 is 10 Mbps, and the first encoding is performed on the first image 115 via AV1 codec, the AI up-scaler 234 may use A DNN setting information among the plurality of pieces of DNN setting information.

Also, when it is verified, from the information related to the first image 115, that the resolution of the first image 115 is HD, the bitrate of the image data obtained as the result of performing the first encoding is 15 Mbps, and the first encoding is performed via H.264 codec, the AI up-scaler 234 may use B DNN setting information among the plurality of pieces of DNN setting information.

Also, when it is verified, from the information related to the first image 115, that the resolution of the first image 115 is full HD, the bitrate of the image data obtained as the result of performing the first encoding is 20 Mbps, and the first encoding is performed via HEVC codec, the AI up-scaler 234 may use C DNN setting information among the plurality of pieces of DNN setting information, and when it is verified that the resolution of the first image 115 is full HD, the bitrate of the image data obtained as the result of performing the first encoding is 15 Mbps, and the first encoding is performed via HEVC codec, the AI up-scaler 234 may use D DNN setting information among the plurality of pieces of DNN setting information. One of the C DNN setting information and the D DNN setting information is selected based on whether the bitrate of the image data obtained as the result of performing the first encoding on the first image 115 is 20 Mbps or 15 Mbps. The different bitrates of the image data, obtained when the first encoding is performed on the first image 115 of the same resolution via the same codec, indicates different qualities of reconstructed images. Accordingly, a first DNN and a second DNN may be jointly trained based on an image quality, and accordingly, the AI up-scaler 234 may obtain DNN setting information according to a bitrate of image data indicating the quality of the second image 135.

According to embodiments, the AI up-scaler 234 may obtain the DNN setting information for performing AI up-scaling on the second image 135 from among the plurality of pieces of DNN setting information considering both information (prediction mode information, motion information, quantization parameter information, and the like) provided from the first decoder 232 and the information related to the first image 115 included in the AI data. For example, the AI up-scaler 234 may receive quantization parameter information used during a first encoding process of the first image 115 from the first decoder 232, verify a bitrate of image data obtained as an encoding result of the first image 115 from AI data, and obtain DNN setting information corresponding to the quantization parameter information and the bitrate. Even when the bitrates are the same, the quality of reconstructed images may vary according to the complexity of an image. A bitrate is a value representing the entire first image 115 on which first encoding is performed, and the quality of each frame may vary even within the first image 115. Accordingly, DNN setting information more suitable for the second image 135 may be obtained when prediction mode information, motion information, and/or a quantization parameter obtainable for each frame from the first decoder 232 are/is considered together, compared to when only the AI data is used.

Also, according to embodiments, the AI data may include an identifier of mutually agreed DNN setting information. An identifier of DNN setting information is information for distinguishing a pair of pieces of DNN setting information jointly trained between the first DNN and the second DNN, such that AI up-scaling is performed on the second image 135 to the up-scaling target corresponding to the down-scaling target of the first DNN. The AI up-scaler 234 may perform AI up-scaling on the second image 135 by using the DNN setting information corresponding to the identifier of the DNN setting information, after obtaining the identifier of the DNN setting information included in the AI data. For example, identifiers indicating each of the plurality of DNN setting information settable in the first DNN and identifiers indicating each of the plurality of DNN setting information settable in the second DNN may be previously designated. In this case, the same identifier may be designated for a pair of DNN setting information settable in each of the first DNN and the second DNN. The AI data may include an identifier of DNN setting information set in the first DNN for AI down-scaling of the original image 105. The AI up-scaler 234 that receives the AI data may perform AI up-scaling on the second image 135 by using the DNN setting information indicated by the identifier included in the AI data among the plurality of DNN setting information.

Also, according to embodiments, the AI data may include the DNN setting information. The AI up-scaler 234 may perform AI up-scaling on the second image 135 by using the DNN setting information after obtaining the DNN setting information included in the AI data.

According to embodiments, when pieces of information (for example, the number of convolution layers, the number of filter kernels for each convolution layer, a parameter of each filter kernel, and the like) constituting the DNN setting information are stored in a form of a lookup table, the AI up-scaler 234 may obtain the DNN setting information by combining some values selected from values in the lookup table, based on information included in the AI data, and perform AI up-scaling on the second image 135 by using the obtained DNN setting information.

According to embodiments, when a structure of DNN corresponding to the up-scaling target is determined, the AI up-scaler 234 may obtain the DNN setting information, for example, parameters of a filter kernel, corresponding to the determined structure of DNN.

The AI up-scaler 234 obtains the DNN setting information of the second DNN through the AI data including information related to the first DNN, and performs AI up-scaling on the second image 135 through the second DNN set based on the obtained DNN setting information, and in this case, memory usage and throughput may be reduced compared to when features of the second image 135 are directly analyzed for up-scaling.

According to embodiments, when the second image 135 includes a plurality of frames, the AI up-scaler 234 may independently obtain DNN setting information for a certain number of frames, or may obtain common DNN setting information for entire frames.

FIG. 6 is a diagram showing the second image 135 including a plurality of frames.

As shown in FIG. 6, the second image 135 may include frames t0 through tn.

According to embodiments, the AI up-scaler 234 may obtain DNN setting information of a second DNN through AI data, and perform AI up-scaling on the frames t0 through tn based on the obtained DNN setting information. In other words, the frames t0 through tn may be processed via AI up-scaling based on common DNN setting information.

According to embodiments, the AI up-scaler 234 may perform AI up-scaling on some of the frames t0 through tn, for example, the frames t0 through ta, by using 'A' DNN setting information obtained from AI data, and perform AI up-scaling on the frames ta+1 through tb by using 'B' DNN setting information obtained from the AI data. Also, the AI up-scaler 234 may perform AI up-scaling on the frames tb+1 through tn by using 'C' DNN setting information obtained from the AI data. In other words, the AI up-scaler 234 may independently obtain DNN setting information for each group including a number of frames among the plurality of frames, and perform AI up-scaling on frames included in each group by using the independently obtained DNN setting information.

According to embodiments, the AI up-scaler 234 may independently obtain DNN setting information for each frame forming the second image 135. In other words, when the second image 135 includes three frames, the AI up-scaler 234 may perform AI up-scaling on a first frame by using DNN setting information obtained in relation to the first frame, perform AI up-scaling on a second frame by using DNN setting information obtained in relation to the second frame, and perform AI up-scaling on a third frame by using DNN setting information obtained in relation to the third frame. DNN setting information may be independently obtained for each frame included in the second image 135, according to a method of obtaining DNN setting information based on information (prediction mode information, motion information, quantization parameter information, or the like) provided from the first decoder 232 and information related to the first image 115 included in the AI data described above. This is because the mode information, the quantization parameter information, or the like may be determined independently for each frame included in the second image 135.

According to embodiments, the AI data may include information about to which frame DNN setting information obtained based on the AI data is valid. For example, when the AI data includes information indicating that DNN setting information is valid up to the frame ta, the AI up-scaler 234 performs AI up-scaling on the frames t0 through ta by using DNN setting information obtained based on the AI data. Also, when another piece of AI data includes information indicating that DNN setting information is valid up to the frame tn, the AI up-scaler 234 performs AI up-scaling on the frames ta+1 through tn by using DNN setting information obtained based on the other piece of AI data.

Hereinafter, the AI encoding apparatus 600 for performing AI encoding on the original image 105 will be described with reference to FIG. 7.

Figure 7:
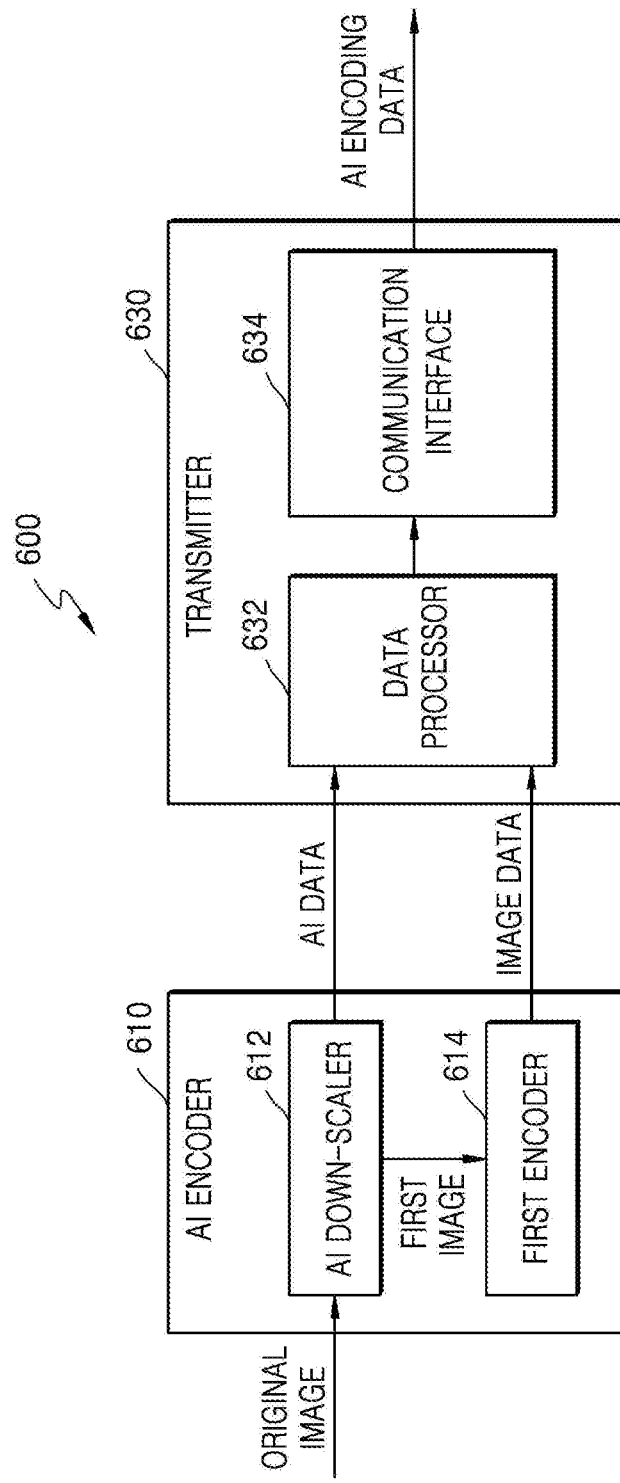
FIG. 7 is a block diagram of a configuration of an AI encoding apparatus according to embodiments.

FIG. 7 is a block diagram of a configuration of the AI encoding apparatus 600 according to embodiments.

Referring to FIG. 7, the AI encoding apparatus 600 may include an AI encoder 610 and a transmitter 630. The AI encoder 610 may include an AI down-scaler 612 and a first encoder 614. The transmitter 630 may include a data processor 632 and a communication interface 634.

In FIG. 7, the AI encoder 610 and the transmitter 630 are illustrated as separate devices, but the AI encoder 610 and the transmitter 630 may be implemented through one processor. In this case, the AI encoder 610 and the transmitter 630 may be implemented through an dedicated processor or through a combination of software and general-purpose processor such as AP, CPU or graphics processing unit GPU. The dedicated processor may be implemented by including a memory for implementing embodiments of the disclosure or by including a memory processor for using an external memory.

Also, the AI encoder 610 and the transmitter 630 may be configured by a plurality of processors. In this case, the AI encoder 610 and the transmitter 630 may be implemented through a combination of dedicated processors or through a combination of software and a plurality of general-purpose processors such as AP, CPU or GPU. The AI down-scaler 612 and the first encoder 614 may be implemented through different processors.

The AI encoder 610 performs AI down-scaling on the original image 105 and first encoding on the first image 115, and transmits AI data and image data to the transmitter 630. The transmitter 630 transmits the AI data and the image data to the AI decoding apparatus 200.

The image data includes data obtained as a result of performing the first encoding on the first image 115. The image data may include data obtained based on pixel values in the first image 115, for example, residual data that is a difference between the first image 115 and prediction data of the first image 115. Also, the image data includes information used during a first encoding process of the first image 115. For example, the image data may include prediction mode information, motion information, quantization parameter information used to perform the first encoding on the first image 115, and the like.

The AI data includes information enabling AI up-scaling to be performed on the second image 135 to an up-scaling target corresponding to a down-scaling target of a first DNN. According to embodiments, the AI data may include difference information between the original image 105 and the first image 115. Also, the AI data may include information related to the first image 115. The information related to the first image 115 may include information about any one or any combination of resolution of the first image 115, a bitrate of the image data obtained as the result of performing the first encoding on the first image 115, and a codec type used during the first encoding of the first image 115.

According to embodiments, the AI data may include an identifier of mutually agreed DNN setting information such that the AI up-scaling is performed on the second image 135 to the up-scaling target corresponding to the down-scaling target of the first DNN.

Also, according to embodiments, the AI data may include DNN setting information settable in a second DNN.

The AI down-scaler 612 may obtain the first image 115 obtained by performing the AI down-scaling on the original image 105 through the first DNN. The AI down-scaler 612 may determine the down-scaling target of the original image 105, based on a pre-determined standard.

In order to obtain the first image 115 matching the down-scaling target, the AI down-scaler 612 may store a plurality of pieces of DNN setting information settable in the first DNN. The AI down-scaler 612 obtains DNN setting information corresponding to the down-scaling target from among the plurality of pieces of DNN setting information, and performs the AI down-scaling on the original image 105 through the first DNN set in the obtained DNN setting information.

Each of the plurality of pieces of DNN setting information may be trained to obtain the first image 115 of pre-determined resolution and/or pre-determined quality. For example, any one piece of DNN setting information among the plurality of pieces of DNN setting information may include information for obtaining the first image 115 of resolution half resolution of the original image 105, for example, the first image 115 of 2 K (2048×1080) half 4 K (4096×2160) of the original image 105, and another piece of DNN setting information may include information for obtaining the first image 115 of resolution quarter resolution of the original image 105, for example, the first image 115 of 2 K (2048×1080) quarter 8 K (8192×4320) of the original image 105.

According to embodiments, when pieces of information (for example, the number of convolution layers, the number of filter kernels for each convolution layer, a parameter of each filter kernel, and the like) constituting the DNN setting information are stored in a form of a lookup table, the AI down-scaler 612 may obtain the DNN setting information by combining some values selected from values in the lookup table, based on the down-scaling target, and perform AI down-scaling on the original image 105 by using the obtained DNN setting information.

According to embodiments, the AI down-scaler 612 may determine a structure of DNN corresponding to the down-scaling target, and obtain DNN setting information corresponding to the determined structure of DNN, for example, obtain parameters of a filter kernel.

The plurality of pieces of DNN setting information for performing the AI down-scaling on the original image 105 may have an optimized value as the first DNN and the second DNN are jointly trained. Here, each piece of DNN setting information includes any one or any combination of the number of convolution layers included in the first DNN, the number of filter kernels for each convolution layer, and a parameter of each filter kernel.

The AI down-scaler 612 may set the first DNN with the DNN setting information obtained for performing the AI down-scaling on the original image 105 to obtain the first image 115 of a certain resolution and/or a certain quality through the first DNN. When the DNN setting information for performing the AI down-scaling on the original image 105 is obtained from the plurality of pieces of DNN setting information, each layer in the first DNN may process input data based on information included in the DNN setting information.

Hereinafter, a method, performed by the AI down-scaler 612, of determining the down-scaling target will be described. The down-scaling target may indicate, for example, by how much is resolution decreased from the original image 105 to obtain the first image 115.

According to embodiments, the AI down-scaler 612 may determine the down-scaling target based on any one or any combination of a compression ratio (for example, a resolution difference between the original image 105 and the first image 115, target bitrate, or the like), compression quality (for example, type of bitrate), compression history information, and a type of the original image 105.

For example, the AI down-scaler 612 may determine the down-scaling target based on the compression ratio, the compression quality, or the like, which is pre-set or input from a user.

As another example, the AI down-scaler 612 may determine the down-scaling target by using the compression history information stored in the AI encoding apparatus 600. For example, according to the compression history information usable by the AI encoding apparatus 600, encoding quality, a compression ratio, or the like preferred by the user may be determined, and the down-scaling target may be determined according to the encoding quality determined based on the compression history information. For example, the resolution, quality, or the like of the first image 115 may be determined according to the encoding quality that has been used most often according to the compression history information.

As another example, the AI down-scaler 612 may determine the down-scaling target based on the encoding quality that has been used more frequently than a certain threshold value (for example, average quality of the encoding quality that has been used more frequently than the threshold value), according to the compression history information.

As another example, the AI down-scaler 612 may determine the down-scaling target, based on the resolution, type (for example, a file format), or the like of the original image 105.

According to embodiments, when the original image 105 includes a plurality of frames, the AI down-scaler 612 may independently determine down-scaling target for a certain number of frames, or may determine down-scaling target for entire frames.

According to embodiments, the AI down-scaler 612 may divide the frames included in the original image 105 into a certain number of groups, and independently determine the down-scaling target for each group. The same or different down-scaling targets may be determined for each group. The number of frames included in the groups may be the same or different according to the each group.

According to embodiments, the AI down-scaler 612 may independently determine a down-scaling target for each frame included in the original image 105. The same or different down-scaling targets may be determined for each frame.

Hereinafter, an example of a structure of a first DNN 700 on which AI down-scaling is based will be described.

Figure 8:
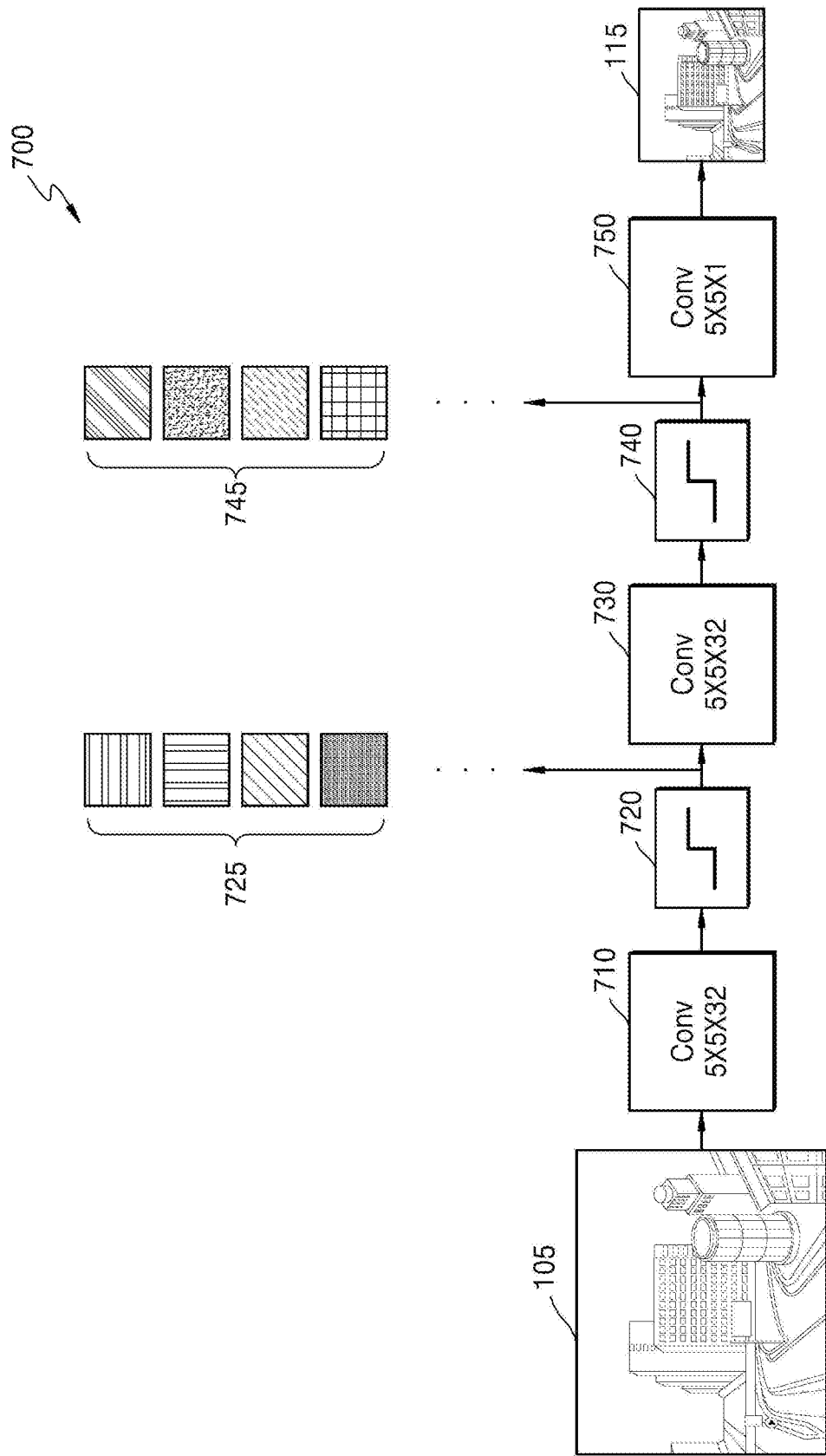
FIG. 8 is a diagram showing a first DNN for performing AI down-scaling on an original image.

FIG. 8 is a diagram showing the first DNN 700 for performing AI down-scaling on the original image 105.

As shown in FIG. 8, the original image 105 is input to a first convolution layer 710. The first convolution layer 710 performs a convolution process on the original image 105 by using 32 filter kernels having a size of 5×5. 32 feature maps generated as a result of the convolution process are input to a first activation layer 720. The first activation layer 720 may assign a non-linear feature to the 32 feature maps.

The first activation layer 720 determines whether to transmit sample values of the feature maps output from the first convolution layer 710 to a second convolution layer 730. For example, some of the sample values of the feature maps are activated by the first activation layer 720 and transmitted to the second convolution layer 730, and some of the sample values are deactivated by the first activation layer 720 and not transmitted to the second convolution layer 730. Information represented by the feature maps output from the first convolution layer 710 is emphasized by the first activation layer 720.

An output 725 of the first activation layer 720 is input to a second convolution layer 730. The second convolution layer 730 performs a convolution process on input data by using 32 filter kernels having a size of 5×5. 32 feature maps output as a result of the convolution process are input to a second activation layer 740, and the second activation layer 740 may assign a non-linear feature to the 32 feature maps.

An output 745 of the second activation layer 740 is input to a third convolution layer 750. The third convolution layer 750 performs a convolution process on input data by using one filter kernel having a size of 5×5. As a result of the convolution process, one image may be output from the third convolution layer 750. The third convolution layer 750 generates one output by using the one filter kernel as a layer for outputting a final image. According to embodiments of the disclosure, the third convolution layer 750 may output the first image 115 as a result of a convolution operation.

There may be a plurality of pieces of DNN setting information indicating the numbers of filter kernels of the first, second, and third convolution layers 710, 730, and 750 of the first DNN 700, a parameter of each filter kernel of the first, second, and third convolution layers 710, 730, and 750 of the first DNN 700, and the like, and the plurality of pieces of DNN setting information may be connected to a plurality of pieces of DNN setting information of a second DNN. The connection between the plurality of pieces of DNN setting information of the first DNN and the plurality of pieces of DNN setting information of the second DNN may be realized via joint training of the first DNN and the second DNN.

In FIG. 8, the first DNN 700 includes three convolution layers (the first, second, and third convolution layers 710, 730, and 750) and two activation layers (the first and second activation layers 720 and 740), but this is only an example, and the numbers of convolution layers and activation layers may vary according to embodiments. Also, according to embodiments, the first DNN 700 may be implemented as an RNN. In this case, a CNN structure of the first DNN 700 according to embodiments of the disclosure is changed to an RNN structure.

According to embodiments, the AI down-scaler 612 may include at least one ALU for the convolution operation and the operation of the activation layer described above. The ALU may be implemented as a processor. For the convolution operation, the ALU may include a multiplier that performs multiplication between sample values of the original image 105 or the feature map output from previous layer and sample values of the filter kernel, and an adder that adds result values of the multiplication. Also, for the operation of the activation layer, the ALU may include a multiplier that multiplies an input sample value by a weight used in a pre-determined sigmoid function, a Tan h function, or an ReLU function, and a comparator that compares a multiplication result and a certain value to determine whether to transmit the input sample value to a next layer.

Referring back to FIG. 7, upon receiving the first image 115 from the AI down-scaler 612, the first encoder 614 may reduce an information amount of the first image 115 by performing first encoding on the first image 115. The image data corresponding to the first image 115 may be obtained as a result of performing the first encoding by the first encoder 614.

The data processor 632 processes either one or both of the AI data or the image data to be transmitted in a certain form. For example, when the AI data and the image data are to be transmitted in a form of a bitstream, the data processor 632 may process the AI data to be expressed in a form of a bitstream, and transmit the image data and the AI data in a form of one bitstream through the communication interface 634. As another example, the data processor 632 may process the AI data to be expressed in a form of bitstream, and transmit each of a bitstream corresponding to the AI data and a bitstream corresponding to the image data through the communication interface 634. As another example, the data processor 632 may process the AI data to be expressed in a form of a frame or packet, and transmit the image data in a form of a bitstream and the AI data in a form of a frame or packet through the communication interface 634.

The communication interface 634 transmits AI encoding data obtained as a result of performing AI encoding, through a network. The AI encoding data obtained as the result of performing AI encoding includes the image data and the AI data. The image data and the AI data may be transmitted through a same type of network or different types of networks.

According to embodiments, the AI encoding data obtained as a result of processes of the data processor 632 may be stored in a data storage medium including a magnetic medium such as a hard disk, a floppy disk, or a magnetic tape, an optical recording medium such as CD-ROM or DVD, or a magneto-optical medium such as a floptical disk.

Hereinafter, a method of jointly training the first DNN 700 and the second DNN 300 will be described with reference to FIG. 9.

Figure 9:
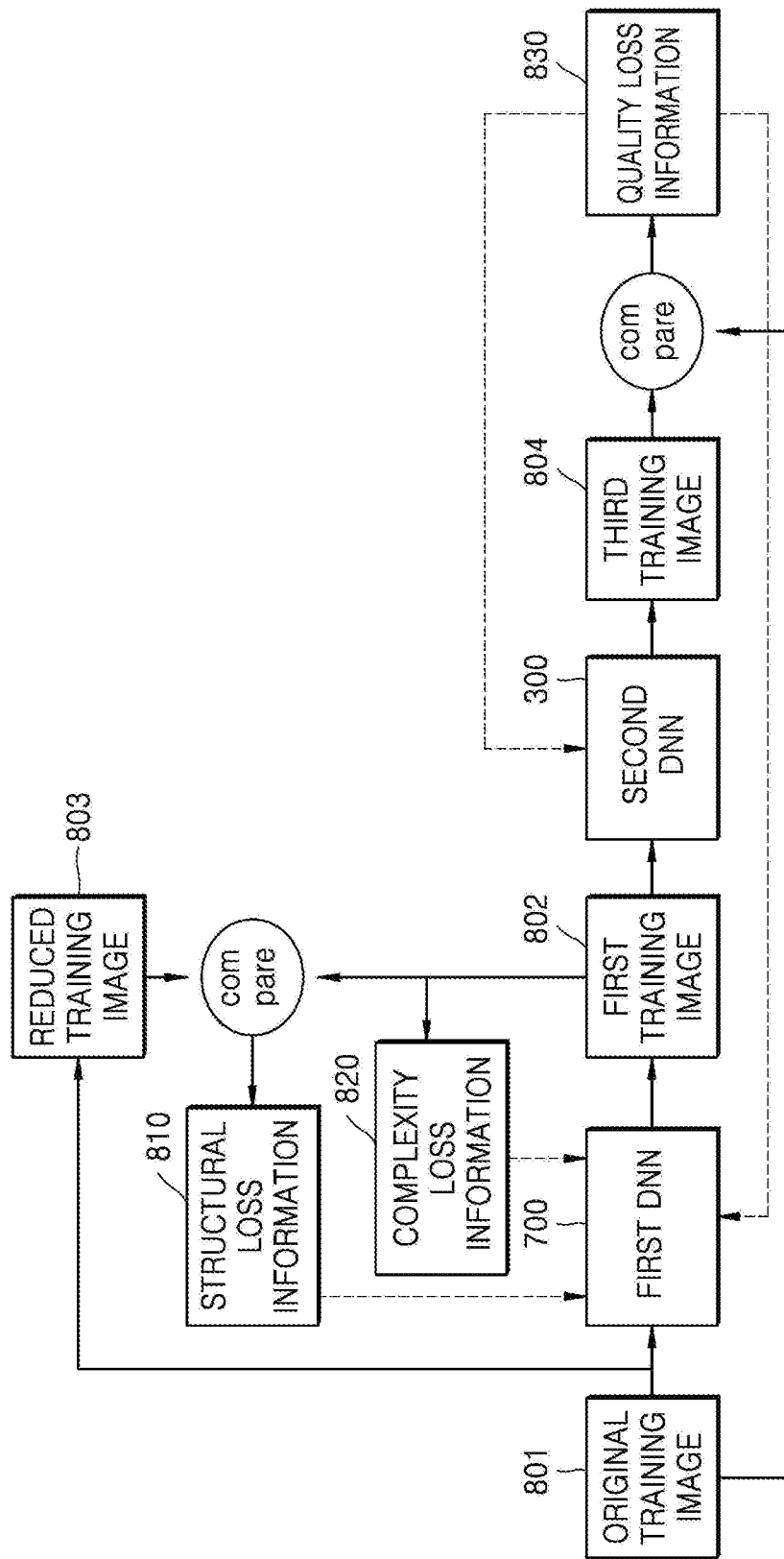
FIG. 9 is a diagram for describing a method of training a first DNN and a second DNN.

FIG. 9 is a diagram for describing a method of training the first DNN 700 and the second DNN 300.

In embodiments, the original image 105 on which AI encoding is performed is reconstructed to the third image 145 via an AI decoding process, and to maintain similarity between the original image 105 and the third image 145 obtained as a result of AI decoding, connectivity is established between the AI encoding process and the AI decoding process. In other words, information lost in the AI encoding process is reconstructed during the AI decoding process, and in this regard, the first DNN 700 and the second DNN 300 are jointly trained.

For accurate AI decoding, ultimately, quality loss information 830 corresponding to a result of comparing a third training image 804 and an original training image 801 shown in FIG. 9 may be reduced. Accordingly, the quality loss information 830 is used to train both of the first DNN 700 and the second DNN 300.

First, a training process shown in FIG. 9 will be described.

In FIG. 9, the original training image 801 is an image on which AI down-scaling is to be performed and a first training image 802 is an image obtained by performing AI down-scaling on the original training image 801. Also, the third training image 804 is an image obtained by performing AI up-scaling on the first training image 802.

The original training image 801 includes a still image or a moving image including a plurality of frames. According to embodiments, the original training image 801 may include a luminance image extracted from the still image or the moving image including the plurality of frames. Also, according to embodiments, the original training image 801 may include a patch image extracted from the still image or the moving image including the plurality of frames. When the original training image 801 includes the plurality of frames, the first training image 802, the second training image, and the third training image 804 also each include a plurality of frames. When the plurality of frames of the original training image 801 are sequentially input to the first DNN 700, the plurality of frames of the first training image 802, the second training image and the third training image 804 may be sequentially obtained through the first DNN 700 and the second DNN 300.

For joint training of the first DNN 700 and the second DNN 300, the original training image 801 is input to the first DNN 700. The original training image 801 input to the first DNN 700 is output as the first training image 802 via the AI down-scaling, and the first training image 802 is input to the second DNN 300. The third training image 804 is output as a result of performing the AI up-scaling on the first training image 802.

Referring to FIG. 9, the first training image 802 is input to the second DNN 300, and according to embodiments, a second training image obtained as first encoding and first decoding are performed on the first training image 802 may be input to the second DNN 300. In order to input the second training image to the second DNN 300, any one codec among MPEG-2, H.264, MPEG-4, HEVC, VC-1, VP8, VP9, and AV1 may be used. Any one codec among MPEG-2, H.264, MPEG-4, HEVC, VC-1, VP8, VP9, and AV1 may be used to perform first encoding on the first training image 802 and first decoding on image data corresponding to the first training image 802.

Referring to FIG. 9, separate from the first training image 802 being output through the first DNN 700, a reduced training image 803 obtained by performing legacy down-scaling on the original training image 801 is obtained. Here, the legacy down-scaling may include any one or any combination of bilinear scaling, bicubic scaling, lanczos scaling, or stair step scaling.

To prevent a structural feature of the first image 115 from deviating greatly from a structural feature of the original image 105, the reduced training image 803 is obtained to preserve the structural feature of the original training image 801.

Before training is performed, the first DNN 700 and the second DNN 300 may be set to pre-determined DNN setting information. When the training is performed, structural loss information 810, complexity loss information 820, and the quality loss information 830 may be determined.

The structural loss information 810 may be determined based on a result of comparing the reduced training image 803 and the first training image 802. For example, the structural loss information 810 may correspond to a difference between structural information of the reduced training image 803 and structural information of the first training image 802. Structural information may include various features extractable from an image, such as luminance, contrast, histogram, or the like of the image. The structural loss information 810 indicates how much structural information of the original training image 801 is maintained in the first training image 802. When the structural loss information 810 is small, the structural information of the first training image 802 is similar to the structural information of the original training image 801.

The complexity loss information 820 may be determined based on spatial complexity of the first training image 802. For example, a total variance value of the first training image 802 may be used as the spatial complexity. The complexity loss information 820 is related to a bitrate of image data obtained by performing first encoding on the first training image 802. It is defined that the bitrate of the image data is low when the complexity loss information 820 is small.

The quality loss information 830 may be determined based on a result of comparing the original training image 801 and the third training image 804. The quality loss information 830 may include any one or any combination of an L1-norm value, an L2-norm value, an Structural Similarity (SSIM) value, a Peak Signal-To-Noise Ratio-Human Vision System (PSNR-HVS) value, an Multiscale SSIM (MS-SSIM) value, a Variance Inflation Factor (VIF) value, and a Video Multimethod Assessment Fusion (VMAF) value regarding the difference between the original training image 801 and the third training image 804. The quality loss information 830 indicates how similar the third training image 804 is to the original training image 801. The third training image 804 is more similar to the original training image 801 when the quality loss information 830 is small.

Referring to FIG. 9, the structural loss information 810, the complexity loss information 820 and the quality loss information 830 are used to train the first DNN 700, and the quality loss information 830 is used to train the second DNN 300. In other words, the quality loss information 830 is used to train both the first and second DNNs 700 and 300.

The first DNN 700 may update a parameter such that final loss information determined based on the structural loss information 810, the complexity loss information 820, and the quality loss information 830 is reduced or minimized. Also, the second DNN 300 may update a parameter such that the quality loss information 830 is reduced or minimized.

The final loss information for training the first DNN 700 and the second DNN 300 may be determined as Equation 1 below.

$$\text{LossDS} = a \times \text{Structural loss information} + b \times \text{Complexity loss information} + c \times \text{Quality loss information}$$

$$\text{LossUS} = d \times \text{Quality loss information} \qquad \text{[Equation 1]}$$

In Equation 1, LossDS indicates final loss information to be reduced or minimized to train the first DNN 700, and LossUS indicates final loss information to be reduced or minimized to train the second DNN 300. Also, a, b, c and d may be predetermined weights.

In other words, the first DNN 700 updates parameters in a direction LossDS of Equation 1 is reduced, and the second DNN 300 updates parameters in a direction LossUS is reduced. When the parameters of the first DNN 700 are updated according to LossDS derived during the training, the first training image 802 obtained based on the updated parameters becomes different from a previous first training image 802 obtained based on not updated parameters, and accordingly, the third training image 804 also becomes different from a previous third training image 804. When the third training image 804 becomes different from the previous third training image 804, the quality loss information 830 is also newly determined, and the second DNN 300 updates the parameters accordingly. When the quality loss information 830 is newly determined, LossDS is also newly determined, and the first DNN 700 updates the parameters according to newly determined LossDS. In other words, updating of the parameters of the first DNN 700 leads to updating of the parameters of the second DNN 300, and updating of the parameters of the second DNN 300 leads to updating of the parameters of the first DNN 700. In other words, because the first DNN 700 and the second DNN 300 are jointly trained by sharing the quality loss information 830, the parameters of the first DNN 700 and the parameters of the second DNN 300 may be jointly optimized.

Referring to Equation 1, it is verified that LossUS is determined according to the quality loss information 830, but this is only an example and LossUS may be determined based on any one or any combination of the structural loss information 810 and the complexity loss information 820, and the quality loss information 830.

Hereinabove, it has been described that the AI up-scaler 234 of the AI decoding apparatus 200 and the AI down-scaler 612 of the AI encoding apparatus 600 store the plurality of pieces of DNN setting information, and methods of training each of the plurality of pieces of DNN setting information stored in the AI up-scaler 234 and the AI down-scaler 612 will now be described.

As described with reference to Equation 1, the first DNN 700 updates the parameters based on the similarity (the structural loss information 810) between the structural information of the first training image 802 and the structural information of the original training image 801, the bitrate (the complexity loss information 820) of the image data obtained as a result of performing first encoding on the first training image 802, and the difference (the quality loss information 830) between the third training image 804 and the original training image 801.

The parameters of the first DNN 700 may be updated such that the first training image 802 having similar structural information as the original training image 801 is obtained and the image data having a small bitrate is obtained when first encoding is performed on the first training image 802, and at the same time, the second DNN 300 performing AI up-scaling on the first training image 802 obtains the third training image 804 similar to the original training image 801.

A direction in which the parameters of the first DNN 700 are optimized may vary by adjusting the weights a, b, and c of Equation 1. For example, when the weight b is determined to be high, the parameters of the first DNN 700 may be updated by prioritizing a low bitrate over high quality of the third training image 804. Also, when the weight c is determined to be high, the parameters of the first DNN 700 may be updated by prioritizing high quality of the third training image 804 over a high bitrate or maintaining of the structural information of the original training image 801.

Also, the direction in which the parameters of the first DNN 700 are optimized may vary according to a type of codec used to perform first encoding on the first training image 802. This is because the second training image to be input to the second DNN 300 may vary according to the type of codec.

In other words, the parameters of the first DNN 700 and the parameters of the second DNN 300 may be jointly updated based on the weights a, b, and c, and the type of codec for performing first encoding on the first training image 802. Accordingly, when the first DNN 700 and the second DNN 300 are trained after determining the weights a, b, and c each to a certain value and determining the type of codec to a certain type, the parameters of the first DNN 700 and the parameters of the second DNN 300 connected and optimized to each other may be determined.

Also, when the first DNN 700 and the second DNN 300 are trained after changing the weights a, b, and c, and the type of codec, the parameters of the first DNN 700 and the parameters of the second DNN 300 connected and optimized to each other may be determined. In other words, the plurality of pieces of DNN setting information jointly trained with each other may be determined in the first DNN 700 and the second DNN 300 when the first DNN 700 and the second DNN 300 are trained while changing values of the weights a, b, and c, and the type of codec.

As described above with reference to FIG. 5, the plurality of pieces of DNN setting information of the first DNN 700 and the second DNN 300 may be mapped to the information related to the first image. To set such a mapping relationship, first encoding may be performed on the first training image 802 output from the first DNN 700 via a certain codec according to a certain bitrate and the second training image obtained by performing first decoding on a bitstream obtained as a result of performing the first encoding may be input to the second DNN 300. In other words, by training the first DNN 700 and the second DNN 300 after setting an environment such that the first encoding is performed on the first training image 802 of a certain resolution via the certain codec according to the certain bitrate, a DNN setting information pair mapped to the resolution of the first training image 802, a type of the codec used to perform the first encoding on the first training image 802, and the bitrate of the bitstream obtained as a result of performing the first encoding on the first training image 802 may be determined. By variously changing the resolution of the first training image 802, the type of codec used to perform the first encoding on the first training image 802 and the bitrate of the bitstream obtained according to the first encoding of the first training image 802, the mapping relationships between the plurality of DNN setting information of the first DNN 700 and the second DNN 300 and the pieces of information related to the first image may be determined.

Figure 10:
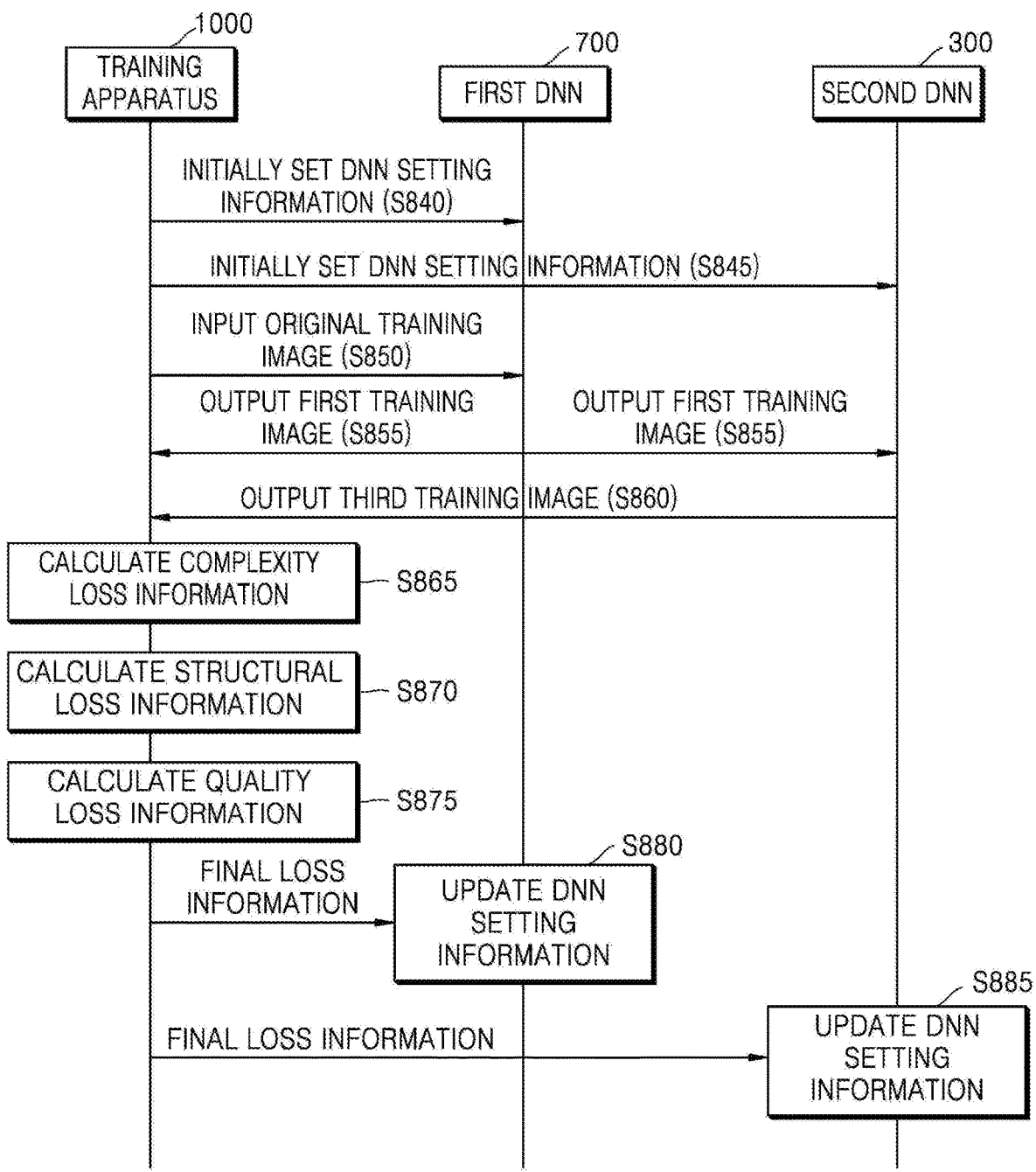
FIG. 10 is a diagram for describing a training process of a first DNN and a second DNN by a training apparatus.

FIG. 10 is a diagram for describing training processes of the first DNN 700 and the second DNN by a training apparatus 1000.

The training of the first DNN 700 and the second DNN 300 described with reference FIG. 9 may be performed by the training apparatus 1000. The training apparatus 1000 includes the first DNN 700 and the second DNN 300. The training apparatus 1000 may be, for example, the AI encoding apparatus 600 or a separate server. The DNN setting information of the second DNN 300 obtained as the training result is stored in the AI decoding apparatus 200.

Referring to FIG. 10, the training apparatus 1000 initially sets the DNN setting information of the first DNN 700 and the second DNN 300, in operations S840 and S845. Accordingly, the first DNN 700 and the second DNN 300 may operate according to pre-determined DNN setting information. The DNN setting information may include information about any one or any combination of the number of convolution layers included in the first DNN 700 and the second DNN 300, the number of filter kernels for each convolution layer, the size of a filter kernel for each convolution layer, or a parameter of each filter kernel.

The training apparatus 1000 inputs the original training image 801 into the first DNN 700, in operation S850. The original training image 801 may include a still image or at least one frame included in a moving image.

The first DNN 700 processes the original training image 801 according to the initially set DNN setting information and outputs the first training image 802 obtained by performing AI down-scaling on the original training image 801, in operation S855. In FIG. 10, the first training image 802 output from the first DNN 700 is directly input to the second DNN 300, but the first training image 802 output from the first DNN 700 may be input to the second DNN 300 by the training apparatus 1000. Also, the training apparatus 1000 may perform first encoding and first decoding on the first training image 802 via a certain codec, and then input the second training image to the second DNN 300.

The second DNN 300 processes the first training image 802 or the second training image according to the initially set DNN setting information and outputs the third training image 804 obtained by performing AI up-scaling on the first training image 802 or the second training image, in operation S860.

The training apparatus 1000 calculates the complexity loss information 820, based on the first training image 802, in operation S865.

The training apparatus 1000 calculates the structural loss information 810 by comparing the reduced training image 803 and the first training image 802, in operation S870.

The training apparatus 1000 calculates the quality loss information 830 by comparing the original training image 801 and the third training image 804, in operation S875.

The initially set DNN setting information is updated in operation S880 via a back propagation process based on the final loss information. The training apparatus 1000 may calculate the final loss information for training the first DNN 700, based on the complexity loss information 820, the structural loss information 810, and the quality loss information 830.

The second DNN 300 updates the initially set DNN setting information in operation S885 via a back propagation process based on the quality loss information 830 or the final loss information. The training apparatus 1000 may calculate the final loss information for training the second DNN 300, based on the quality loss information 830.

Then, the training apparatus 1000, the first DNN 700, and the second DNN 300 may repeat operations S850 through S885 until the final loss information is minimized to update the DNN setting information. At this time, during each repetition, the first DNN 700 and the second DNN 300 operate according to the DNN setting information updated in the previous operation.

Table 1 below shows effects when AI encoding and AI decoding are performed on the original image 105 according to embodiments of the disclosure and when encoding and decoding are performed on the original image 105 via HEVC.

TABLE 1

| Content | Resolution | Frame Number | Information Amount (Bitrate) (Mbps) | | Subjective Image Quality Score (VMAF) | |
|---|---|---|---|---|---|---|
| | | | HEVC | AI Encoding/ AI Decoding | HEVC | AI Encoding/ AI Decoding |
| Content_01 | 8K | 300 frames | 46.3 | 21.4 | 94.80 | 93.54 |
| Content_02 | (7680 × 4320) | | 46.3 | 21.6 | 98.05 | 98.98 |
| Content_03 | | | 46.3 | 22.7 | 96.08 | 96.00 |
| Content_04 | | | 46.1 | 22.1 | 86.26 | 92.00 |
| Content_05 | | | 45.4 | 22.7 | 93.42 | 92.98 |
| Content_06 | | | 46.3 | 23.0 | 95.99 | 95.61 |
| | | Average | 46.11 | 22.25 | 94.10 | 94.85 |

As shown in Table 1, despite subjective image quality when AI encoding and AI decoding are performed on content including 300 frames of 8 K resolution, according to embodiments of the disclosure, is higher than subjective image quality when encoding and decoding are performed via HEVC, a bitrate is reduced by at least 50%.

Figure 11:
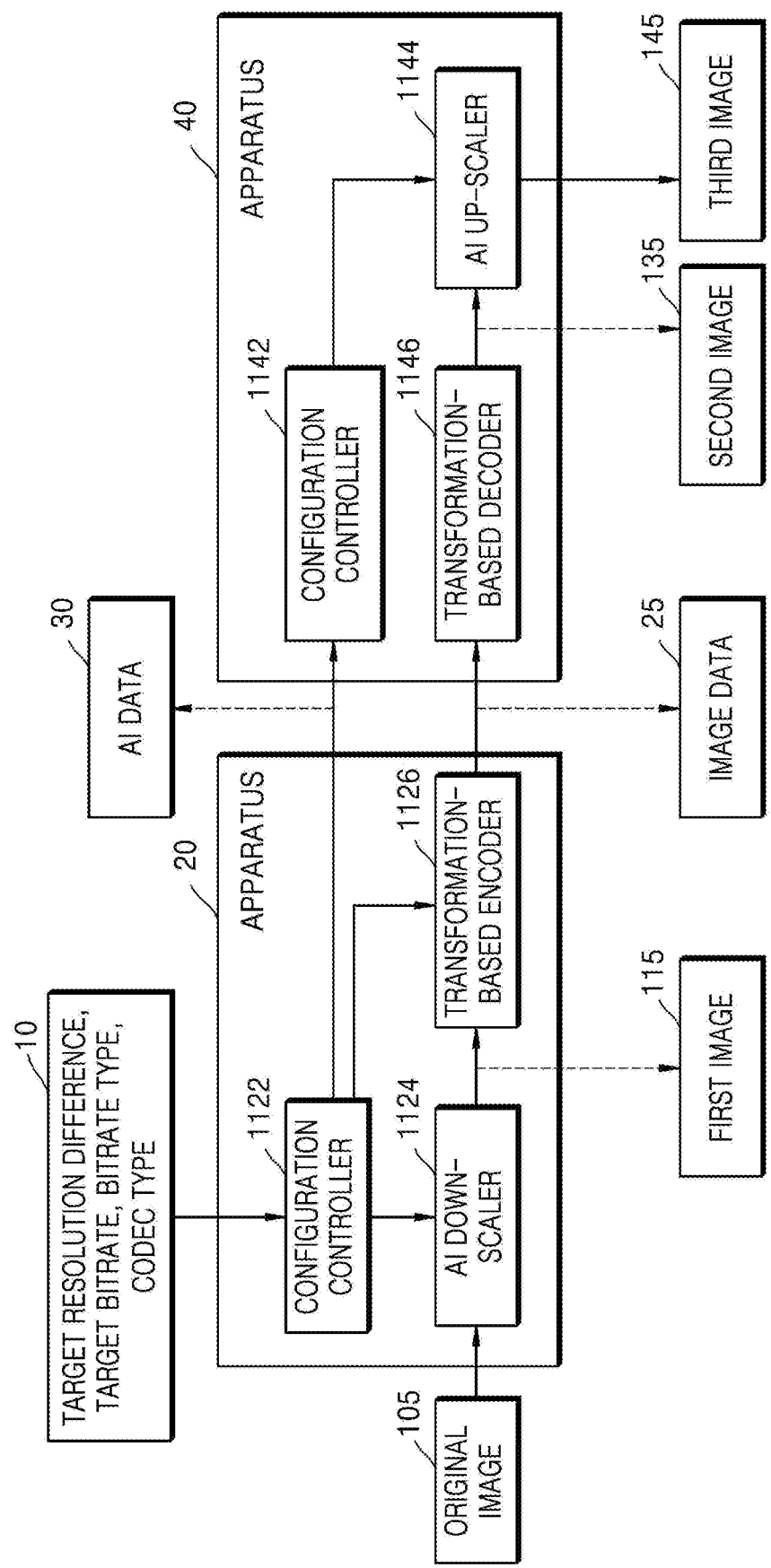
FIG. 11 is a diagram of an apparatus for performing AI down-scaling on an original image and an apparatus for performing AI up-scaling on a second image.

FIG. 11 is a diagram of a first apparatus 20 for performing AI down-scaling on the original image 105 and a second apparatus 40 for performing AI up-scaling on the second image 135.

The first apparatus 20 receives the original image 105 and provides image data 25 and AI data 30 to the second apparatus 40 by using an AI down-scaler 1124 and a transformation-based encoder 1126. According to embodiments, the image data 25 corresponds to the image data of FIG. 1 and the AI data 30 corresponds to the AI data of FIG. 1. Also, according to embodiments, the transformation-based encoder 1126 corresponds to the first encoder 614 of FIG. 7 and the AI down-scaler 1124 corresponds to the AI down-scaler 612 of FIG. 7.

The second apparatus 40 receives the AI data 30 and the image data 25 and obtains the third image 145 by using a transformation-based decoder 1146 and an AI up-scaler 1144. According to embodiments, the transformation-based decoder 1146 corresponds to the first decoder 232 of FIG. 2 and the AI up-scaler 1144 corresponds to the AI up-scaler 234 of FIG. 2.

According to embodiments, the first apparatus 20 includes a CPU, a memory, and a computer program including instructions. The computer program is stored in the memory. According to embodiments, the first apparatus 20 performs functions to be described with reference to FIG. 11 according to execution of the computer program by the CPU. According to embodiments, the functions to be described with reference to FIG. 11 are performed by a dedicated hardware chip and/or the CPU.

According to embodiments, the second apparatus 40 includes a CPU, a memory, and a computer program including instructions. The computer program is stored in the memory. According to embodiments, the second apparatus 40 performs functions to be described with reference to FIG. 11 according to execution of the computer program by the CPU. According to embodiments, the functions to be described with reference to FIG. 11 are performed by a dedicated hardware chip and/or the CPU.

In FIG. 11, a configuration controller 1122 of the first apparatus 20 receives at least one input value 10. According to embodiments, the at least one input value 10 may include any one or any combination of a target resolution difference for the AI down-scaler 1124 and the AI up-scaler 1144, a bitrate of the image data 25, a bitrate type of the image data 25 (for example, a variable bitrate type, a constant bitrate type, or an average bitrate type), and a codec type for the transformation-based encoder 1126. The at least one input value 10 may include a value pre-stored in the first apparatus 20 or a value input from a user.

The configuration controller 1122 controls operations of the AI down-scaler 1124 and the transformation-based encoder 1126, based on the received input value 10. According to embodiments, the configuration controller 1122 obtains DNN setting information for the AI down-scaler 1124 according to the received input value 10, and sets the AI down-scaler 1124 with the obtained DNN setting information. According to embodiments, the configuration controller 1122 may transmit the received input value 10 to the AI down-scaler 1124 and the AI down-scaler 1124 may obtain the DNN setting information for performing AI down-scaling on the original image 105, based on the received input value 10. According to embodiments, the configuration controller 1122 may provide, to the AI down-scaler 1124, additional information, for example, color format (luminance component, chrominance component, red component, green component, or blue component) information to which AI down-scaling is applied and tone mapping information of a high dynamic range (HDR), together with the input value 10, and the AI down-scaler 1124 may obtain the DNN setting information considering the input value 10 and the additional information. According to embodiments, the configuration controller 1122 transmits at least a part of the received input value 10 to the transformation-based encoder 1126 and the transformation-based encoder 1126 performs first encoding on the first image 115 via a bitrate of a certain value, a bitrate of a certain type, and a certain codec.

The AI down-scaler 1124 receives the original image 105 and performs an operation described with reference to any one or any combination of FIGS. 1, 7, 8, 9, and 10 to obtain the first image 115.

According to embodiments, the AI data 30 is provided to the second apparatus 40. The AI data 30 may include either one or both of resolution difference information between the original image 105 and the first image 115, and information related to the first image 115. The resolution difference information may be determined based on the target resolution difference of the input value 10, and the information related to the first image 115 may be determined based on at least one of a target bitrate, the bitrate type, or the codec type. According to embodiments, the AI data 30 may include parameters used during the AI up-scaling. The AI data 30 may be provided from the AI down-scaler 1124 to the second apparatus 40.

The image data 25 is obtained as the original image 105 is processed by the transformation-based encoder 1126, and is transmitted to the second apparatus 40. The transformation-based encoder 1126 may process the first image 115 according to MPEG-2, H.264 AVC, MPEG-4, HEVC, VC-1, VP8, VP9, or VA1.

A configuration controller 1142 of the second apparatus 40 controls an operation of the AI up-scaler 1144, based on the AI data 30. According to embodiments, the configuration controller 1142 obtains the DNN setting information for the AI up-scaler 1144 according to the received AI data 30, and sets the AI up-scaler 1144 with the obtained DNN setting information. According to embodiments, the configuration controller 1142 may transmit the received AI data 30 to the AI up-scaler 1144 and the AI up-scaler 1144 may obtain the DNN setting information for performing AI up-scaling on the second image 135, based on the AI data 30. According to embodiments, the configuration controller 1142 may provide, to the AI up-scaler 1144, additional information, for example, the color format (luminance component, chrominance component, red component, green component, or blue component) information to which AI up-scaling is applied, and the tone mapping information of HDR, together with the AI data 30, and the AI up-scaler 1144 may obtain the DNN setting information considering the AI data 30 and the additional information.

According to embodiments, the AI up-scaler 1144 may receive the AI data 30 from the configuration controller 1142, receive at least one of prediction mode information, motion information, or quantization parameter information from the transformation-based decoder 1146, and obtain the DNN setting information based on the AI data 30 and any one or any combination of the prediction mode information, the motion information, and the quantization parameter information.

The transformation-based decoder 1146 may process the image data 25 to reconstruct the second image 135. The transformation-based decoder 1146 may process the image data 25 according to MPEG-2, H.264 AVC, MPEG-4, HEVC, VC-1, VP8, VP9, or AV1.

The AI up-scaler 1144 may obtain the third image 145 by performing AI up-scaling on the second image 135 provided from the transformation-based decoder 1146, based on the set DNN setting information.

The AI down-scaler 1124 may include a first DNN and the AI up-scaler 1144 may include a second DNN, and according to embodiments, DNN setting information for the first DNN and second DNN are trained according to the training method described with reference to FIGS. 9 and 10.

Figure 12:
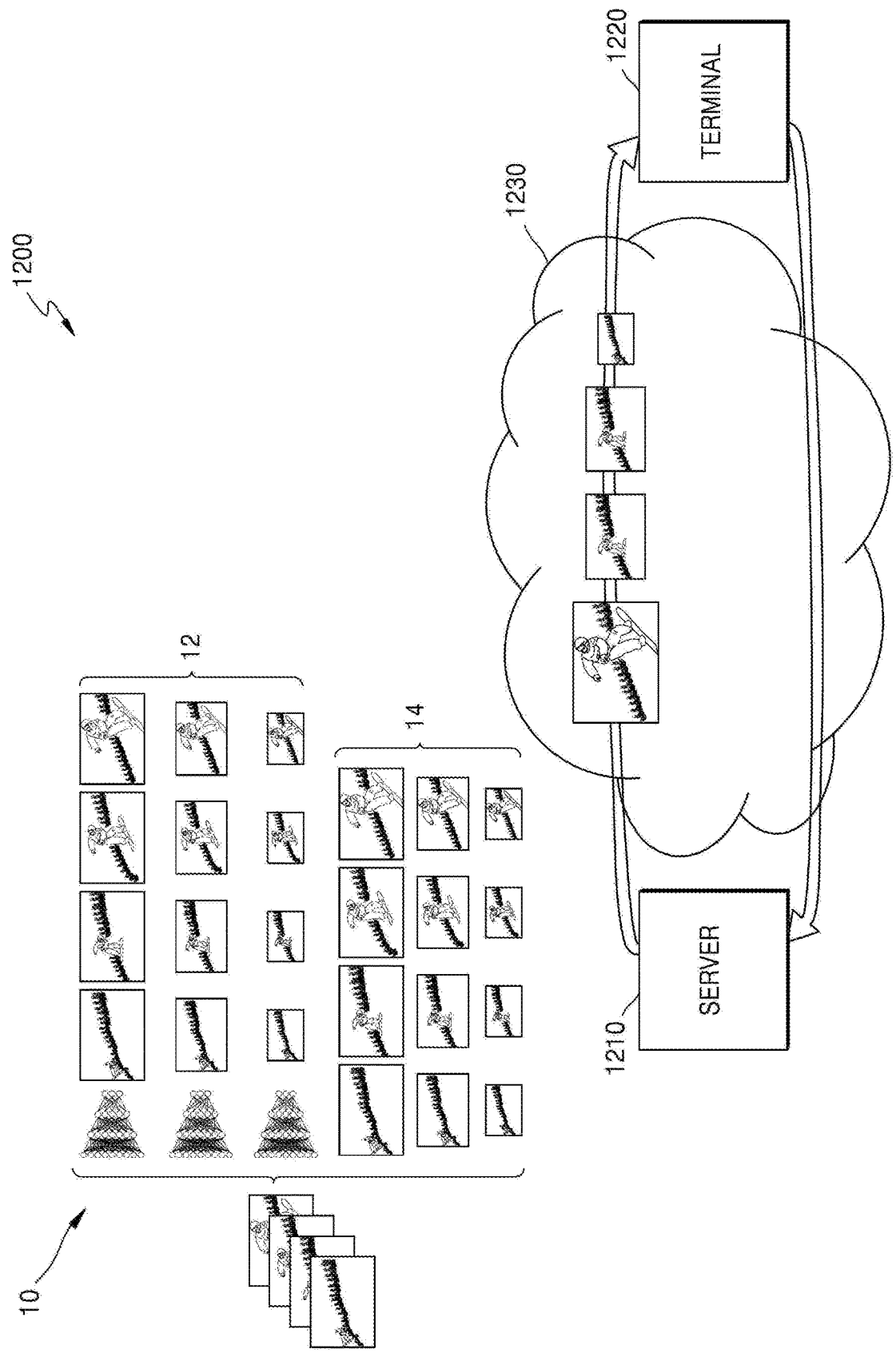
FIG. 12 is a diagram for describing a concept of a streaming system, according to embodiments of the disclosure.

FIG. 12 is a diagram for describing a concept of a streaming system 1200, according to embodiments of the disclosure.

Referring to FIG. 12, the streaming system 1200 may include a server 1210 and a terminal 1220. However, this is an example, and elements of the streaming system 1200 are not limited to the server 1210 and the terminal 1220.

The server 1210 may stream image data to the terminal 1220. In the disclosure, streaming refers to an operation of transmitting and receiving image data between the server 1210 and the terminal 1220 such that the terminal 1220 may reproduce the image data in real time. Also, the server 1210 may stream various types of data including audio data and text data as well as image data to the terminal 1220, but in the disclosure, a method of streaming image data according to embodiments of the disclosure will be described.

For streaming, the server 1210 and the terminal 1220 may be connected through a network 1230. The server 1210 may stream image data to the terminal 1220 via the network 1230.

For example, when the terminal 1220 requests the server 1210 for predefined image data from among a plurality of items of image data, the predefined image data may be transmitted to the terminal 1220. The plurality of items of image data may be also referred to as a plurality of versions of an image content (e.g., a movie, a television content, a video, etc.), or a plurality of different quality versions of an image content. The predefined image data may be image data that corresponds to setting by a user. However, the disclosure is not limited to the example, and thus, in another example of the disclosure, the predefined image data may be image data having a quality set as a default when streaming between the server 1210 and the terminal 1220 starts. While the server 1210 is streaming the image data, a state of the network 1230 may be changeable. Information regarding the state of the network 1230 may be determined according to an amount of traffic in transmission and reception paths between the server 1210 and the terminal 1220, and this may be described as a congestion level. However, this is an example, and the state of the network 1230 is not described only according to the traffic occurring in the transmission and reception paths.

To adaptively perform streaming, based on a changeable state of a network, the server 1210 may adjust either one or both of a bitrate and a resolution of image data that is to be transmitted from the server 1210 to the terminal 1220. The server 1210 may store a plurality of items of image data 10 (e.g., a high-definition (HD) class IRON MAN movie, a standard-definition (SD) class IRON MAN movie, a 15-Mbps IRON MAN movie, a 10-Mbps IRON MAN movie, etc.) for same image content (e.g., an IRON MAN movie), the plurality of items of image data 10 being obtained from the same image content by adjusting either one or both of a bitrate and a resolution. However, this is an example, and parameters for adjusting a quality of image data may further include a sampling frequency, a frame rate, a window size (e.g., 1920×1080 (1080p) HD, 1280×720 (720p) HD, etc.), a video codec (e.g., H.264, H.265, Advance Video Coding, etc.), a pixel aspect ratio, an audio codec (e.g., Advance Audio Coding), or the like.

The server 1210 according to embodiments of the disclosure may store the plurality of items of image data 10 having different qualities, and the plurality of items of image data 10 may include either one or both of AI-encoded image data 12 or non-AI-encoded image data 14. The AI-encoded image data 12 is generated through the aforementioned AI encoding process, and the AI encoding process includes a process of performing AI-downscaling on an original image through the first DNN 700. In this regard, the first DNN 700 is trained jointly with the second DNN 300 of the terminal 1220, and when the terminal 1220 receives AI-encoded image data, the terminal 1220 may perform AI-upscaling on the image data through the second DNN 300. Also, the AI-encoded image data 12 may be stored together with AI data related to AI-downscaling, and the AI data may be used in an AI-upscaling process by the terminal 1220.

The server 1210 may provide additional information of the plurality of items of image data 10 to the terminal 1220 so as to allow the terminal 1220 to request image data that corresponds to the state of the network 1230, from among the plurality of items of image data 10. The additional information may include quality information and AI scale conversion information about each of the plurality of items of image data 10.

A quality of each of the plurality of items of image data 10 may be determined according to a resolution and a bitrate, and the quality information may include values of a resolution and a bitrate of each of the plurality of items of image data 10. However, this is an example, and the quality may be determined according to a sampling frequency, a frame rate, a window size, a video codec, a pixel aspect ratio, an audio codec, or the like. The AI scale conversion information may include information indicating whether image data is AI-encoded image data, a value of AI scale conversion level, or the like. In this regard, the AI scale conversion level is an index indicating a difference between AI-downscaled image data and original image data, and may be defined with respect to a resolution, a bitrate, or the like. For example, when resolutions of 8K, 4K, full HD (FHD), and HD are supported in the streaming system 1200, a difference between two adjacent resolutions may be defined as one level interval. In this case, it may be described that a level difference between 8K and 4K corresponds to one level interval, and a level difference between 8K and FHD corresponds to two level intervals. For example, the resolutions of 8K, 4K, full HD (FHD), and HD may be set to a first resolution level, a second resolution level, a third resolution level, and a fourth resolution level, respectively, and a level interval (also referred to as "resolution level interval") between the resolutions of 8K, 4K, full HD (FHD), and HD may be determined as a difference between the resolution levels set to the resolutions of 8K, 4K, full HD (FHD), and HD. Also, when bitrates of 40 Mbps, 30 Mbps, 20 Mbps, and 10 Mbps are supported in the streaming system 1200, a difference between two adjacent bitrates may be defined as one level interval. For example, the bitrates of 40 Mbps, 30 Mbps, 20 Mbps, and 10 Mbps may be set to a first bitrate level, a second bitrate level, a third bitrate level, and a fourth bitrate level, respectively, and a level interval (also referred to as "bitrate level interval") between the bitrates of 40 Mbps, 30 Mbps, 20 Mbps, and 10 Mbps may be determined as a difference between the bitrate levels set to the bitrates of 40 Mbps, 30 Mbps, 20 Mbps, and 10 Mbps. According to embodiments of the disclosure, a level and a level interval may be defined based on a combination of the resolution and the bitrate. That is, a difference between 8K & 40 Mbps and 8K and 30 Mbps may be defined as one level interval, and a difference between 8K & 30 Mbps and 4K & 20 Mbps may be defined as two level intervals. However, this is an example, and the AI scale conversion level may be determined according to other factors not only the resolution and the bitrate.

The terminal 1220 according to embodiments of the disclosure may check resolutions and bitrates of the plurality of items of image data 10 included in the additional information, and may request the server 1210 to transmit image data that has been AI encoded at a particular resolution or bitrate. Also, the terminal 1220 may determine a resolution and a bitrate of image data to be requested for the server 1210, according to a state of the network 1230. For example, while the terminal 1220 receives AI-encoded image data of FHD and 5 Mbps from the server 1210, when it is confirmed that a congestion level of a network is improved because a bit error rate (BER) of the received image data is decreased, the terminal 1220 may request the server 1210 for AI-encoded image data of 4K and 10 Mbps. In embodiments of the disclosure, the terminal 1220 may request the server 1210 to increase or decrease the resolution level, the bitrate level, or the level of the combination of the resolution level and the bitrate level.

However, this is an example, and the terminal 1220 may request transmission of image data of a particular resolution or a particular bitrate, and the server 1210 may determine whether to transmit AI-encoded image data or non-AI-encoded image data. Embodiments of the disclosure in which the terminal 1220 requests the server 1210 for image data based on the additional information will be further described below with reference to FIGS. 18 to 20.

Figure 13A:
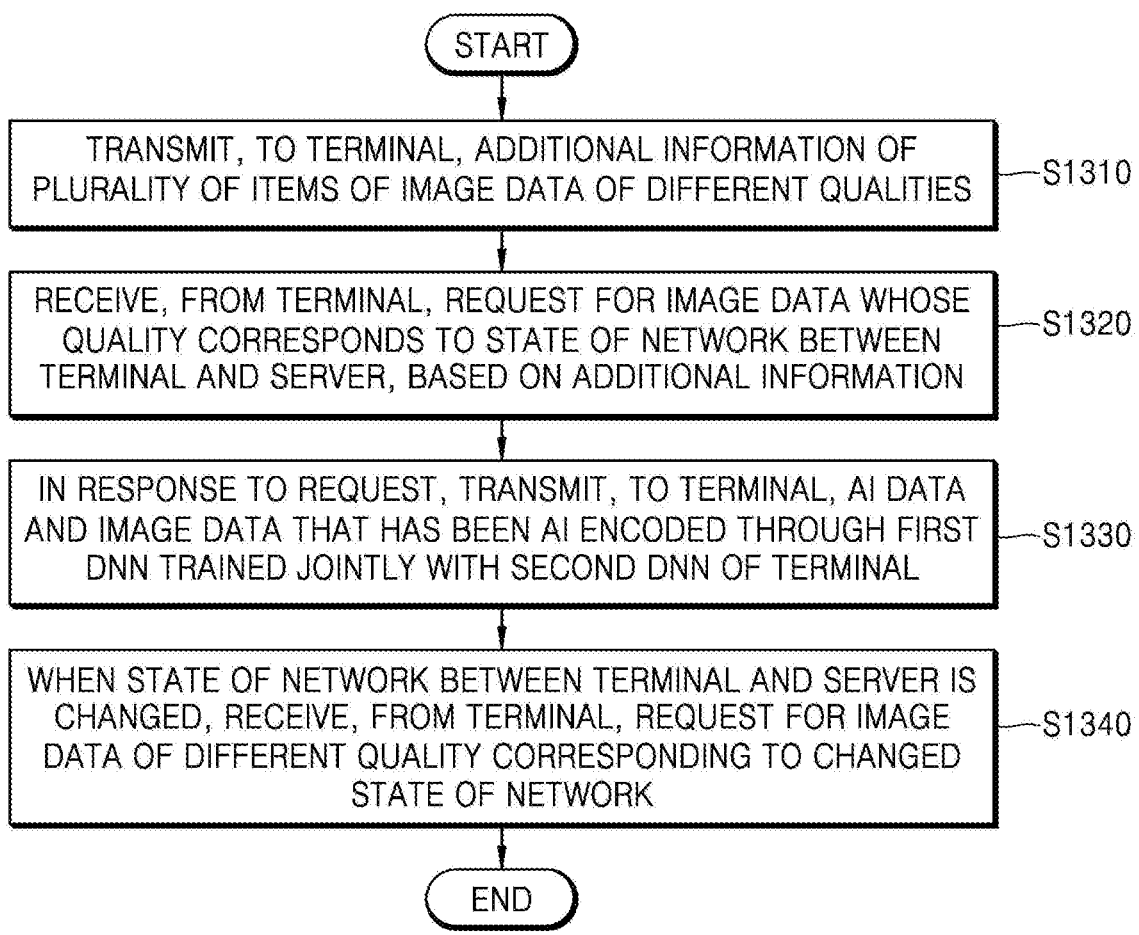
FIG. 13A is a flowchart for describing a method of streaming data, the method being performed by a server, according to embodiments of the disclosure.

FIG. 13A is a flowchart for describing a method of streaming data, the method being performed by a server, according to embodiments of the disclosure.

In operation S1310, the server 1210 may transmit, to a terminal 1220, additional information of a plurality of items of image data of different qualities.

In response to a request from the terminal 1220, the server 1210 may transmit, to the terminal 1220, the additional information of the plurality of items of image data. The additional information may include quality information and AI scale conversion information about each of the plurality of items of image data. The quality information may include resolutions and bitrate values of the plurality of items of image data, respectively, and the AI scale conversion information may include information indicating whether image data is AI-encoded image data, a value of an AI scaling conversion level, or the like. However, this is an example, and a plurality of pieces of information included in the additional information will be further described below with reference to FIGS. 21 to 24.

The additional information may be Media Presentation Description (MPD) according to the Moving Picture Experts Group (MPEG)-Dynamic Adaptive Streaming over Hyper Text Transfer Protocol (HTTP) (DASH) standard. However, this is an example, and the additional information may be provided as a different type of a manifest file stored in an Extensible Markup Language (XML) format.

In operation S1320, the server 1210 may receive, from the terminal 1220, a request for image data whose quality corresponds to a state of a network between the terminal and the server 1210, based on the additional information.

The server 1210 may receive, from the terminal 1220, a request message requesting image data of a particular quality from among the plurality of items of image data, and the request message may include information for specifying the one from among the plurality of items of image data.

According to embodiments of the disclosure, the request message may include quality information about the image data requested by the terminal 1220. For example, the request message may include information about either one or both of a bitrate or a resolution.

According to embodiments of the disclosure, the request message may include quality information and information indicating whether AI downscaling has been applied. For example, when AI-encoded image data is requested, the quality information indicates a quality of the AI-encoded image data. That is, when the AI-encoded image data is requested, and the quality information thereof indicates FHD and 5 Mbps, the server 1210 may determine that the terminal requests the AI-encoded image data whose resolution is FHD and bitrate is 5 Mbps, the AI-encoded image data being obtained as a result of performing AI downscale. According to embodiments of the disclosure, when non-AI-encoded image data is requested, the quality information indicates a quality of original image data. That is, when the non-AI-encoded image data is requested, and the quality information thereof indicates FHD and 5 Mbps, the server 1210 may determine that the terminal 1220 requests the original image data whose resolution is FHD and bitrate is 5 Mbps.

The request message according to embodiments of the disclosure may include capability information of the terminal 1220 and quality information about image data requested by the terminal 1220. For example, when the quality information indicates FHD and 20 Mbps, and the terminal 1220 supports AI upscale, the server 1210 may determine that the terminal 1220 requests AI-encoded image data whose resolution is FHD and bitrate is 20 Mbps, the AI-encoded image data being obtained as a result of performing AI downscaling. According to embodiments of the disclosure, when the quality information indicates FHD and 20 Mbps, and the terminal 1220 does not support AI upscale, the server 1210 may determine that the terminal 1220 requests original image data whose resolution is FHD and bitrate is 20 Mbps.

In operation S1330, in response to the request, the server 1210 may transmit, to the terminal 1220, AI data and the image data that has been AI encoded through the first DNN trained jointly with the second DNN of the terminal 1220.

When the terminal 1220 requests the AI-encoded image data, the server 1210 may transmit, to the terminal 1220, the AI-encoded image data together with the AI data including information that may be used to perform AI upscaling on the AI-encoded image data. For example, the AI data may include information about any one or any combination of information indicating whether AI downscaling has been applied, an AI scale conversion level, and DNN configuration information used in AI upscaling. However, this is an example, and the AI data may include other information that may be used in performing AI upscaling.

The server 1210 may transmit the AI-encoded image data in a unit of a segment to the terminal 1220. The segment may be generated by partitioning the AI-encoded image data, based on a preset time unit. However, this is an example, and a transmission unit of the AI-encoded image data which is transmitted from the server 1210 is not limited to the unit of the segment.

In operation S1340, when the state of the network between the terminal 1220 and the server 1210 is changed, the server 1210 may receive, from the terminal 1220, a request for image data of a different quality corresponding to the changed state of the network.

The terminal 1220 may periodically determine a state of the network. For example, the terminal 1220 may periodically measure a timestamp at which image data is received, and a BER, and thus may determine the state of the network. Also, when the state of the network is changed, the terminal 1220 may change a quality of image data to be requested for the server 1210. For example, in a case in which the terminal 1220 requested the server 1210 for image data of FHD and 5 Mbps at a first time point at which the network is congested, the terminal 1220 may request the server 1210 for image data of 4K and 10 Mbps at a second time point after the first time point, if the congestion is reduced and the condition of the network is improved at the second time point. The terminal 1220 or the server 1210 may determine that a network congestion occurs when any one or any combination of a delay (or a latency), a bit error rate, a packet loss, and a timeout (e.g., a lost connection) is observed. For example, when a time it takes for a destination to receive a packet sent by a sender (i.e., a delay or a latency) is longer than a threshold delay, the terminal 1220 or the server 1210 may determine that a network congestion occurs. In another example, when the terminal 1220 experiences buffering longer than a threshold buffering time while reproducing a video transmitted from the server 1210, the terminal 1220 or the server 1210 may determine that a network congestion occurs.

Information included in a request message to be transmitted from the terminal 1220 to the server 1210 so as to request the image data of the different quality corresponding to the changed state of the network may correspond to the descriptions provided with reference to S1320.

Figure 13B:
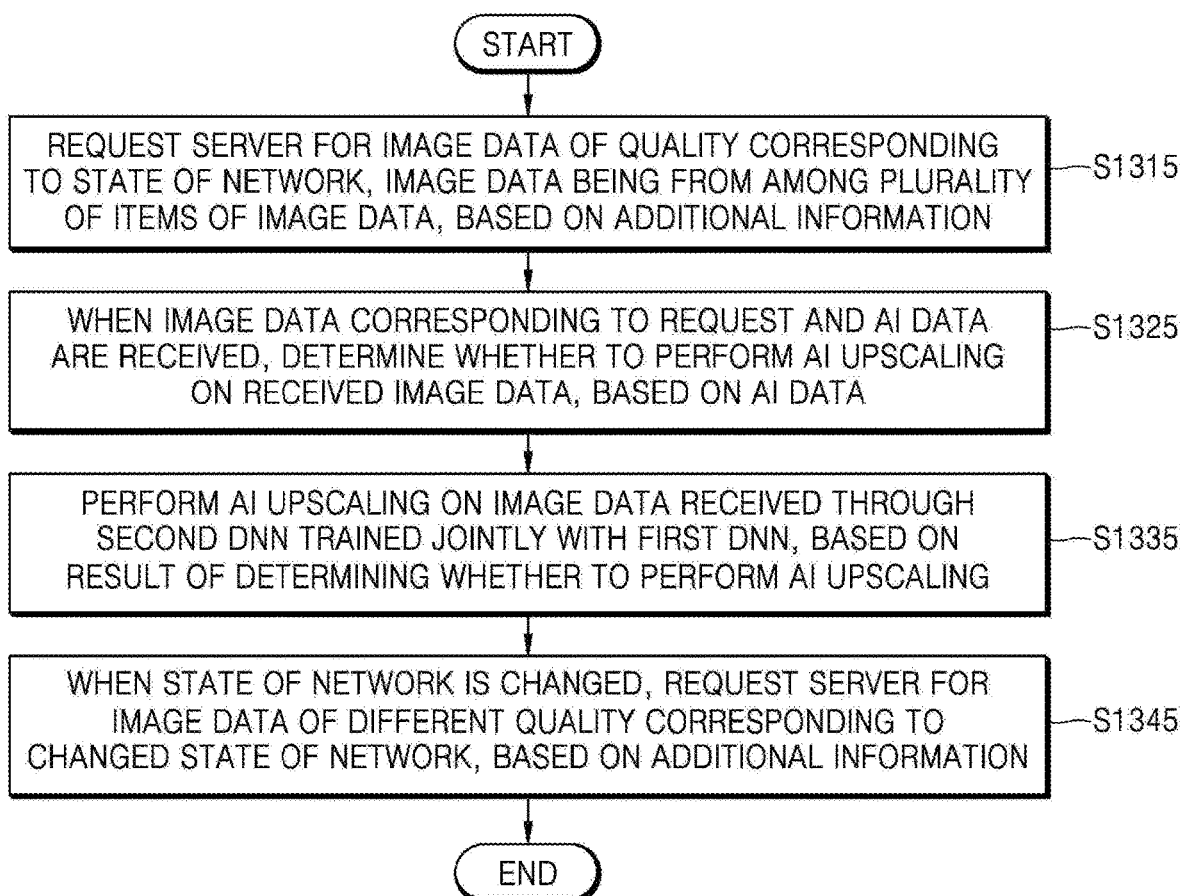
FIG. 13B is a flowchart for describing a method of streaming data, the method being performed by a terminal, according to embodiments of the disclosure.

FIG. 13B is a flowchart for describing a method of streaming data, the method being performed by a terminal 1220, according to embodiments of the disclosure.

In operation S1315, the terminal 1220 may request a server 1210 for image data of a quality corresponding to a state of a network, the image data being from among a plurality of items of image data, based on additional information. The additional information may include quality information and AI scale conversion information about each of the plurality of items of image data stored in the server 1210. The quality information may include resolutions and bitrates of the plurality of items of image data, respectively, and the AI scale conversion information may include information indicating whether image data is AI-encoded image data, and a value of a level at which AI downscaling has been performed.

The terminal 1220 may determine the quality of the image data corresponding to the state of the network of the terminal 1220, based on the state of the network. The state of the network may be determined based on a timestamp and a BER of image data received by the terminal 1220.

The timestamp refers to information indicating an elapse time from a reference time to a reception time of image data. For example, in a case in which an average value of the timestamp in a first time period is 3 ms whereas an average value of the timestamp in a second time period is 5 ms, the terminal 1220 may determine that the state of the network in the second time period is congested compared to the first time period. Also, the BER refers to a ratio of an error bit number to a total transmission bit number. For example, when the BER is lower than a preset reference, the terminal 1220 may determine that the state of the network is not congested. As another example, in a case in which a value of the BER is 0.005 in the first time period whereas a value of the BER is 0.01 in the second time period, the terminal 1220 may determine that the state of the network in the second time period is congested compared to the first time period. However, this is an example, and the state of the network may be determined based on another information.

For example, when the terminal 1220 estimates that the state of the network between the server 1210 and the terminal 1220 is congested, the terminal 1220 may select image data of 20 Mbps that is a relatively low bitrate from among 50 Mbps, 40 Mbps, 30 Mbps, and 20 Mbps that are respective bitrates of the plurality of items of image data. However, this is an example, and a method of determining, by the terminal 1220, the quality of the image data corresponding to the state of the network is not limited to the example.

The terminal 1220 may transmit, to the server 1210, a request message requesting the image data of the determined quality. According to embodiments of the disclosure, the request message may include quality information about the image data requested by the terminal 1220. For example, the request message may include information about at least one of a bitrate or a resolution. The request message according to embodiments of the disclosure may include quality information and information indicating whether AI downscaling has been applied. The request message according to embodiments of the disclosure may include capability information of the terminal 1220 and quality information about the image data requested by the terminal 1220. The capability information may include information about whether the terminal 1220 supports AI upscaling.

In operation S1325, when the terminal 1220 receives the image data corresponding to the request, and AI data, the terminal 1220 may determine whether to perform AI upscaling on the received image data, based on the AI data.

According to embodiments of the disclosure, the terminal 1220 may determine, based on the AI data, whether the received image data has been AI encoded through the first DNN trained jointly with the second DNN. The AI data may include information about at least one of information indicating whether AI downscaling has been applied, an AI scale conversion level, or DNN configuration information used in AI upscaling. The DNN configuration information may be provided as an indicator indicating the number of convolution layers, the number of filter kernels of each convolution layer, a parameter of each filter kernel, or the like. However, this is an example, and the DNN configuration information may be provided as a lookup table, and as another example, the second DNN may be provided as the DNN configuration information. However, this is an example, and the AI data may include other information required for the terminal 1220 to perform AI upscaling.

According to embodiments of the disclosure, when the terminal 1220 included information specifying AI-encoded image data in the request message for image data in aforementioned operation S1315, the terminal 1220 may determine that AI downscaling has been applied to image data that is received in response to the request message.

In operation S1335, the terminal 1220 may perform AI upscaling on the image data received through the second DNN trained jointly with the first DNN, based on a result of determining whether to perform AI upscaling.

When the terminal 1220 determines that the received image data is image data that has been AI encoded through the first DNN trained jointly with the second DNN, the terminal may perform AI upscaling on the received image data through the second DNN.

According to embodiments of the disclosure, the terminal 1220 may determine DNN configuration information of the second DNN, based on at least one of a resolution or a bitrate of the AI-encoded image data. For example, when the resolution and the bitrate of the AI-encoded image data are 4K and 10 Mbps, the terminal 1220 may select DNN configuration information that is optimized to the resolution and the bitrate and is from among a plurality of pieces of DNN configuration information. In this regard, the plurality of pieces of DNN configuration information that are respectively optimized to the resolutions and the bitrates may be pre-trained in the terminal 1220, and information thereof may be included in the AI data as will be described in embodiments below. According to embodiments of the disclosure, the terminal 1220 may obtain DNN configuration information that is optimized for performing AI upscaling on the AI-encoded image data, based on the DNN configuration information included in the AI data.

The terminal 1220 may perform AI upscaling on the AI-encoded image data, based on the selected DNN configuration information, through the second DNN trained jointly with the first DNN.

In operation S1345, when a state of the network is changed, the terminal 1220 may request the server 1210 for image data of a different quality corresponding to the changed state of the network, based on the additional information.

For example, although the terminal 1220 requested AI-encoded image data of FHD and 5 Mbps in aforementioned operation S1315, when an interval of timestamps of image data received thereafter becomes short or a BER is decreased, the terminal 1220 may determine that a congestion level of the network is alleviated and improved and thus may request the server 1210 for AI-encoded image data of 4K and a 10-Mbps bitrate.

As another example, although the terminal 1220 requested AI-encoded image data of 4K and 10 Mbps in aforementioned operation S1315, when an interval of timestamps of image data received thereafter becomes long or a BER is increased, the terminal 1220 may determine that the congestion level of the network deteriorates and thus may request the server 1210 for AI-encoded image data of FHD and 5 Mbps.

As another example, although the terminal 1220 requested AI-encoded image data of FHD and 5 Mbps in aforementioned operation S1315, when an interval of timestamps of image data received thereafter becomes long or a BER is increased, the terminal 1220 may determine that the congestion level of the network deteriorates and thus may request the server 1210 for image data of HD and 1 Mbps. That is, when a resolution and a bitrate are less than a predetermined reference, the terminal 1220 may consider a level of image data that is to be reconstructed by AI upscaling, and thus may request the server 1210 for image data on which AI downscaling has not been performed. However, this is an example, and a method, performed by the terminal 1220, of changing a quality of image data based on a change in a state of a network is not limited to the aforementioned example.

Information included in a request message transmitted from the terminal 1220 to the server 1210 so as to request the image data of the different quality corresponding to the state of the network may correspond to the aforementioned descriptions provided with reference to operation S1315.

Figure 14A:
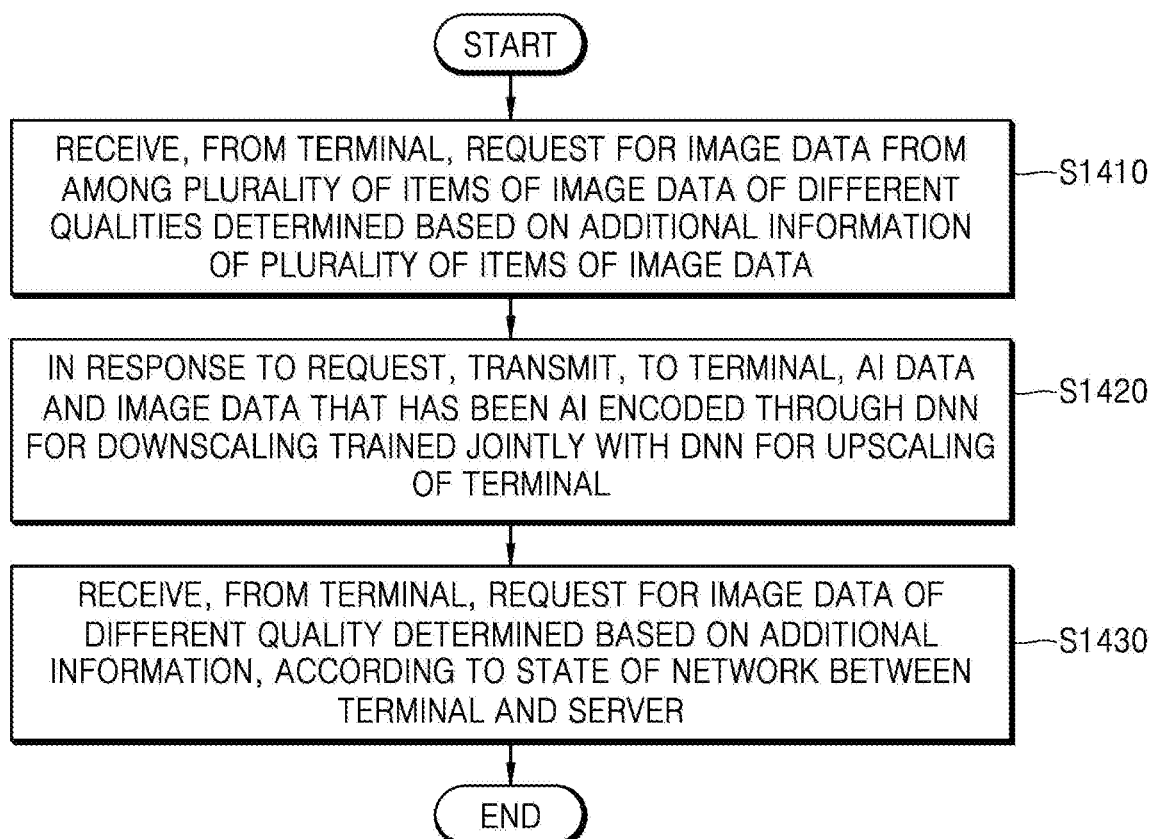
FIG. 14A is a flowchart for describing a method of streaming data, the method being performed by a server, according to embodiments of the disclosure.

FIG. 14A is a flowchart for describing a method of streaming data, the method being performed by a server, according to embodiments of the disclosure.

In operation S1410, the server 1210 may receive, from a terminal 1220, a request for one of a plurality of items of image data of different qualities determined based on additional information of the plurality of items of image data.

The additional information may be provided to the terminal 1220 from a service server that is independently separate from the server 1210. However, this is an example, and the additional information may be provided from the server 1210 to the terminal 1220.

According to embodiments of the disclosure, the server 1210 may receive, from the terminal 1220, a request for image data whose quality is set by a user based on the additional information. For example, when the user of the terminal 1220 selects a quality of FHD and 5 Mbps, the server 1210 may receive a request for image data of FHD and 5 Mbps from the terminal 1220. However, this is an example, and according to embodiments of the disclosure, the server 1210 may receive, from the terminal 1220, a request for image data of a quality set as a default. For example, in a case in which streaming of image data starts between the terminal 1220 and the server 1210, when a state of a network between the terminal 1220 and the server 1210 is not confirmed, the server 1210 may receive, from the terminal 1220, a request for image data of a lowest quality from among a plurality of qualities. According to embodiments of the disclosure, the server 1210 may receive, from the terminal 1220, a request for image data of a particular quality (e.g., HD and 4 Mbps) set as a default. According to embodiments of the disclosure, the server 1210 may receive, from the terminal 1220, a request for image data for which information about whether AI encoding has been performed is specified, in addition to a quality.

In operation S1420, in response to the request, the server 1210 may transmit, to the terminal 1220, AI data and image data that has been AI encoded through a DNN for downscaling trained jointly with a DNN for upscaling of the terminal 1220.

When the terminal 1220 requests AI-encoded image data, the server 1210 may transmit, to the terminal 1220, the AI-encoded image data together with the AI data including information that may be needed for upscaling the AI-encoded image data. For example, the AI data may include information about at least one of information indicating whether AI downscaling has been applied, an AI scale conversion level, or DNN configuration information used in AI upscaling. However, this is an example, and the AI data may include other information that may be needed for the terminal 1220 to perform AI upscaling.

The server 1210 may transmit the AI-encoded image data in a unit of a segment to the terminal 1220. The segment may be generated by partitioning the AI-encoded image data, based on a preset time unit. However, this is an example, and a transmission unit of the AI-encoded image data which is transmitted from the server 1210 is not limited to the unit of the segment.

In operation S1430, according to the state of the network between the terminal 1220 and the server 1210, the server 1210 may receive, from the terminal 1220, a request for image data of a different quality from among the plurality of items of image data, based on the additional information.

According to embodiments of the disclosure, the request may include quality information about the image data requested by the terminal 1220. For example, the request may include information about at least one of a bitrate or a resolution. As another example, the request may include quality information and information indicating whether AI downscaling has been applied. As another example, a request message may include capability information of the terminal and quality information about the image data requested by the terminal 1220.

Figure 14B:
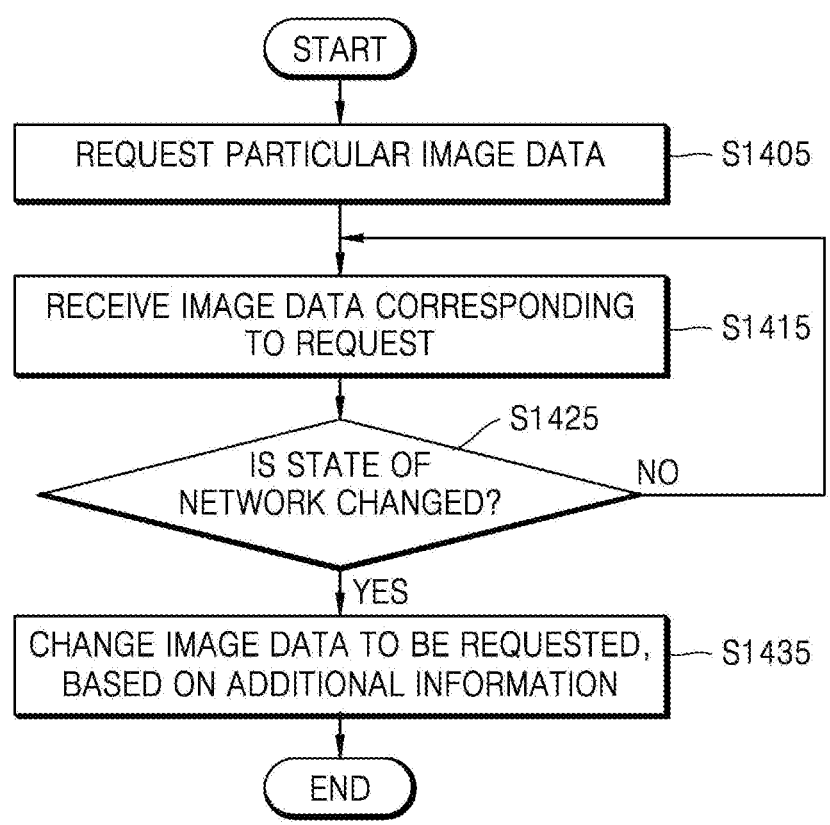
FIG. 14B is a flowchart for describing a method of streaming data, the method being performed by the terminal, according to embodiments of the disclosure.

FIG. 14B is a flowchart for describing a method of streaming data, the method being performed by the terminal 1220, according to embodiments of the disclosure.

In operation S1405, the terminal 1220 may request particular image data. The terminal 1220 according to embodiments of the disclosure may request image data of a particular quality. For example, the terminal 1220 may request image data of FHD and 5 Mbps. However, this is an example, and according to embodiments of the disclosure, the terminal 1220 may request a server 1210 for image data without specifying a quality thereof.

According to embodiments of the disclosure, the terminal 1220 may request a server 1210 for image data by specifying information about whether AI encoding has been performed, in addition to a quality.

In operation S1415, the terminal 1220 may receive image data corresponding to the request. The terminal 1220 according to embodiments of the disclosure may receive additional information together with the image data corresponding to the request. The additional information may include quality information, AI scale conversion information, or the like about a plurality of items of image data that may be provided from the server 1210 to the terminal 1220. However, this is an example, and the additional information may include a plurality of pieces of other information for identifying the plurality of items of image data, respectively.

Also, the additional information may include respective uniform resource locators (URLs) for receiving the plurality of items of image data that are identifiable based on the quality information, the AI scale conversion information, or the like.

Additional information that is to be received by the terminal 1220 may be determined, according to capability information of the terminal 1220 according to embodiments of the disclosure. For example, when the terminal 1220 is a device that supports AI decoding, the server 1210 may transmit additional information including the AI scale conversion information to the terminal 1220, and when the terminal 1220 is a device that does not support AI decoding, the server 1210 may transmit additional information not including the AI scaling conversion information to the terminal 1220. However, this is an example, and in a case in which the terminal 1220 is a device that does not support AI decoding, even when the terminal 1220 receives the additional information including the AI scale conversion information, the terminal 1220 may not interpret but may ignore the additional information. In the present embodiment of the disclosure, the capability information of the terminal 1220 may have been previously provided to the server 1210, or may be included in the request for the particular image data.

The aforementioned embodiment of the disclosure is an example, and thus the additional information may be provided from the server 1210 to the terminal 1220 after image data is received during a predetermined period or may be provided from the server 1210 to the terminal 1220 before the image data is received.

In operation S1425, the terminal 1220 may determine whether a state of a network is changed.

The state of the network may be determined based on a timestamp and a BER of the image data received by the terminal 1220. For example, as a result of determination based on the timestamp, when the terminal 1220 determines that a time of receiving the image data from the server 1210 is delayed, the terminal 1220 may determine that the state of the network is congested. As another example, when the BER is less than a predetermined reference, the terminal 1220 may determine that the state of the network is not congested. However, this is an example, and the state of the network may be determined based on other information.

According to embodiments of the disclosure, when at least one of the timestamp or the BER of the image data is changed, the terminal 1220 may determine that the state of the network has been changed, and according to embodiments of the disclosure, when at least one of the timestamp or the BER exceeds a preset range, or when a difference differing from a previous measurement value by at least a predetermined value occurs or the difference is maintained for a certain time period, the terminal 1220 may determine that the state of the network has been changed. For example, when a previous BER is 0.001, and a BER measured thereafter is in a range of between 0.0095 and 0.005, the terminal 1220 determines that the state of the network is maintained, but when the BER exceeds the corresponding range, the terminal 1220 may determine that the state of the network is changed. However, this is an example, and a reference by which determination with respect to whether the state of the network is changed is made is not limited to the aforementioned example.

As a result of the determination, when the terminal 1220 determines that the state of the network is not changed, the terminal 1220 may receive image data corresponding to the quality requested in operation S1405 or corresponding to whether AI downscaling has been performed.

In operation S1435, the terminal 1220 may change image data to be requested, based on the additional information. In aforementioned operation S1425, when the terminal 1220 determines that the state of the network has been changed, the terminal 1220 may determine requirable image data (or image data quality settings), based on the additional information and the capability of the terminal 1220.

To determine the requirable image data (or the image data quality settings), the terminal 1220 may determine whether the terminal 1220 can support AI decoding. According to embodiments of the disclosure, the terminal 1220 may determine whether the terminal 1220 can perform AI upscaling. According to embodiments of the disclosure, the terminal 1220 may determine whether AI-encoded image data of a corresponding quality can be a type of DNN configuration information that can be AI upscaled according to a type of DNN configuration information, based on the quality corresponding to a changed state of the network, the DNN configuration information trained in a second DNN of the terminal 1220, jointly with a first DNN of the server 1210. For example, when the quality corresponding to the changed state of the network is FHD and 5 Mbps, the terminal 1220 may determine whether the second DNN has been trained jointly with the first DNN of the server 1210 so as to AI upscale the AI-encoded image data of FHD and 5 Mbps.

According to embodiments of the disclosure, in a case of image data of a same quality, the terminal 1220 may determine whether AI downscaling has been performed on the image data to be requested, an AI downscale level, a type of DNN configuration information used in the AI downscaling, or the like, based on a hardware device specification of the terminal 1220, a type of codec, or the like. Information about whether each image data has been AI downscaled, an AI downscale level of each image data, a type of DNN configuration information used in the AI downscaling, or the like may be included in the additional information and provided to the terminal 1220, and the descriptions therefor will be further provided below with reference to FIGS. 20 to 23.

Figure 15A:
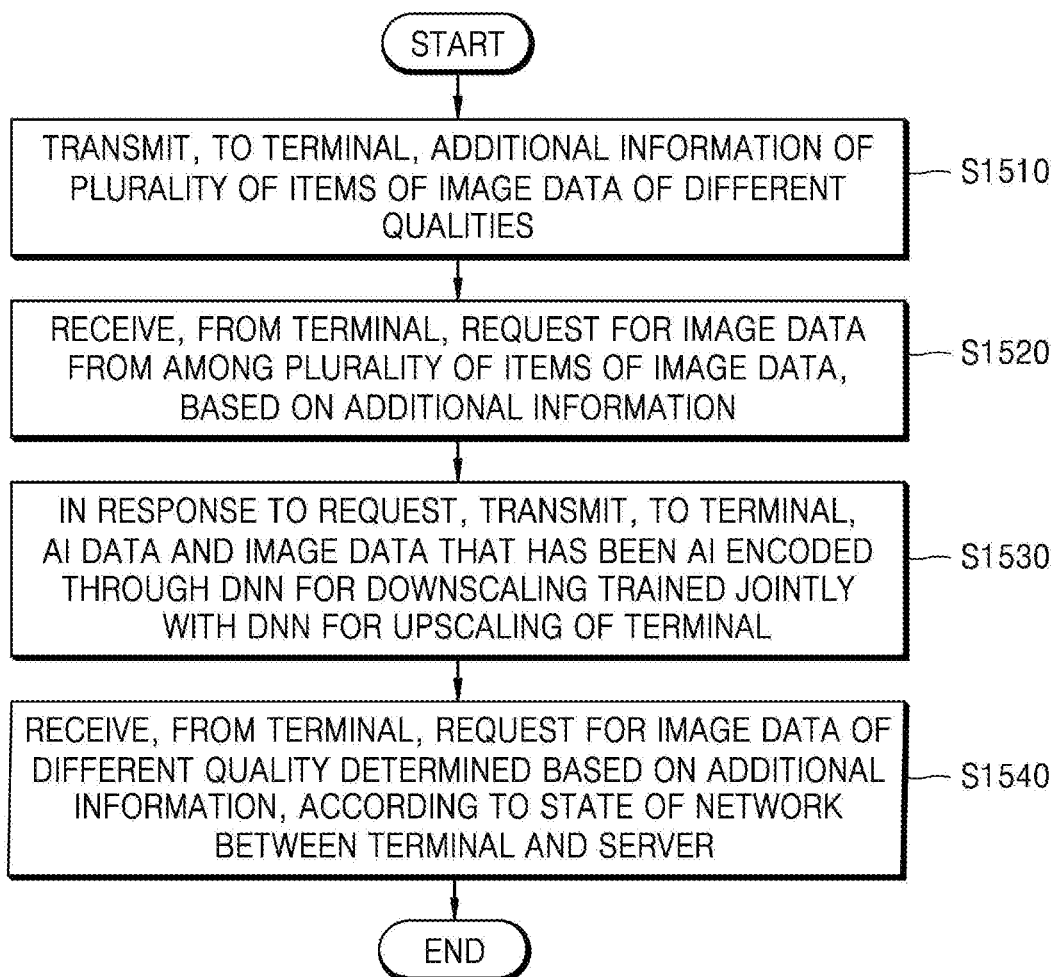
FIG. 15A is a flowchart for describing a method of streaming data, the method being performed by a server, according to embodiments of the disclosure.

FIG. 15A is a flowchart for describing a method of streaming data, the method being performed by a server, according to embodiments of the disclosure.

In operation S1510, the server 1210 may transmit, to a terminal 1220, additional information of a plurality of items of image data of different qualities.

The server 1210 may transmit the additional information of the plurality of items of image data, in response to a request from the terminal 1220. However, this is an example, and the server 1210 may transmit the additional information to the terminal 1220 when a communication session for streaming image data is established between the server 1210 and the terminal 1220.

In the present embodiment of the disclosure, the additional information may correspond to that described with reference to FIG. 13A.

In operation S1520, the server 1210 may receive, from the terminal 1220, a request for image data from among the plurality of items of image data, based on the additional information.

According to embodiments of the disclosure, the server 1210 may receive, from the terminal 1220, a request for image data whose quality is set by a user. For example, when the user of the terminal 1220 selects a quality of FHD and 5 Mbps, the server 1210 may receive a request for image data of FHD and 5 Mbps from the terminal 1220. However, this is an example, and according to embodiments of the disclosure, the server 1210 may receive, from the terminal 1220, a request for image data of a quality set as a default. For example, in a case in which streaming of image data starts between the terminal 1220 and the server 1210, when a state of a network between the terminal 1220 and the server is not confirmed, the server 1210 may receive, from the terminal 1220, a request for image data of a lowest quality from among a plurality of qualities. According to embodiments of the disclosure, the server 1210 may receive, from the terminal 1220, a request for image data of a particular quality (e.g., HD and 4 Mbps) set as a default. According to embodiments of the disclosure, the server 1210 may receive, from the terminal, a request for image data for which information about whether AI encoding has been performed is specified, in addition to a quality.

In operation S1530, in response to the request, the server 1210 may transmit, to the terminal 1220, AI data and image data that has been AI encoded through a DNN for downscaling trained jointly with a DNN for upscaling of the terminal 1220.

When the terminal 1220 requests AI-encoded image data, the server 1210 may transmit, to the terminal 1220, the AI-encoded image data together with the AI data including information necessary for upscaling the AI-encoded image data. For example, the AI data may include information about at least one of information indicating whether AI downscaling has been applied, an AI scale conversion level, or DNN configuration information used in AI upscaling. However, this is an example, and the AI data may include other information necessary for the terminal 1220 to perform AI upscaling.

The server 1210 may transmit the AI-encoded image data in a unit of a segment to the terminal 1220. The segment may be generated by partitioning the AI-encoded image data, based on a preset time unit. However, this is merely an example, and a transmission unit of the AI-encoded image data which is transmitted from the server 1210 is not limited to the unit of the segment.

In operation S1540, according to the state of the network between the terminal 1220 and the server 1210, the server 1210 may receive, from the terminal 1220, a request for image data of a different quality from among the plurality of items of image data, based on the additional information.

According to embodiments of the disclosure, the request may include quality information about the image data requested by the terminal 1220. For example, the request may include information about at least one of a bitrate or a resolution. As another example, the request may include quality information and information indicating whether AI downscaling has been applied. As another example, a request message may include capability information of the terminal 1220 and quality information about the image data requested by the terminal 1220.

Figure 15B:
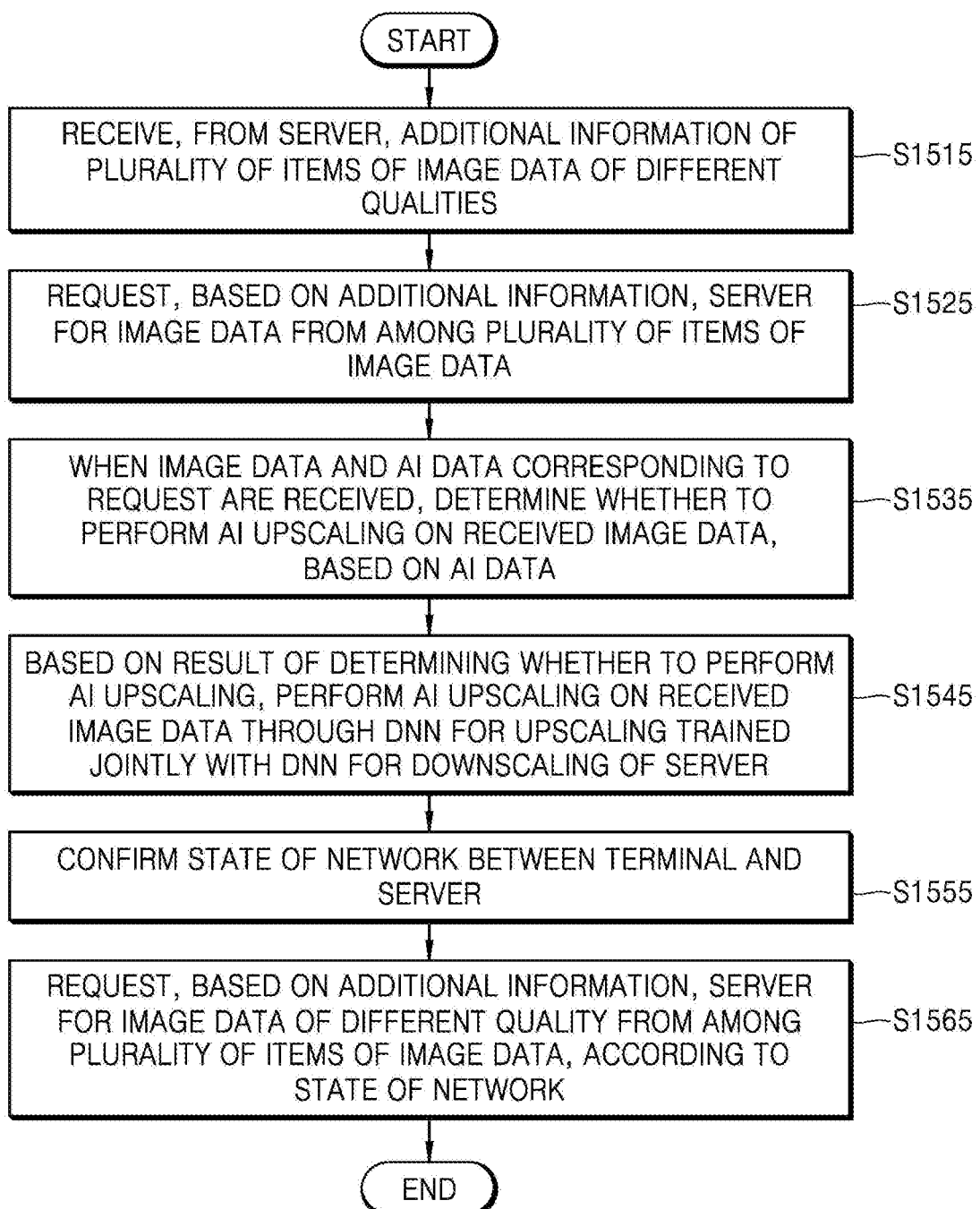
FIG. 15B is a flowchart for describing a method of streaming data, the method being performed by the terminal, according to embodiments of the disclosure.

FIG. 15B is a flowchart for describing a method of streaming data, the method being performed by the terminal 1220, according to embodiments of the disclosure.

In operation S1515, the terminal 1220 may receive, from a server 1210, additional information of a plurality of items of image data of different qualities. According to embodiments of the disclosure, the terminal 1220 may request the server 1210 for the additional information of the plurality of items of image data. However, this is an example, and the server 1210 may transmit the additional information to the terminal 1220 when a communication session for streaming image data is established between the terminal 1220 and the server 1210.

In the present embodiment of the disclosure, the additional information may correspond to that described with reference to FIG. 13B.

In operation S1525, the terminal 1220 may request the server 1210 for image data from among the plurality of items of image data, based on the additional information. According to embodiments of the disclosure, the terminal 1220 may request the server 1210 for image data whose quality is set by a user. For example, when the user of the terminal 1220 selects a quality of FHD and 5 Mbps, the terminal 1220 may request the server 1210 for image data of FHD and 5 Mbps from the terminal 1220. However, this is an example, and according to embodiments of the disclosure, the terminal 1220 may request the server 1210 for image data of a quality set as a default. For example, in a case in which streaming of image data starts between the terminal 1220 and the server 1210, when a state of a network between the terminal 1220 and the server 1210 is not confirmed, the terminal 1220 may request the server 1210 for image data of a lowest quality from among a plurality of qualities. According to embodiments of the disclosure, the terminal 1220 may request the server 1210 for image data of a particular quality (e.g., HD and 4 Mbps) set as a default.

According to embodiments of the disclosure, the terminal 1220 may request the server 1210 for image data by specifying information about whether AI encoding has been performed, in addition to a quality.

In operation S1535, when the terminal 1220 receives image data and AI data which correspond to the request, the terminal 1220 may determine whether to perform AI upscaling on the received image data, based on the AI data.

According to embodiments of the disclosure, the terminal 1220 may determine, based on the AI data, whether the received image data has been AI encoded through the first DNN trained jointly with the second DNN. The AI data may include information about at least one of information indicating whether AI downscaling has been applied, an AI scale conversion level, or DNN configuration information used in AI upscaling.

According to embodiments of the disclosure, when the terminal 1220 includes the information that specifies AI-encoded image data in a request message for image data in operation S1525, the terminal 1220 may determine that AI downscaling has been applied to image data received in response to the request message.

In operation S1545, the terminal 1220 may perform, based on a result of the determination about whether to perform AI upscaling, AI upscaling on the received image data through the DNN for upscaling trained jointly with the DNN for downscaling of the server 1210.

When the terminal 1220 determines that the received image data is image data that has been AI encoded through the first DNN trained jointly with the second DNN, the terminal 1220 may perform, through the second DNN, AI upscaling on the received image data. In the present embodiment of the disclosure, a method, performed by the terminal 1220, of performing AI upscaling on received image data through the second DNN may correspond to operation S1335 described above with reference to FIG. 13B.

In operation S1555, the terminal 1220 may confirm the state of the network between the terminal 1220 and the server 1210. The state of the network may be determined based on a timestamp and a BER of image data received by the terminal 1220. For example, as a result of determination based on the timestamp, when the terminal 1220 determines that a time of receiving the image data from the server 1210 is delayed, the terminal 1220 may determine that the state of the network is congested. As another example, when the BER is less than a predetermined reference, the terminal 1220 may determine that the state of the network is not congested. However, this is an example, and the state of the network may be determined based on other information.

In operation S1565, according to the state of the network, the terminal 1220 may request the server 1210 for image data of a different quality from among the plurality of items of image data, based on the additional information.

For example, although the terminal 1220 requested AI-encoded image data of FHD and 5 Mbps in aforementioned operation S1525, when an interval of timestamps of image data received thereafter becomes short or a BER is decreased, the terminal 1220 may determine that a congestion level of the network is improved and thus may request the server 1210 for AI-encoded image data of 4K and a 10-Mbps bitrate.

As another example, although the terminal 1220 requested AI-encoded image data of 4K and 10 Mbps in aforementioned operation S1525, when an interval of timestamps of image data received thereafter becomes long or a BER is increased, the terminal 1220 may determine that the congestion level of the network deteriorates and thus may request the server 1210 for AI-encoded image data of FHD and 5 Mbps.

As another example, although the terminal 1220 requested AI-encoded image data of FHD and 5 Mbps in aforementioned operation S1515, when an interval of timestamps of image data received thereafter becomes long or a BER is increased, the terminal 1220 may determine that the congestion level of the network deteriorates and thus may request the server 1210 for image data of HD and 1 Mbps. That is, when a resolution and a bitrate are less than a predetermined reference, the terminal 1220 may consider a level of image data that is to be reconstructed by AI upscaling, and thus may request the server 1210 for image data on which AI downscaling has not been performed. However, this is an example, and a method, performed by the terminal 1220, of changing a quality of image data based on a change in a state of a network is not limited to the aforementioned example.

Information included in a request message transmitted from the terminal 1220 to the server 1210 so as to request the image data of the different quality corresponding to the state of the network may correspond to the aforementioned descriptions provided with reference to operation S1515.

Figure 16:
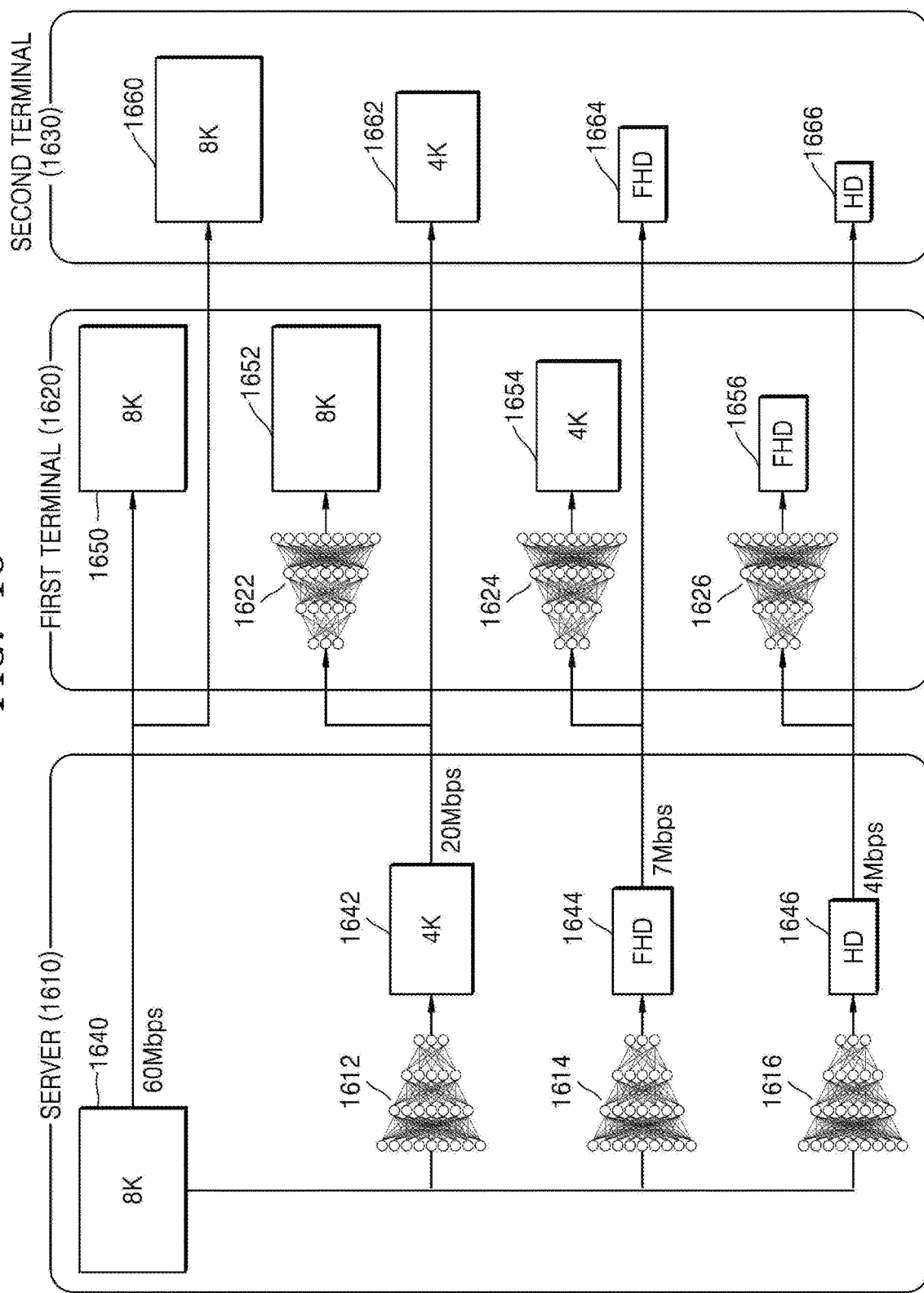
FIG. 16 is a diagram for describing a method of performing streaming between a server and a first terminal according to whether the first terminal supports AI upscaling, according to embodiments of the disclosure.

FIG. 16 is a diagram for describing a method of performing streaming between a server 1610 and a first terminal 1620 according to whether the first terminal 1620 supports AI upscaling, according to embodiments of the disclosure.

In the embodiment of FIG. 16, it is assumed that the first terminal 1620 corresponds to a terminal that can support AI upscaling through a second DNN trained jointly with a first DNN of the server 1610, and a second terminal 1630 corresponds to a terminal that does not support AI upscaling.

The server 1610 stores a plurality of items of image data of different qualities for adaptive streaming, and transmits image data, in response to a request from a terminal (e.g., the first terminal 1620). The terminal (e.g., the first terminal 1620) may obtain additional information of the plurality of items of image data from the server 1610, and may request the server 1610 for one of the plurality of items of image data, based on the additional information. A plurality of pieces of information included in the additional information will be further described below with reference to FIGS. 20 to 23.

For example, the server 1610 may obtain image data of 4K and 20 Mbps 1642 that is AI downscaled by performing AI downscaling on original image data of 8K and 60 Mbps 1640 through a 1a-1 DNN 1612. The server 1610 may transmit the AI-encoded image data of 4K and 20 Mbps 1642 together with AI data related to AI downscaling to 4K and 20 Mbps, in response to a request from the first terminal 1620. The first terminal 1620 may perform AI upscaling on the received image data through a 2a-1 DNN 1622 trained jointly with the 1a-1 DNN 1612, and thus may obtain AI upscaled image data 1652. In this regard, the first terminal 1620 may perform aforementioned AI upscaling by obtaining at least one of information indicating whether AI downscaling has been applied, an AI scale conversion level, or DNN configuration information used in the AI upscaling, based on information included in the received AI data.

As another example, the server 1610 may obtain image data of FHD and 7 Mbps 1644 that is AI downscaled by performing AI downscaling on the original image data of 8K and 60 Mbps 1640 through a 1a-2 DNN 1614. The server 1610 may transmit the AI-encoded image data of FHD and 7 Mbps 1644 together with AI data related to AI downscaling to FHD and 7 Mbps, in response to a request from the first terminal 1620. For example, while the first terminal 1620 requests and receives the AI-encoded image data of 4K and 20 Mbps 1642 as in the aforementioned example, when the first terminal 1620 determines that a congestion level of a network deteriorates, the first terminal 1620 may request the AI-encoded image data of FHD and 7 Mbps 1644. The first terminal 1620 may perform AI upscaling on the image data, which is received in response to the request, through a 2a-2 DNN 1624 trained jointly with the 1a-2 DNN 1614, and thus may obtain AI upscaled image data 1654. As in the aforementioned example, the first terminal 1620 may use information in AI upscaling, the information being included in the AI data.

As another example, the server 1610 may obtain image data of HD and 4 Mbps 1646 that is AI downscaled by performing AI downscaling on the original image data of 8K and 60 Mbps 1640 through a 1a-3 DNN 1616. The server 1610 may transmit the AI-encoded image data of HD and 4 Mbps 1646 together with AI data related to AI downscaling to HD and 4 Mbps, in response to a request from the first terminal 1620. The first terminal 1620 may perform AI upscaling on the received image data through a 2a-3 DNN 1626 trained jointly with the 1a-3 DNN 1616, and thus may obtain AI upscaled image data 1656. As in the aforementioned example, the first terminal 1620 may use information in AI upscaling, the information being included in the AI data.

Also, the first terminal 1620 may additionally perform legacy upscaling on AI upscaled image data. For example, due to a state of a network, the first terminal 1620 may receive the AI-encoded image data of HD and 4 Mbps 1646 obtained by applying AI downscaling through the 1a-3 DNN 1616. The first terminal 1620 may obtain the AI upscaled image data 1656 of FHD and 7 Mbps by performing AI upscaling through the 2a-3 DNN 1626 trained jointly with the 1 a-3 DNN 1616. The first terminal 1620 may perform legacy upscaling on the AI upscaled image data 1656 of FHD and 7 Mbps and thus may obtain image data of 4K and 20 Mbps.

In the aforementioned example, it is described that the first terminal 1620 receives AI-encoded image data through a first DNN, but the first terminal 1620 may receive image data that is not AI downscaled (e.g., image data 1650).

The second terminal 1630 is a terminal that does not support upscaling through a second DNN trained jointly with the first DNN. The second terminal 1630 may not determine whether image data 1660, 1662, 1664, or 1666 received from the server 1610 is image data on which AI downscaling has been performed through the first DNN, and may process the received image data 1660, 1662, 1664, or 1666. In a case of image data on which downscaling has been performed through the first DNN, the image data may have less quality loss compared to image data on which a general downscale technique has been performed, and thus, even when the second terminal 1630 does not support upscaling through the second DNN, the second terminal 1630 may be provided image data of a high quality, compared to image data based on the related art.

Figure 17:
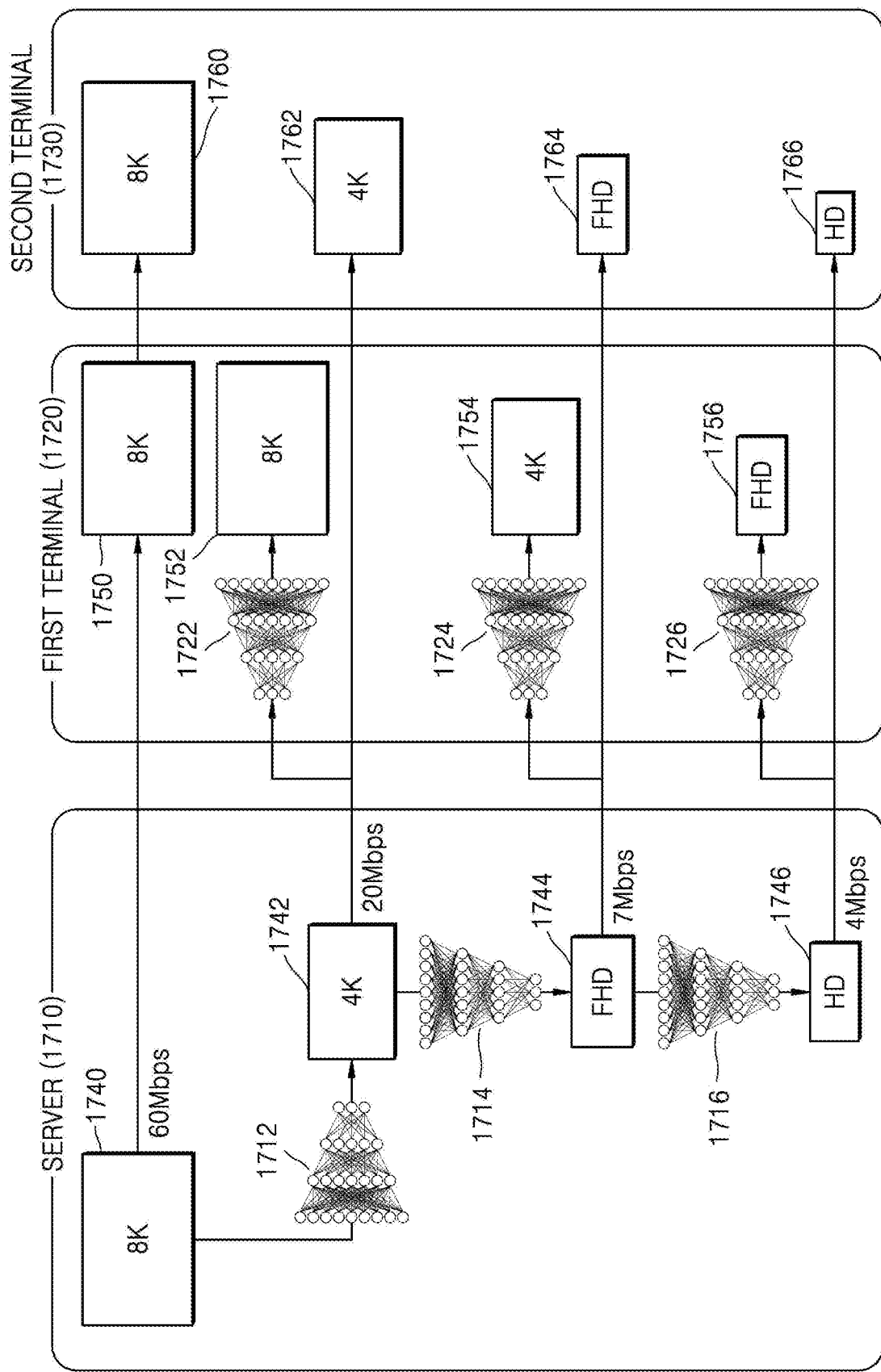
FIG. 17 is a diagram for describing a method of performing streaming between a server and a first terminal according to whether the first terminal supports AI upscaling, according to embodiments of the disclosure.

FIG. 17 is a diagram for describing a method of performing streaming between a server 1710 and a first terminal 1720 according to whether the first terminal 1720 supports AI upscaling, according to embodiments of the disclosure.

In the embodiment of FIG. 17, it is assumed that the first terminal 1720 corresponds to a terminal that can support AI upscaling through a second DNN trained jointly with a first DNN of the server 1710, and a second terminal 1730 corresponds to a terminal that does not support AI upscaling.

The server 1710 stores a plurality of items of image data of different qualities for adaptive streaming, and transmits image data, in response to a request from a terminal (e.g., the first terminal 1720). The terminal (e.g., the first terminal 1720) may obtain additional information of the plurality of items of image data from the server 1710, and may request the server 1710 for one of the plurality of items of image data, based on the additional information. A plurality of pieces of information included in the additional information will be further described below with reference to FIGS. 21 to 24.

For example, the server 1710 may obtain image data of 4K and 20 Mbps 1742 that is AI downscaled by performing AI downscaling on original image data of 8K and 60 Mbps 1740 through a 1 b-1 DNN 1712. The server 1710 may transmit the AI-encoded image data of 4K and 20 Mbps 1742 together with AI data related to AI downscaling to 4K and 20 Mbps, in response to a request from the first terminal 1720. The first terminal 1720 may perform AI upscaling on the received image data through a 2b-1 DNN 1722 trained jointly with the 1 b-1 DNN 1712, and thus may obtain AI upscaled image data 1752. In this regard, the first terminal 1720 may perform aforementioned AI upscaling by obtaining at least one of information indicating whether AI downscaling has been applied, an AI scale conversion level, or DNN configuration information used in the AI upscaling, based on information included in the received AI data.

As another example, the server 1710 may perform AI downscaling on the AI downscaled image data of 4K 1742 through a 1b-2 DNN 1714, and thus may obtain AI downscaled image data of FHD and 7 Mbps 1744. The server 1710 may transmit the AI downscaled image data of FHD and 7 Mbps 1744 together with AI data related to AI downscaling to FHD and 7 Mbps, in response to a request from the first terminal 1720. For example, while the first terminal 1720 requests and receives the AI-encoded image data of 4K and 20 Mbps 1742 as in the aforementioned example, when the first terminal 1720 determines that a congestion level of a network deteriorates, the first terminal 1720 may request the AI-encoded image data of FHD and 7 Mbps 1744. The first terminal 1720 may perform AI upscaling on the image data, which is received in response to the request, through a 2b-2 DNN 1724 trained jointly with the 1b-2 DNN 1714, and thus may obtain AI upscaled image data 1754. As in the aforementioned example, the first terminal 1720 may use information in AI upscaling, the information being included in the AI data.

As another example, the server 1710 may perform AI downscaling on the AI-encoded image data of FHD and 7 Mbps 1744 through a 2b-3 DNN 1716, and thus may obtain AI downscaled image data of HD and 4 Mbps 1746. The server 1710 may transmit the AI downscaled image data of HD and 4 Mbps 1746 together with AI data related to AI downscaling to HD and 4 Mbps, in response to a request from the first terminal 1720. The first terminal 1720 may perform AI upscaling on the received image data through a 2b-3 DNN 1726 trained jointly with the 1b-3 DNN 1716, and thus may obtain AI upscaled image data 1756. As in the aforementioned example, the first terminal 1720 may use information in AI upscaling, the information being included in the AI data.

In FIG. 17, the server 1710 is illustrated as obtaining the AI downscaled image data of FHD and 7 Mbps 1744 through two separate downscaling processes using the 1 b-1 DNN 1712 and the 1b-2 DNN 1714, but the embodiments are not limited thereto, and the server 1710 may downscale the original image data of 8K and 60 Mbps 1740 directly to the image data of FHD 1744 using a single DNN, which is jointly trained with a corresponding DNN of the first terminal 1720. Also, the server 1710 may downscale the original image data of 8K and 60 Mbps 1740 directly to the image data of HD 1746 using a single DNN, which is jointly trained with a corresponding DNN of the first terminal 1720.

In the aforementioned example, it is described that the first terminal 1720 receives AI-encoded image data through a first DNN, but the first terminal 1720 may receive image data that is not AI downscaled (e.g., image data 1750).

A structure of a DNN shown in FIG. 17 is an example, and at least one of the 1 b-1 DNN 1712, the 1b-2 DNN 1714, or the 1b-3 DNN 1716 may be replaced with a legacy scaler. Also, in association thereto, at least one of the 2b-1 DNN 1722, the 2b-2 DNN 1724, or the 2b-3 DNN 1726 may be replaced with a legacy scaler.

The second terminal 1730 is a terminal that does not support upscaling through a second DNN trained jointly with the first DNN. The second terminal 1730 may not determine whether image data 1760, 1762, 1764, or 1766 received from the server 1710 is image data on which AI downscaling has been performed through the first DNN, and may process the received image data 1760, 1762, 1764, or 1766. In a case of image data on which downscaling has been performed through the first DNN, the image data may have less quality loss compared to image data on which a general downscale technique has been performed, and thus, even when the second terminal 1730 does not support upscaling through the second DNN, the second terminal 1730 may be provided image data of a high quality, compared to image data based on the related art.

The image data shown in FIGS. 12 and 17 is an example, and a plurality of items of image data stored in different qualities are not limited to AI-encoded 4K image data, AI-encoded FHD image data, AI-encoded HD image data, or the like. For example, the server 1710 may perform AI downscaling on 8K original image data and thus may store a plurality of items of AI-encoded image data including 5K (5120×2880) image data, 3K (2560×1440) image data, 540p (960×540) image data, 360p (640×360) image data, or the like. Also, the server 1710 may store a plurality of items of image data of different bitrates that are with respect to image data of a particular resolution. For example, AI-encoded 4K image data may be stored as image data of 4K and 20 Mbps, image data of 4K and 15 Mbps, or the like. To this end, the first DNN structure shown in FIGS. 16 and 17 may be variously configured. That is, a first DNN structure for converting 8K image data to AI-encoded 3K image data, a first DNN structure for converting 3K image data to AI-encoded 540p image data, a first DNN structure for converting image data of 8K and 60 Mbps to AI-encoded image data of 4K and 15 Mbps, or the like may be used.

Figure 18:
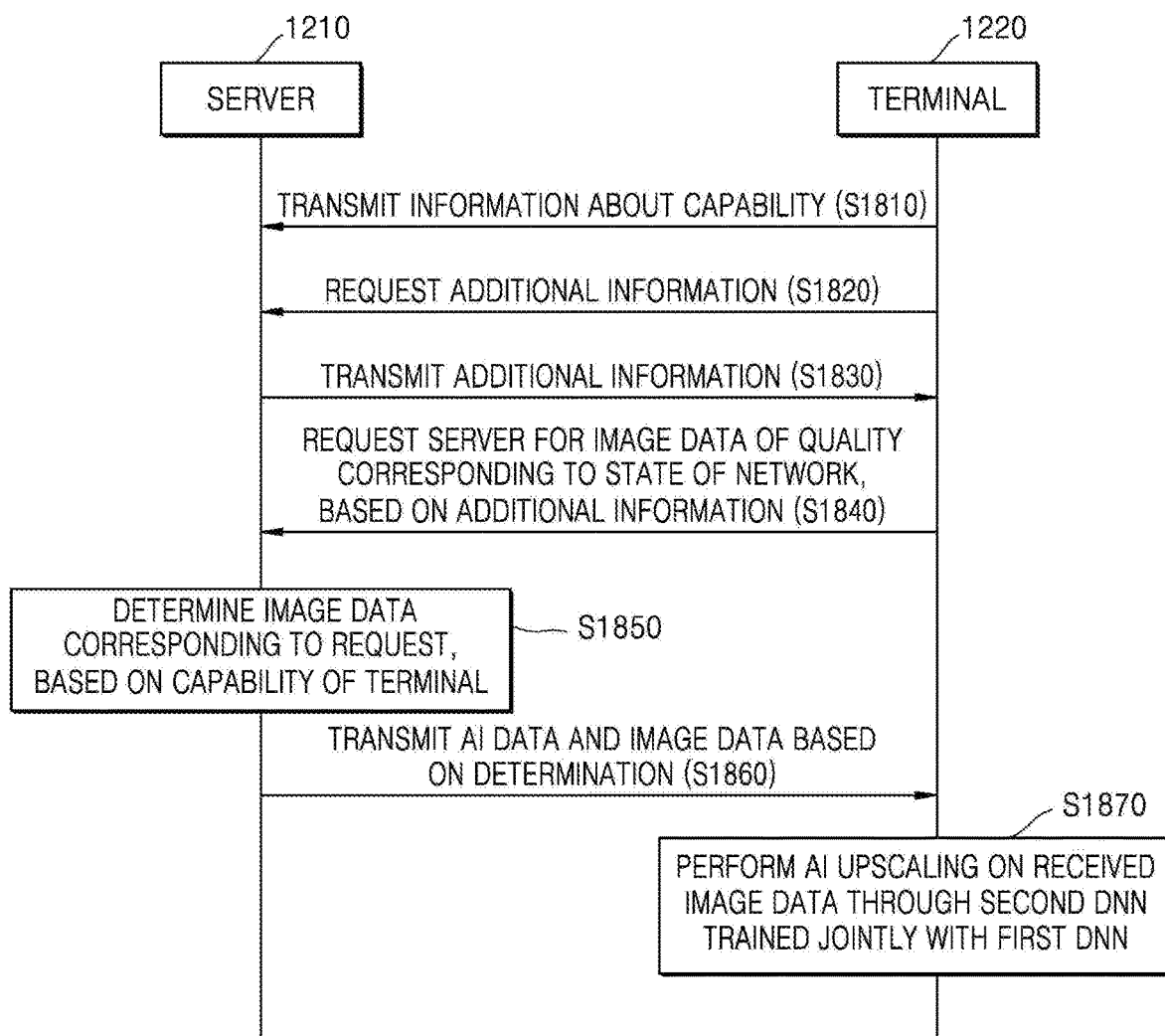
FIG. 18 is a diagram for describing a method, performed by the server, of streaming image data according to a capability of the terminal, according to embodiments of the disclosure.

FIG. 18 is a diagram for describing a method, performed by the server 1210, of streaming image data according to a capability of the terminal 1220, according to embodiments of the disclosure.

In operation S1810, the terminal 1220 may transmit information about the capability to the server 1210. According to embodiments of the disclosure, the information about the capability may include at least one of information indicating whether the terminal 1220 can change a quality of image data requested adaptive to a state of a network, information indicating whether the terminal 1220 can support AI upscaling through a second DNN, or information about an AI upscale level supportable by the terminal 1220. However, this is an example, and the information about the capability may include information about codec supported by the terminal 1220.

In operation S1820, the terminal 1220 may request the server 1210 for additional information. For adaptive streaming between the server 1210 and the terminal 1220, it is required to check respective qualities of a plurality of items of image data providable from the server 1210 and whether AI encoding has been performed thereto. Accordingly, the terminal 1220 may request the server 1210 for the additional information. The additional information will be further described below with reference to FIGS. 21 to 24. Accordingly, the terminal 1220 may request the server 1210 for additional information of the plurality of items of image data.

In operation S1830, the server 1210 may transmit the additional information to the terminal 1220. When the server 1210 receives the request from the terminal 1220, the server 1210 may determine the additional information corresponding to the request. For example, the server 1210 may determine the additional information that is from among a plurality of pieces of additional information stored in the server 1210 and is requested by the terminal 1220, based on an identifier of the additional information included in the request from the terminal 1220. The additional information may be directly generated by the server 1210, but according to embodiments of the disclosure, the additional information may be received from a different server.

In operation S1840, the terminal 1220 may request the server 1210 for image data of a quality corresponding to a state of a network, based on the additional information.

In the present embodiment of the disclosure, it is assumed that a request message transmitted from the terminal 1220 to the server 1210 so as to request image data includes only quality information corresponding to the state of the network. For example, the terminal 1220 may transmit, to the server 1210, a request message including information indicating that a resolution of the image data corresponding to the state of the network corresponds to FHD, and a bitrate of the image data corresponds to 5 Mbps.

In operation S1850, the server 1210 may determine image data corresponding to a request, based on the capability of the terminal 1220.

When image data of a particular quality is requested, the server 1210 may determine whether to transmit image data on which downscaling has been performed. As a result of determination by the server 1210 based on the capability of the terminal 1220, when the terminal 1220 can support AI upscaling through a second DNN trained jointly with a first DNN, the server 1210 may transmit AI-encoded image data.

Also, the server 1210 may determine which image data is to be transmitted, based on an AI upscale level supportable by the terminal 1220, the image data being AI downscaled to a certain level. For example, in a case in which the terminal 1220 requested AI-encoded image data of FHD and 5 Mbps, the server 1210 may determine whether to transmit image data of FHD and 5 Mbps obtained by performing AI downscaling on image data of 8K and 30 Mbps through a 1a DNN, or image data of FHD and 5 Mbps obtained by performing AI downscaling on image data of 4K and 10 Mbps through a 1 b DNN. The 1 a DNN and the 1 b DNN may have different DNN configuration information.

Table 1 below includes values of a resolution and a bitrate which are providable from the server 1210 to the terminal 1220. When describing a scale conversion level with reference to Table 1, a difference between 4K & 20 Mbps and 4K and 10 Mbps, and a difference between 4K & 10 Mbps and FHD and 5 Mbps may each be defined as one level. However, this is an example, and resolutions and bitrates that are supported by a streaming system according to the disclosure are not limited to the values in Table 1.

TABLE 1

| Resolution | Bitrate |
|---|---|
| 8K | 40 Mbps |
|  | 30 Mbps |
| 4K | 20 Mbps |
|  | 10 Mbps |
| FHD | 5 Mbps |
| HD | 1 Mbps |

In operation S1860, the server 1210 may transmit AI data and image data based on the determination to the terminal 1220. The AI data may include information required for the terminal 1220 to AI upscale AI-encoded image data, and may correspond to the descriptions provided with reference to FIG. 5.

In operation S1870, the terminal 1220 may perform AI upscaling on the received image data through the second DNN trained jointly with the first DNN.

The terminal 1220 may determine, based on the AI data, whether to apply AI upscaling to the received image data through the second DNN trained jointly with the first DNN. When the AI data includes information indicating that the received image data is AI-encoded image data, the terminal 1220 may perform AI upscaling through the second DNN on the received image data. Also, the AI data may include information about at least one of an AI scale conversion level or DNN configuration information used in AI upscaling. For example, the AI data may include information indicating whether the AI-encoded image data of FHD and 5 Mbps is generated by AI downscaling the image data of 8K and 30 Mbps through the 1a DNN or by AI downscaling the image data of 4K and 10 Mbps through the 1 b DNN.

Figure 19:
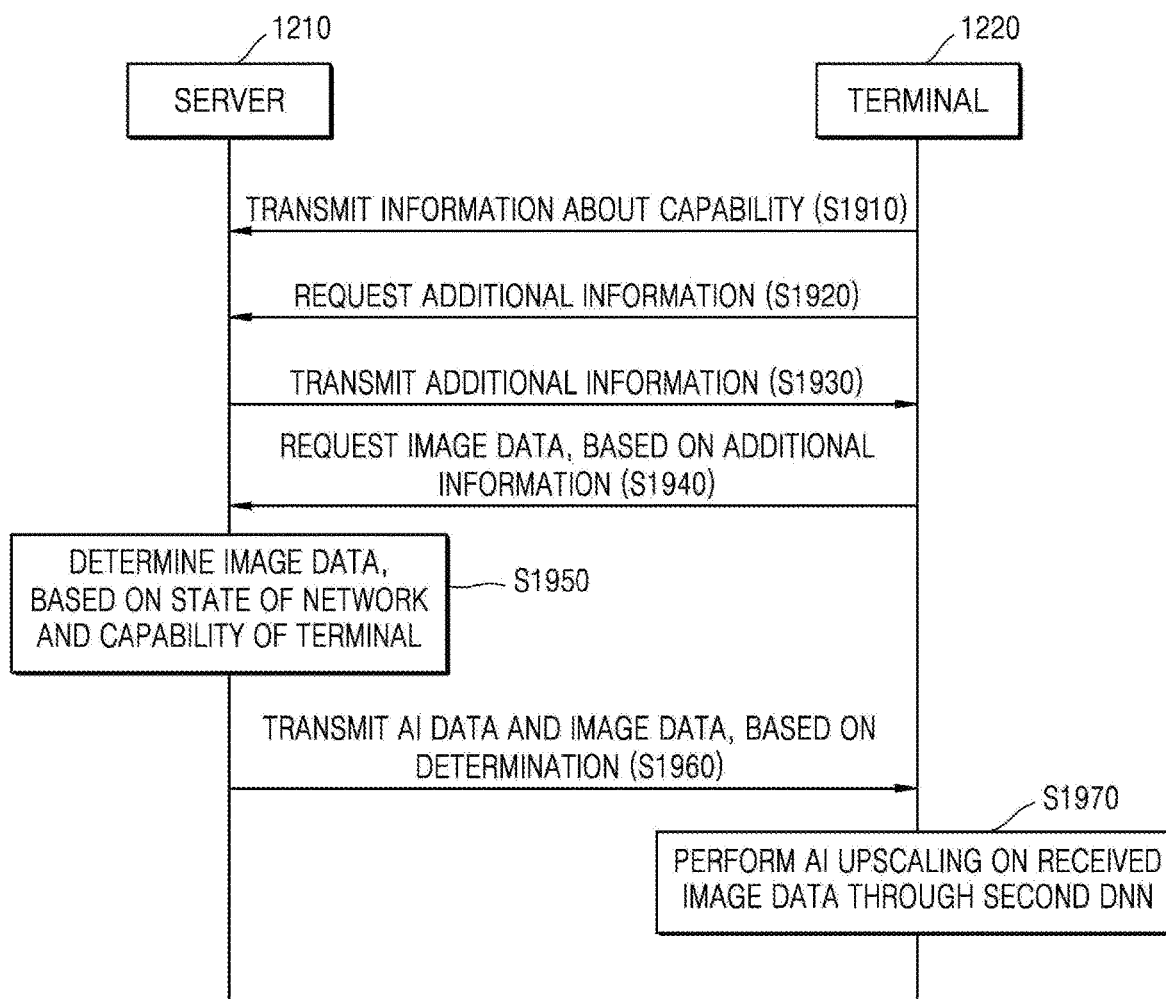
FIG. 19 is a diagram for describing a method, performed by the server, of streaming image data according to a state of a network and a capability of the terminal, according to embodiments of the disclosure.

FIG. 19 is a diagram for describing a method, performed by the server 1210, of streaming image data according to a state of a network and a capability of the terminal 1220, according to embodiments of the disclosure.

In operation S1910, the terminal 1220 may transmit information about the capability to the server 1210. According to embodiments of the disclosure, the information about the capability may include at least one of information indicating whether the terminal 1220 can change a quality of image data requested adaptive to a state of a network, information indicating whether the terminal 1220 can support AI upscaling through a second DNN, or information about an AI upscale level supportable by the terminal 1220. However, this is an example, and the information about the capability may include information about codec supported by the terminal 1220.

In operation S1920, the terminal 1220 may request the server 1210 for additional information. The terminal 1220 may request the server 1210 for additional information of image data. Operation S1920 may correspond to operation S1820 described above with reference to FIG. 18.

In operation S1930, the server 1210 may transmit the additional information to the terminal 1220. The server 1210 may transmit the additional information, in response to the request from the terminal 1220. Operation S1930 may correspond to operation S1830 described above with reference to FIG. 18.

In operation S1940, the terminal 1220 may request the server 1210 for image data of a particular quality, based on the additional information. For example, the terminal 1220 may request the server 1210 for image data of 8K and 30 Mbps, according to selection by a user. Also, the terminal 1220 may include information about a state of a network in the request for the image data of a particular quality, and may transmit the request. For example, the terminal 1220 may include, in a request message, information about a BER, a timestamp, or the like of previously-received image data, and may transmit the request message to the server 1210.

In operation S1950, the server 1210 may determine image data corresponding to the request, based on the state of the network and the capability of the terminal 1220.

The server 1210 may determine a quality of the image data corresponding to the state of the network, based on the information about the state of the network included in the request received from the terminal 1220. For example, the server 1210 may determine the quality of the image data to be 4K and 20 Mbps, the quality of the image data corresponding to the state of the network.

As described above in operation S1940, when it is determined that the terminal 1220 requested the image data of 8K and 30 Mbps but the request from the terminal 1220 does not correspond to the state of the network, the server 1210 may determine whether the terminal 1220 supports AI upscaling through the second DNN trained jointly with the first DNN, based on the information about the capability of the terminal 1220. As a result of the determination by the server 1210, when the terminal 1220 supports AI upscaling, the server 1210 may determine to transmit, to the terminal 1220, image data of 4K and 20 Mbps that is generated by performing AI downscaling on the image data of 8K and 30 Mbps through the first DNN.

In operation S1960, the server 1210 may transmit AI data and the image data to the terminal 1220, based on the determination. The AI data may include information required for the terminal 1220 to AI upscale AI-encoded image data, and may correspond to the descriptions provided with reference to FIG. 12.

In operation S1970, the terminal 1220 may perform AI upscaling on the received image data through the second DNN trained jointly with the first DNN.

The terminal 1220 may determine, based on the AI data, whether to apply AI upscaling to the received image data through the second DNN trained jointly with the first DNN. When the AI data includes information indicating that the received image data is AI-encoded image data, the terminal 1220 may perform AI upscaling through the second DNN on the received image data. Also, the AI data may include information about at least one of an AI scale conversion level or DNN configuration information used in AI upscaling. For example, the AI data may include information indicating that the AI-encoded image data of 4K and 20 Mbps is generated by AI encoding the image data of 8K and 30 Mbps. As another example, the AI data may include an AI scale conversion level, and the terminal 1220 may determine DNN configuration information, based on the resolution and the bitrate.

Figure 20:
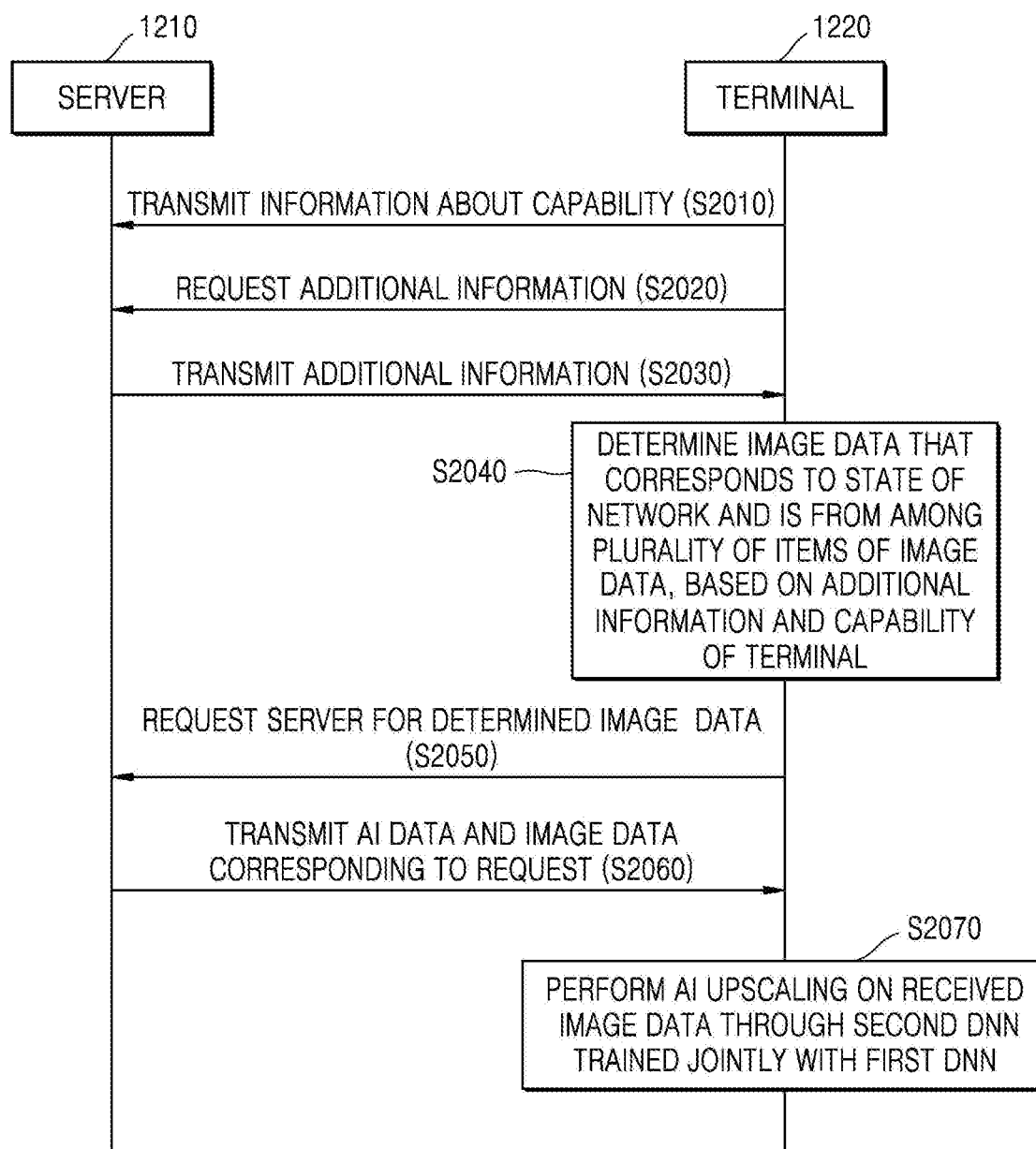
FIG. 20 is a diagram for describing a method, performed by the terminal, of streaming image data corresponding to a state of a network, based on additional information and a capability, according to embodiments of the disclosure.

FIG. 20 is a diagram for describing a method, performed by the terminal 1220, of streaming image data corresponding to a state of a network, based on additional information and a capability, according to embodiments of the disclosure.

In operation S2010, the terminal 1220 may transmit information about the capability to the server 1210. According to embodiments of the disclosure, the information about the capability may include at least one of information indicating whether the terminal 1220 can change a quality of image data requested adaptive to the state of the network, information indicating whether the terminal 1220 can support AI upscaling through a second DNN, or information about an AI upscale level supportable by the terminal 1220. However, this is an example, and the information about the capability may include information about codec supported by the terminal 1220.

In operation S2020, the terminal 1220 may request the server 1210 for the additional information. The terminal 1220 may request the server 1210 for the additional information of image data. Operation S2020 may correspond to S1820 described above with reference to FIG. 18.

In operation S2030, the server 1210 may transmit the additional information to the terminal 1220. The server 1210 may transmit the additional information to the terminal 1220, in response to the request from the terminal 1220. Operation S2030 may correspond to S1830 described above with reference to FIG. 18.

In operation S2040, the terminal 1220 may identify the image data that corresponds to the state of the network and is from among a plurality of items of image data, based on the additional information and the capability of the terminal 1220.

For example, the terminal 1220 may check, based on the additional information, respective qualities and whether AI encoding has been performed about the plurality of items of image data that can be provided by the server 1210, and various types of DNN configuration information which can be used in performing AI upscaling on image data of a particular quality. The additional information will be described in detail with reference to FIGS. 21 to 24.

The terminal 1220 may determine, based on the capability of the terminal 1220, the image data that corresponds to the state of the network and is from among the plurality of items of image data checked based on the additional information. For example, when a quality of the image data that corresponds to the state of the network is FHD and 5 Mbps, the terminal 1220 may determine, based on the capability of the terminal 1220, one of AI-encoded image data of FHD and 5 Mbps generated by performing AI downscaling on image data of 8K and 30 Mbps through the 1a DNN and AI-encoded image data of FHD and 5 Mbps generated by performing AI downscaling on image data of 4K and 10 Mbps through the 1 b DNN, wherein the image data of 8K and 30 Mbps and the image data of 4K and 10 Mbps are providable from the server 1210. When the terminal 1220 supports AI upscaling through a 2b DNN trained jointly with a 1 b DNN, the terminal 1220 may determine, from among the plurality of items of image data, the AI-encoded image data of FHD and 5 Mbps generated by performing AI downscaling on the image data of 4K and 10 Mbps through the 1b DNN.

In operation S2050, the terminal 1220 may request the server 1210 for the determined image data. A request message transmitted from the terminal 1220 to the server 1210 so as to request the determined image data may include an identifier of the determined image data. For example, the request message may include an identifier of the AI-encoded image data of FHD and 5 Mbps generated by performing AI downscaling on the image data of 4K and 10 Mbps through the 1 b DNN.

The terminal 1220 may request the server 1210 for the determined image data in a unit of a segment. The segment may be generated by partitioning the image data, based on a time unit. When the terminal 1220 requests the determined image data in a unit of a segment, the request message may include not only information about a quality of the determined image data, whether AI encoding has been performed thereon, or the like but may also include an identifier of the segment. The identifier of the segment may include a segment number, an offset, or the like, but this is an example and thus the identifier of the segment is not limited to the aforementioned examples. The segment number refers to each of numbers respectively allocated to a plurality of segments included in the image data. Also, the offset refers to a difference between a preset reference time and a start time of the segment. Here, the preset reference time may be a start time of a first segment or an initialization segment from among the plurality of segments included in the image data.

In operation S2060, the server 1210 may transmit AI data and the image data corresponding to a request. The AI data may include information required for the terminal 1220 to AI upscale the AI-encoded image data, and may correspond to the descriptions provided with reference to FIG. 5.

In operation S2070, the terminal 1220 may perform AI upscaling on the received image data through the second DNN trained jointly with the first DNN.

The terminal 1220 may perform AI upscaling on the received image data, based on information about at least one of an AI scale conversion level or DNN configuration information used in AI upscaling, which is included in the AI data. A method by which the terminal 1220 performs AI upscaling on the received image data may correspond to the descriptions provided with reference to FIG. 2.

Figure 21:
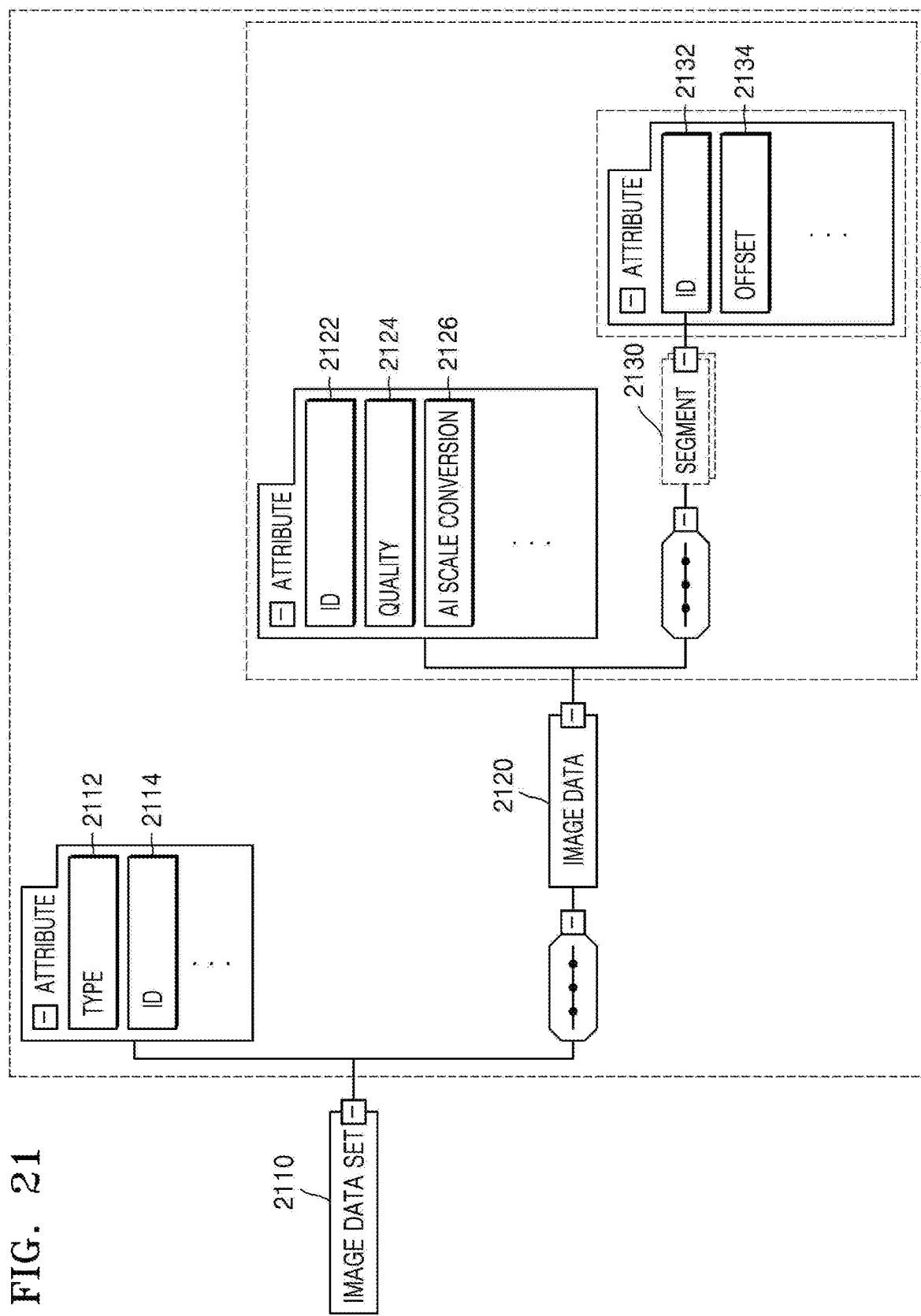
FIG. 21 is a diagram for describing additional information provided for streaming, according to embodiments of the disclosure.

FIG. 21 is a diagram for describing additional information provided for streaming, according to embodiments of the disclosure.

Referring to FIG. 21, the additional information may hierarchically include an image data set element 2110, an image data element 2120, and a segment element 2130. Each of the aforementioned elements 2110, 2120, and 2130 may include a plurality of pieces of information indicating an image data set, image data, and an attribute of a segment. The image data set may be a group of a plurality of items of interchangeable image data. For example, the image data set may be a group of a plurality of items of image data generated by encoding a first period of content at different qualities, and may correspond to an adaptation set in the MPEG-DASH. The segment may be a portion generated by partitioning the image data, based on a time.

The image data set element 2110 may include information about a type 2112 and identification (ID) 2114 of each of image data sets. In this regard, the type 2112 may indicate a type of content included in the image data set, and examples of the type may include an image, audio, a text, or the like. The ID 2114 may include identifiers for identifying the image data sets, respectively.

The image data element 2120 may include ID 2122, a quality 2124, AI scale conversion information 2126, or the like of image data. The ID 2122 may include an identifier for identifying the image data, and the quality 2124 may include various attributes including a bitrate, a resolution, or the like. The AI scale conversion information 2126 may further include information about codec appropriate for a second DNN used in AI upscaling conversion, information about AI upscaling levels that are available in respective conversions of the plurality of items of image data, information about a parameter set of the second DNN corresponding to a parameter set used in a first DNN, or the like.

The segment element 2130 may include information about ID 2132, an offset 2134, or the like of the segment. The ID 2132 may include an identifier for identifying the segment, and the offset 2134 may include information about a position of the segment on a timeline. In a case in which a quality of image data to be received has to be changed due to a change in a state of a network, the offset 2134 may be used to synchronize image data of a previous quality with image data of a quality to be newly received. For example, when the plurality of items of image data consist of segments whose time offsets are 2 ms, 4 ms, 6 ms, and 8 ms, respectively, a terminal may receive segments up to 4 ms with respect to image data of 4K and 10 Mbps, and afterward, when the terminal requests image data of FHD and 5 Mbps due to a change in the state of the network, the terminal may process a segment of 6 ms to be reproduced according to synchronization with the image data of 4K and 10 Mbps.

A structure of the additional information shown in FIG. 21 is an example, and additional information for adaptive streaming is not limited thereto. As another example, the AI scale conversion information 2126 may be included in the segment element 2130. As another example, the additional information may additionally include parameter update information by which the terminal can update the parameter of the second DNN jointly with the parameter of the first DNN of a server. However, this is an example, and information for updating the parameter of the second DNN may be provided to the terminal, separately from the additional information.

FIG. 22 is a diagram for describing detail configuration of additional information, according to embodiments of the disclosure.

Referring to FIG. 22, a "mediadataset" attribute may be defined in the additional information according to embodiments of the disclosure. The "mediadataset" attribute is to indicate an attribute of a media data set consisting of a plurality of items of media data of different qualities, and may include an "id" element indicating an identifier of the media data set, a "type" element indicating a type of content, or the like. The present embodiment of the disclosure corresponds to a case in which media data is image data, and the "type" element may be set as a video. Hereinafter, descriptions will be provided assuming that the media data is the image data.

The "mediadataset" attribute defines an attribute of each of a plurality of items of image data of different qualities, and may include an "id" element indicating an identifier of the media data, a "resolution" element indicating a resolution, a "bitrate" element indicating a bitrate, an "AI upscale" element indicating whether it is required to apply AI upscaling, or the like. A terminal may check whether image data has been AI downscaled through a first DNN trained jointly with a second DNN of the terminal, based on the "AI upscale" element of each image data. The "AI upscale" element may be included in the aforementioned AI scale conversion information.

The terminal may check an attribute of each image data included in additional information, and may request particular image data, based on the attribute. For example, the terminal may request a server for AI-encoded image data of 4K and 10 Mbps from among the plurality of items of image data. In this case, the terminal may transmit, to the server, a request message including information about id=2.

When the terminal receives image data corresponding to the request, the terminal may perform AI upscaling on the received image data through the second DNN trained jointly with the first DNN of the server. In this regard, the terminal may obtain DNN configuration information that is optimized for the second DNN to perform AI upscaling on the image data, based on information about a resolution, a bitrate, or the like of the image data. The DNN configuration information may include information about filter kernels (e.g., the number of convolution layers, the number of filter kernels according to each convolution layer, a parameter of each filter kernel, or the like). For example, the terminal may include information that has been trained jointly with the first DNN of the server so as to indicate that upscaling through the second DNN has to be performed on image data of 4K and 10 Mbps by using A DNN configuration information.

According to embodiments of the disclosure, the DNN configuration information that is optimized for the second DNN to perform AI upscaling may vary according to not only a resolution and a bitrate of image data but also according to a genre of content consisting of the plurality of items of image data. For example, the terminal may include information that has been trained jointly with the first DNN of the server so as to indicate that, for a sports genre, upscaling through the second DNN has to be performed on AI-encoded image data of 4K and 10 Mbps by using DNN configuration information corresponding to the sports genre and 4K & 10 Mbps, and for a drama genre, upscaling through the second DNN has to be performed on AI-encoded image data of 4K and 10 Mbps by using DNN configuration information corresponding to the drama genre and 4K & 10 Mbps.

FIG. 23 is a diagram for describing detail configuration of additional information, according to embodiments of the disclosure.

Referring to FIG. 23, a "mediadataset" attribute and a "mediadata" attribute may be defined in the additional information according to embodiments of the disclosure. In the present embodiment of the disclosure, descriptions corresponding to embodiments of the disclosure which is described above with reference to FIG. 22 are not provided, and an "AI upscalelevel" element different therefrom will now be described in detail.

The "AI upscalelevel" element included in the "mediadata" attribute indicates a difference between AI-encoded image data and original image data.

As described above with reference to FIG. 5, because the AI encoding process according to embodiments of the disclosure is performed based on both a resolution and a bitrate, information of the difference between the AI-encoded image data and the original image data may be provided. In the embodiment of FIG. 23, image data of 8K and 40 Mbps corresponds to the original image data. In the present embodiment of the disclosure, a value of the "AI upscalelevel" element may be determined based on a difference between a bitrate and a resolution of the image data of 8K and 40 Mbps (id=n) and a bitrate and a resolution of the AI-encoded image data.

For example, AI-encoded image data whose id is 1 may have been generated by performing AI encoding on the original image data, based on a bitrate of 30 Mbps, and AI-encoded image data whose id is 2 may have been generated by performing AI encoding on the original image data, based on a resolution of 4K and a bitrate of 20 Mbps. The value of the "AI upscalelevel" element according to embodiments of the disclosure is an example of the difference in resolutions and bitrates of the original image data and the AI-encoded image data and thus is not limited to the example.

The terminal may select, based on a capability of the terminal, image data on which the terminal can perform AI upscaling from among two level AI-encoded image data of 4K and 20 Mbps, and three-level AI-encoded image data of 4K and 10 Mbps, and may request the selected image data.

In the embodiment of FIG. 23, image data whose id is n+1 and image data whose id is n+2 correspond to image data obtained by performing downscaling using a legacy downscaler.

FIG. 24 is a diagram for describing detail configuration of additional information, according to embodiments of the disclosure.

Referring to FIG. 24, a "mediadataset" attribute and a "mediadata" attribute may be defined in the additional information according to embodiments of the disclosure. In the present embodiment of the disclosure, descriptions corresponding to embodiments of the disclosure which is described above with reference to FIG. 22 are not provided, and an "AIupscaleparameterset" element different therefrom will now be described in detail.

The "AIupscaleparameterset" element included in the "mediadata" attribute may provide information about a plurality of pieces of various DNN configuration information that are usable in performing AI upscaling on AI downscaled image data. For example, even for a plurality of items of AI-encoded image data of a same quality of 4K and 20 Mbps, the number of DNN convolution layers and a size and number of filter kernels, which are used in AI upscaling the for AI-encoded image data, may vary and thus various DNN configuration information may exist.

When a plurality of items of AI-encoded image data of a same quality have different DNN configuration information, the terminal may determine one of the plurality of items of AI-encoded image data of the same quality, based on the capability of the terminal. For example, when an AI upscaler of the terminal includes B AIupscaleparameterset, the terminal may select, from among the plurality of items of AI-encoded image data of the same quality, AI-encoded image data that can be reconstructed in a corresponding DNN. As another example, when the AI up-scaler of the terminal includes A=AIupscaleparameterset having a complicated configuration compared to that of the aforementioned example, the terminal may reconstruct all of the plurality of items of AI-encoded image data of the same quality. In this case, the terminal may select, from among the plurality of items of AI-encoded image data of the same quality, AI-encoded image data that uses a relatively less network resource in streaming or that can be reconstructed to a higher quality by the terminal, according to configuration.

The terminal may obtain at least one piece of DNN configuration information from among a plurality of pieces of DNN configuration information, based on a hardware specification of the terminal or codec. For example, the terminal may obtain DNN configuration information that corresponds to the terminal and is from among a plurality of pieces of DNN configuration information that are applicable to AI upscaling with respect to same AI-encoded image data of 4K and 20 Mbps. Accordingly, the terminal may request a server for image data that has been AI encoded based on the DNN configuration information corresponding to 4K and 20 Mbps.

Figure 25:
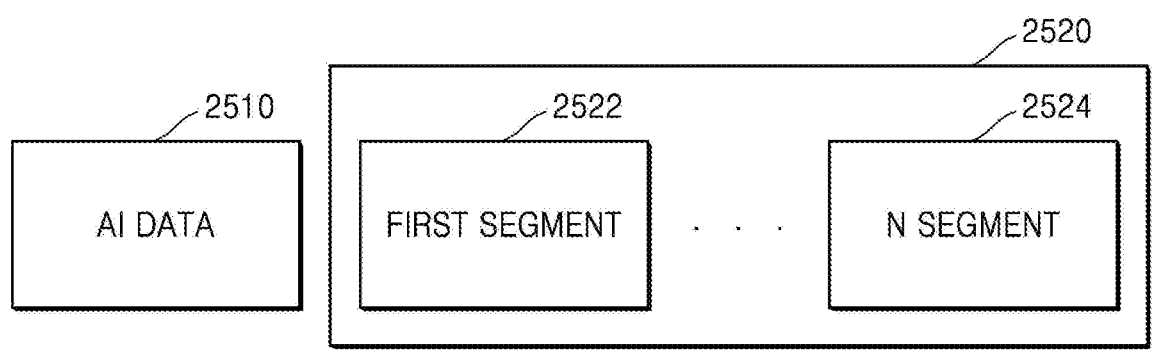
FIG. 25 is a diagram for describing AI data and image data that are streamed from a server to a terminal, according to embodiments of the disclosure.

FIG. 25 is a diagram for describing AI data 2510 and image data 2520 that are streamed from a server to a terminal, according to embodiments of the disclosure.

Referring to FIG. 25, in response to a request from the terminal, the server may transmit, to the terminal, the AI data 2510 and the image data 2520 that correspond to the request.

The AI data 2510 may include information indicating whether AI downscaling has been performed on the image data 2520. Also, when the image data 2520 has been AI encoded, the AI data 2510 may include information about at least one of an AI scale conversion level or DNN configuration information used in AI upscaling. According to embodiments of the disclosure, the AI data 2510 may include the AI scale conversion level, and the DNN configuration information for AI upscaling may be determined by the terminal based on a resolution and a bitrate.

The AI data 2510 may correspond to an initialization segment of the MPEG-DASH, and the terminal may determine whether the image data 2520 has been AI upscaled through a second DNN trained jointly with a first DNN of the server.

The AI data 2510 may include other information required for the terminal to decode the image data 2520, in addition to the aforementioned information. For example, the AI data 2510 may include information about a type of codec, ID, an offset, or the like.

The image data 2520 may consist of a plurality of segments 2522 to 2524. The plurality of segments 2522 to 2524 may be generated by partitioning the image data 2520, based on a time. In response to a request from the terminal, the server may transmit the image data 2520 in a unit of a segment to the terminal. Accordingly, when a state of a network between the server and the terminal is changed, a quality of image data requested for the server by the terminal may be efficiently changed.

However, configurations of the AI data 2510 and the image data 2520 are an example, and configurations of AI data and image data for streaming according to embodiments of the disclosure are not limited thereto.

Figure 26:
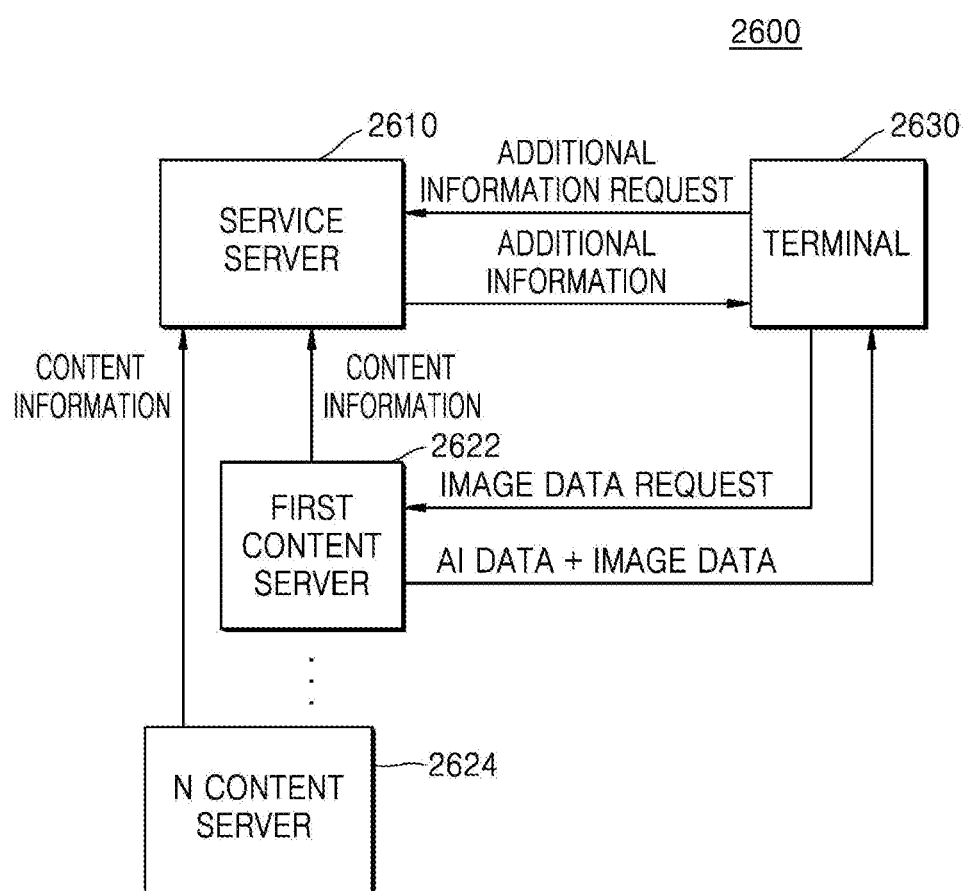
FIG. 26 is a diagram for describing a streaming system, according to embodiments of the disclosure.

FIG. 26 is a diagram for describing a streaming system 2600, according to embodiments of the disclosure.

Referring to FIG. 26, the streaming system 2600 according to embodiments of the disclosure may include a service server 2610, a plurality of content servers 2622 and 2624 (also referred to as the first content server 2622 and the N content server 2624), and a terminal 2630. However, this is an example, and the streaming system 2600 may further include additional elements. For example, the streaming system 2600 may include a service server 2610. The service server 2610 may be provided in a multiple number. Also, the present embodiment of the disclosure will now be described with reference to one terminal 2630, but the service server 2610 and the plurality of content servers 2622 and 2624 may stream image data to a plurality of terminals.

The service server 2610 may provide additional information of a plurality of items of image data to the terminal 2630 so as to allow the terminal 2630 to request image data that corresponds to a state of a network and is from among the plurality of items of image data. The additional information may include respective qualities of the plurality of items of image data, whether AI encoding has been performed thereon, various DNN configuration information that can be used in performing AI upscaling on image data of a particular quality, or the like. Also, the additional information may include location information over the network where the plurality of items of image data are stored. For example, the additional information may include a uniform resource identifier (URI) of the first content server 2622 or the N content server 2624. Also, as described above with reference to FIG. 21, when the plurality of items of image data are partitioned in a unit of a segment, the additional information may include an URI of each segment.

The terminal 2630 may request image data that corresponds to the state of the network and is from among the plurality of items of image data, based on the additional information. For example, according to a result of determination based on the state of the network, when the terminal 2630 determines to request image data of FHD and 5 Mbps generated by performing AI downscaling, through the 1a DNN, on image data of 8K and 30 Mbps from among the plurality of items of image data, the terminal 2630 may obtain URI information of the determined image data, based on the additional information. In the present embodiment of the disclosure, the image data of FHD and 5 Mbps generated by performing AI downscaling, through the 1a DNN, on the image data of 8K and 30 Mbps may be stored in the first content server 2622. The terminal 2630 may request the first content server 2622 for the determined image data, based on the URI information. When a request is received, the first content server 2622 may transmit AI data and image data corresponding to the request to the terminal 2630. However, this is an example, and the terminal 2630 may request the first content server 2622 for a request for the determined image data in a unit of a segment.

The plurality of content servers 2622 and 2624 may provide information about content to the service server 2610. A content server (e.g., the content server 2622) may provide information about content stored in the content server (e.g., the content server 2622) or information about new added content to the service server 2610. The service server 2610 may generate or update the additional information, based on a plurality of pieces of information about content which are provided from the plurality of content servers 2622 and 2624.

The streaming system 2600 described above with reference to FIG. 26 is an example, and a system that performs streaming according to the disclosure is not limited thereto. For example, at least one cache server to deliver image data and AI data may be further provided between the terminal 2630 and the plurality of content servers 2622 and 2624. As another example, the streaming system 2600 may further include a source server for providing content to each of the plurality of content servers 2622 and 2624.

Figure 27:
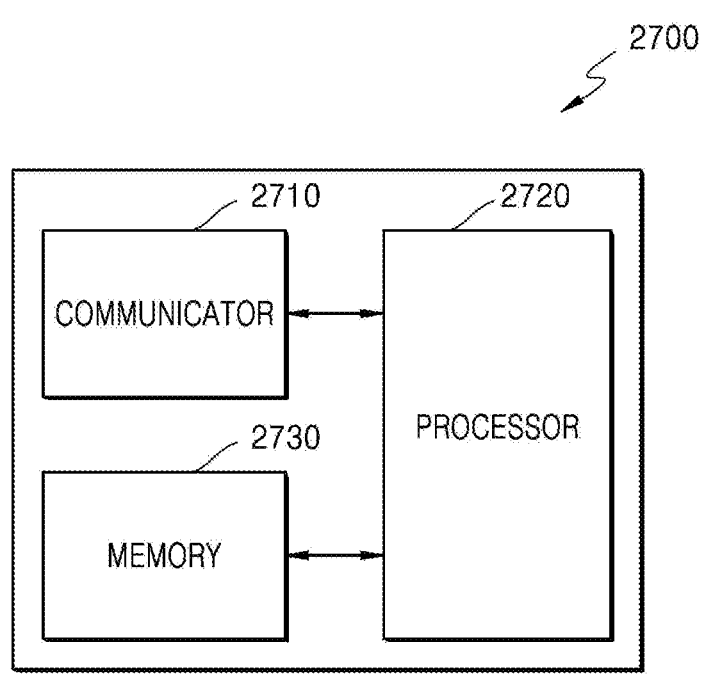
FIG. 27 is a block diagram illustrating a configuration of a server, according to embodiments of the disclosure.

FIG. 27 is a block diagram illustrating a configuration of a server 2700, according to embodiments of the disclosure.

Referring to FIG. 27, the server 2700 according to embodiments of the disclosure may include a communication interface 2710, a processor 2720, and a memory 2730. However, this is an example, and the server 2700 may additionally further include other elements. For example, the server 2700 may include a plurality of processors.

The communication interface 2710 according to embodiments of the disclosure may provide an interface for communicating with another device (e.g., a terminal). The communication interface 2710 may receive a request for additional information or image data from the terminal. Also, the communication interface 2710 may transmit the additional information or media to the terminal.

The processor 2720 according to embodiments of the disclosure may generally control the server 2700 to execute one or more programs stored in the memory 2730 to perform operations related to an image encoding apparatus described above with reference to FIGS. 1 to 11, and operations related to a server described above with reference to FIGS. 12 to 26.

The memory 2730 according to embodiments of the disclosure may store various data, programs, or applications for driving and controlling the server 2700. Each of the one or more programs stored in the memory 2730 may include one or more instructions. Each program (one or more instructions) or each application, which is stored in the memory 2730, may be executed by the processor 2720.

Figure 28:
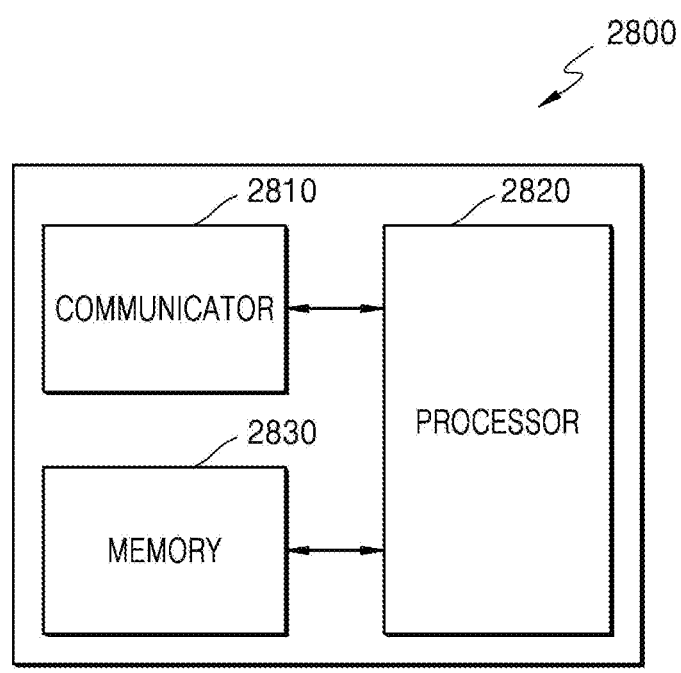
FIG. 28 is a block diagram illustrating a configuration of a terminal, according to embodiments of the disclosure.

FIG. 28 is a block diagram illustrating a configuration of a terminal 2800, according to embodiments of the disclosure.

Referring to FIG. 28, the terminal 2800 according to embodiments of the disclosure may include a communication interface 2810, a processor 2820, and a memory 2830. However, this is an example, and the terminal 2800 may additionally further include other elements. For example, the terminal 2800 may include a plurality of processors including a central processing unit (CPU), a graphic processing unit (GPU), a neutral processing unit (NPU), or the like.

The communication interface 2810 according to embodiments of the disclosure may provide an interface for communicating with another device (e.g., a server). The communication interface 2810 may transmit a request for additional information or image data to a server. Also, the communication interface 2810 may receive additional information or media from the server and may output the received additional information or the media to the processor 2820.

The processor 2820 according to embodiments of the disclosure may generally control the terminal 2800 to execute one or more programs stored in the memory 2830 to perform operations related to an image decoding apparatus described above with reference to FIGS. 1 to 11, and operations related to a terminal described above with reference to FIGS. 12 to 26.

For example, the processor 2820 may transmit a request for additional information of a plurality of items of image data of different qualities to the server via the communication interface 2810. In response to the request, the processor 2820 may obtain the additional information from the server via the communication interface 2810.

The processor 2820 may transmit a request for predefined image data from among the plurality of items of image data, based on the additional information, to the server via the communication interface 2810. When the processor 2820 obtains image data and AI data that correspond to the request, the processor 2820 may determine whether to perform AI upscaling on the received image data, based on the AI data. Based on a result of determining whether to perform AI upscaling, the processor 2820 may perform AI upscaling on the received image data through the DNN for upscaling trained jointly with the DNN for downscaling of the server.

The processor 2820 may confirm a state of a network, based on a BER or a timestamp of the image data received from the server via the communication interface 2810.

Based on the confirmed state of the network, the processor 2820 may transmit a request for image data of a different quality from among the plurality of items of image data, based on the additional information, to the server via the communication interface 2810. The processor 2820 may obtain the image data and AI data corresponding to the request.

When the terminal 2800 includes a plurality of processors, each of the processors may perform at least some of operations of the processor 2820. For example, the CPU may confirm the state of the network and may request image data corresponding thereto. The NPU may perform AI upscaling on AI-encoded image data, and the GPU may perform a process other than a process performed by the NPU, the processes being included in the AI decoding process described with reference to FIG. 2, or may support the NPU in performing the process so as to accelerate the process performed by the NPU. However, this is a an example, and operations to be performed by the processors are not limited to the aforementioned examples.

The memory 2830 according to embodiments of the disclosure may store various data, programs, or applications for driving and controlling the terminal 2800. Each of the one or more programs stored in the memory 2830 may include one or more instructions. Each program (one or more instructions) or each application, which is stored in the memory 2830, may be executed by the processor 2820.

Elements in a block diagram may be combined, an element may be added thereto, or at least one of the elements may be omitted according to actual specifications of an apparatus. That is, at least two elements may be combined to one element, or one element may be divided into two elements when necessary. Also, functions performed by each element are for describing the embodiments of the disclosure, and detailed operations or devices do not limit the scope of the disclosure.

The aforementioned embodiments of the disclosure may be written as computer-executable programs that may be stored in a medium.

The medium may continuously store the computer-executable programs, or may temporarily store the computer-executable programs for execution or downloading. Also, the medium may be any one of various recording media or storage media in which a single piece or plurality of pieces of hardware are combined, and the medium is not limited to a medium directly connected to a computer system, but may be distributed over a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

A model related to the DNN described above may be implemented as a software module. When the DNN model is implemented as a software module (for example, a program module including instructions), the DNN model may be stored in a computer-readable recording medium.

Also, the DNN model may be a part of at least one of the image decoding apparatus, the image encoding apparatus, the server, or the terminal described above by being integrated as a hardware chip. For example, the DNN model may be manufactured as an exclusive hardware chip for AI, or may be manufactured as a part of an existing general-purpose processor (for example, CPU or AP) or a graphic-exclusive processor (for example GPU).

Also, the DNN model may be provided as downloadable software. A computer program product may include a product (for example, a downloadable application) as a software program electronically distributed through a manufacturer or an electronic market. For electronic distribution, at least a part of the software program may be stored in a storage medium or may be temporarily generated. In this case, the storage medium may be a server of the manufacturer or electronic market, or a storage medium of a relay server.

The method and apparatus for streaming data according to embodiments of the disclosure may transceive AI-encoded image data by using a DNN, based on a state of a network, and thus may constantly maintain QoS of reproduction of image data in a state of the network which is changeable.

The effects that may be achieved by the method and apparatus for streaming data according to embodiments of the disclosure are not limited to the aforementioned features, and other unstated effects will be clearly understood by one of ordinary skill in the art in view of descriptions below.

While one or more embodiments of the disclosure have been described with reference to the figures, it will be understood by one of ordinary skill in the art that various changes in form and details may be made therein without departing from the spirit and scope as defined by the following claims.

What is claimed is:

1. A server for streaming data, the server comprising:
    at least one processor, when executing one or more instructions stored in the server, configured to:
    receive, from an electronic device, a first request for image data of a first quality,
    in response to the first request, control the transceiver to transmit, to the electronic device, first artificial intelligence (AI) data and the image data of the first quality that has been AI encoded through a downscaling neural network (NN) of the server, the first AI data related to AI downscaling an original image to a first image through the downscaling NN based on NN setting information for downscaling, the first NN setting information for downscaling being selected from a plurality of NN setting information for downscaling;
    identify a state of a network between the electronic device and the server; and
    transmit, to the electronic device, second AI data and the image data of a second quality based on the state of the network,
    wherein a first AI upscaling on the image data of the first quality is performed by the electronic device through a first upscaling NN that is set with first NN setting information for upscaling at the electronic device, the first NN setting information for upscaling corresponding to the first AI data, and a second AI upscaling on the image data of the second quality is performed by the electronic device through a second upscaling NN that is set with second NN setting information for upscaling,
    wherein the first NN setting information for upscaling is selected based on the first AI data from a plurality of NN setting information for upscaling, and the second NN setting information for upscaling is selected based on the second AI data from the plurality of NN setting information for upscaling,
    wherein the first AI data comprises an index indicating the first NN setting information for downscaling among the plurality of NN setting information for downscaling.

2. The server of claim 1, wherein the at least one processor is further configured to execute the one or more instructions to receive a second request for the image data of the second quality that is determined based on either one or both of AI scale conversion information and quality information of each of a plurality of image data of different qualities.

3. The server of claim 1, wherein the image data of the second quality corresponds to the state of the network and is determined based on capability information comprising information indicating whether AI upscaling technology is supported by the electronic device and information about an AI upscale level supported by the electronic device.

4. The server of claim 1, wherein the at least one processor is further configured to execute the one or more instructions to provide the electronic device with an identifier of the server.

5. The server of claim 1, wherein the at least one processor is further configured to execute the one or more instructions to receive, from the electronic device, a second request for the image data of the second quality from among a plurality of image data of different qualities, based on a user input selecting at least one of a second bitrate or a second resolution related to the second quality.

6. The server of claim 1, wherein the first AI data further comprises information related to at least one of a resolution difference between the original image and the first image, a bitrate regarding the image data of the first quality, a quantization parameter regarding the image data of the first quality, a resolution of the first image, or a codec type used to encode the first image.

7. The server of claim 1, wherein the first NN setting information for downscaling comprises a parameter set for downscaling.

8. The server of claim 7, wherein the parameter set for downscaling comprises at least one of a weight and a bias of a NN.

9. An electronic device for processing streaming data, the electronic device comprising:
    at least one processor, when executing one or more instructions stored in the electronic device, configured to:
    request a server to transmit image data of a first quality;
    receive the image data of the first quality and first artificial intelligence (AI) data as a response to the requesting the server to transmit the image data of the first quality, the first AI data related to AI downscaling an original image to a first image through a downscaling neural network (NN) based on first NN setting information for downscaling, the first NN setting information for downscaling being selected from a plurality of NN setting information for downscaling;
    select, based on the first AI data, first NN setting information for upscaling from a plurality of NN setting information for upscaling, the first NN setting information for upscaling corresponding to the received first AI data;
    perform a first AI upscaling on the received image data of the first quality, through an upscaling NN of the electronic device that is set with the selected first NN setting information for upscaling;
    receive image data of a second quality and second AI data based on a result of identifying of a state of a network by the server;
    select, based on the second AI data, second NN setting information for upscaling from the plurality of NN setting information for upscaling, the second NN setting information for upscaling corresponding to the received second AI data; and perform a second AI upscaling on the received image data of the second quality, through the upscaling NN that is set with the selected second NN setting information for upscaling, and wherein the first AI data comprises an index indicating the first NN setting information for downscaling among the plurality of NN setting information for downscaling.

10. The electronic device of claim 9, wherein the at least one processor is further configured to execute the one or more instructions to:

determine, based on the first AI data, whether AI downscaling has been performed on the received image data of the first quality through the downscaling NN of the server, and based on the AI downscaling having been performed on the received image data of the first AI data, perform the first AI upscaling on the received image data of the first quality.

11. The electronic device of claim 9, wherein the at least one processor is further configured to execute the one or more instructions to receive information of a plurality of image data of different qualities, and when the at least one processor requests the server to execute the one or more instructions to transmit the image data of the first quality, the at least one processor is configured to execute the one or more instructions to request, based on at least the information, the server to transmit the image data of the first quality, from among the plurality of image data of different qualities.

12. The electronic device of claim 11, wherein the information of the plurality of image data includes quality information and AI scale conversion information of the plurality of image data, and wherein the at least one processor is further configured to execute the one or more instructions to request the image data of the first quality, based on either one or both of the quality information and the AI scale conversion information.

13. The electronic device of claim 9, wherein when the at least one processor is configured to execute the one or more instructions to receive the image data of the second quality and second AI data, the at least one processor is configured to execute the one or more instructions to receive the image data of the second quality and second AI data based on the result of the identifying of the state of the network and a result of identifying of capability information comprising information indicating whether the second AI upscaling is supported by the electronic device and information about an AI upscale level supported by the electronic device.

14. The electronic device of claim 9, wherein the server is a content provider server, and wherein the at least one processor is further configured to execute the one or more instructions to request a service server to provide the electronic device with information of a plurality of image data, and to receive, from the service server an identifier of the content provider server and the information of the plurality of image data.

15. The electronic device of claim 9, wherein the image data of the second quality comprises image data corresponding to the state of the network based on at least one of a Bit Rate related to the image data and a Bit Error Rate (BER) related to the image data.

16. The electronic device of claim 9, wherein the state of the network between the electronic device and the server is based on at least one of a delay, a bit rate, a bit error rate, a packet loss, a time out, or capability of the electronic device.

17. The electronic device of claim 9, wherein the at least one processor is configured to execute the one or more instructions to request the server to transmit the image data of the second quality based on a user input selecting at least one of a second bitrate or a second resolution related to the second quality, and the at least one processor is configured to execute the one or more instructions to receive the image data of the second quality and second AI data as a response to the requesting the server to transmit the image data of the second quality based on the result of identifying of the state of the network by the server.

18. The electronic device of claim 9, wherein the first NN setting information for downscaling comprises a parameter set for downscaling.

19. The electronic device of claim 18, wherein the parameter set for downscaling comprises at least one of a weight and a bias of a NN.

20. A non-transitory computer-readable recording medium having recorded thereon instructions, which when executed by an electronic device, cause the electronic device to perform first operations comprising:

requesting a server to transmit image data of a first quality;

receiving the image data of the first quality and first artificial intelligence (AI) data as a response to the requesting the server to transmit the image data of the first quality, the first AI data related to AI downscaling an original image to a first image through a downscaling neural network (NN) based on first NN setting information for downscaling, the first NN setting information for downscaling being selected from a plurality of NN setting information for downscaling;

selecting, based on the first AI data, first NN setting information for upscaling from a plurality of NN setting information for upscaling, the first NN setting information for upscaling corresponding to the received first AI data;

performing a first AI upscaling on the received image data of the first quality, through an upscaling NN of the electronic device that is paired with the downscaling NN of the server and that is set with the selected first NN setting information for upscaling;

receiving image data of a second quality and second AI data based on a result of identifying of a state of a network by the server;

selecting, based on the second AI data, second NN setting information for upscaling from the plurality of NN setting information for upscaling, the second NN setting information for upscaling corresponding to the received second AI data;

performing a second AI upscaling on the received image data of the second quality, through the upscaling NN that is paired with the downscaling NN of the server and that is set with the selected second NN setting information for upscaling, and wherein the first AI data comprises an index indicating the first NN setting information for downscaling among the plurality of NN setting information for downscaling.

* * * * *